US012589050B2

(12) United States Patent
Lenke

(10) Patent No.: US 12,589,050 B2
(45) Date of Patent: Mar. 31, 2026

(54) STIMULATION DEVICE

(71) Applicant: NOVOLUTO GmbH, Berlin (DE)

(72) Inventor: Michael Lenke, Metten (DE)

(73) Assignee: NOVOLUTO GmbH, Berlin (DE)

( * ) Notice: Subject to any disclaimer, the term of this patent is extended or adjusted under 35 U.S.C. 154(b) by 0 days.

(21) Appl. No.: 17/461,470

(22) Filed: Aug. 30, 2021

(65) Prior Publication Data

US 2022/0226186 A1 Jul. 21, 2022

Related U.S. Application Data

(63) Continuation of application No. 15/965,208, filed on Apr. 27, 2018, now Pat. No. 11,103,418, which is a
(Continued)

(30) Foreign Application Priority Data

Sep. 23, 2013 (DE) ........................ 102013110501.7

(51) Int. Cl.
*A61H 9/00* (2006.01)
*A61H 19/00* (2006.01)

(52) U.S. Cl.
CPC ............... *A61H 19/34* (2013.01); *A61H 9/00* (2013.01); *A61H 9/0007* (2013.01); *A61H 9/005* (2013.01);
(Continued)

(58) Field of Classification Search
CPC ........ A61H 9/00; A61H 9/005; A61H 9/0057; A61H 19/30; A61H 19/34; A61H 19/50;
(Continued)

(56) References Cited

U.S. PATENT DOCUMENTS

| | | | |
|---|---|---|---|
| 15,626 | A | 8/1856 | Tillotson |
| 787,443 | A | 4/1905 | Godman et al. |

(Continued)

FOREIGN PATENT DOCUMENTS

| | | |
|---|---|---|
| AU | 2011351297 | 7/2013 |
| AU | 2018200317 | 2/2018 |

(Continued)

OTHER PUBLICATIONS

United States Patent and Trademark Office, "Final Office action," issued in connection with U.S. Appl. No. 15/719,085, filed May 7, 2018, 14 pages.

(Continued)

*Primary Examiner* — Margaret M Luarca
*Assistant Examiner* — Sarah B Lederer
(74) *Attorney, Agent, or Firm* — Hanley, Flight & Zimmerman, LLC

(57) ABSTRACT

Stimulation devices are disclosed. An example stimulation device includes a chamber which has a flexible wall portion. A drive unit of the stimulation device is in physical communication with the flexible wall portion so as to cause deflections of the flexible wall portion in opposing directions, thereby resulting in a changing volume of the chamber. The changing volume of the chamber results in modulated positive and negative pressures with respect to a reference pressure. An opening of the stimulation device is for applying the modulated positive and negative pressures to a body part. The stimulation device includes a control device for controlling the drive unit.

28 Claims, 7 Drawing Sheets

Related U.S. Application Data continuation of application No. 15/354,599, filed on Nov. 17, 2016, now Pat. No. 10,857,063, which is a continuation of application No. 15/023,471, filed as application No. PCT/EP2014/065734 on Jul. 22, 2014, now Pat. No. 9,763,851.

(52) U.S. Cl.
CPC ........... *A61H 9/0057* (2013.01); *A61H 19/00* (2013.01); *A61H 19/30* (2013.01); *A61H 2201/0153* (2013.01); *A61H 2201/0157* (2013.01); *A61H 2201/1207* (2013.01); *A61H 2201/1215* (2013.01); *A61H 2201/1238* (2013.01); *A61H 2201/1409* (2013.01)

(58) Field of Classification Search
CPC ............ A61H 2009/0064; A61H 23/02; A61H 23/0254; A61H 2205/087
See application file for complete search history.

(56) References Cited

U.S. PATENT DOCUMENTS 809,810 A 1/1906 Jost
847,360 A 3/1907 Osius
907,749 A 12/1908 Davenport
1,042,058 A * 10/1912 Hook ................ A61H 23/0236 601/77
1,179,129 A 4/1916 Maxam
1,378,922 A * 5/1921 Ward ..................... A61H 9/005 601/10
1,502,440 A * 7/1924 Robert .................. A61H 9/005 601/65
1,730,535 A 10/1929 Rudolph
1,732,310 A 10/1929 Naibert
1,762,692 A 6/1930 Lair
1,805,675 A 5/1931 Rudolph
1,882,040 A * 10/1932 Roehm ................. A61H 9/005 604/315
1,898,652 A 2/1933 Williams
1,914,290 A 6/1933 Popkin
1,941,665 A 1/1934 De Walt
1,964,590 A 6/1934 Muller
1,998,696 A 4/1935 Andis
2,017,284 A 10/1935 Lembright
2,052,098 A 8/1936 Lockett
2,064,418 A 12/1936 Derringer
2,076,410 A 4/1937 McGerry
2,112,646 A * 3/1938 Joseph .................. A61H 19/30 601/9
2,154,427 A 4/1939 Andres
2,189,116 A 2/1940 Niemiec
2,218,081 A 10/1940 Brichieri-colombi et al.
2,218,443 A 10/1940 Tweddle
2,234,102 A * 3/1941 Andres ................. A61H 9/005 601/101
2,314,590 A 3/1943 Mccarty
2,470,660 A 5/1949 Snyder
2,519,790 A 8/1950 Quinn
2,561,034 A 7/1951 Phillips
2,616,417 A 11/1952 Holbrook
2,661,736 A 12/1953 Schwartz
2,674,994 A 4/1954 Murphy
3,396,720 A 8/1968 Shigeyuki
3,619,673 A 11/1971 Helms
3,818,904 A 6/1974 Kawada
3,841,323 A 10/1974 Stoughton
3,906,940 A * 9/1975 Kawada ................ A61H 9/005 604/315
3,910,262 A 10/1975 Stoughton
4,088,128 A 5/1978 Mabuchi
4,175,554 A 11/1979 Gerow
4,203,431 A 5/1980 Abura et al.
4,312,350 A 1/1982 Doan
4,318,038 A 3/1982 Munehiro
4,323,661 A 4/1982 Kraus
4,428,368 A 1/1984 Torii
4,439,699 A 3/1984 Brende et al.
4,612,592 A 9/1986 Frandsen
4,758,750 A 7/1988 Itagaki et al.
4,813,403 A 3/1989 Endo
4,900,316 A 2/1990 Yamamoto
5,003,966 A 4/1991 Saka et al.
D323,034 S 1/1992 Reinstein
5,127,396 A 7/1992 McAllister
D329,563 S 9/1992 Rasmussen
5,336,158 A 8/1994 Huggins et al.
D351,236 S 10/1994 Held
5,377,701 A * 1/1995 Fang ..................... A61H 9/005 132/271
5,377,702 A 1/1995 Sakurai
D359,563 S 6/1995 Chi
5,440,183 A 8/1995 Denne
5,501,650 A 3/1996 Gellert
5,593,381 A 1/1997 Tannenbaum et al.
5,647,837 A 7/1997 McCarty
5,662,593 A 9/1997 Tillman et al.
5,690,603 A 11/1997 Kain
5,693,002 A 12/1997 Tucker et al.
5,725,473 A 3/1998 Taylor
5,813,973 A 9/1998 Gloth
D402,905 S 12/1998 Kanza et al.
D414,582 S 9/1999 Hwang
D419,893 S 2/2000 Cheng
6,099,463 A 8/2000 Hockhalter
6,183,414 B1 2/2001 Wysor et al.
D443,057 S 5/2001 Hovland et al.
D449,690 S 10/2001 Hovland et al.
6,319,211 B1 11/2001 Ito et al.
D463,862 S 10/2002 Lau
6,464,653 B1 10/2002 Hovland et al.
6,517,511 B2 * 2/2003 Yao ....................... A61M 1/772 606/162
D478,385 S 8/2003 Dirks et al.
6,666,875 B1 12/2003 Sakurai et al.
6,723,060 B2 4/2004 Miller
6,733,438 B1 * 5/2004 Dann ..................... A61H 19/34 600/38
6,758,826 B2 7/2004 Luettgen et al.
D509,301 S 9/2005 Talbot et al.
6,949,067 B1 * 9/2005 Dann ..................... A61H 19/34 600/38
D510,441 S 10/2005 Harris, Jr. et al.
6,964,643 B2 11/2005 Hovland et al.
D523,561 S 6/2006 Telford
D523,562 S 6/2006 Telford
D523,963 S 6/2006 Telford
7,079,898 B2 7/2006 Cohn
D545,446 S 6/2007 Wu
7,318,811 B1 1/2008 Corbishley
7,377,890 B2 5/2008 Liu
7,431,718 B2 10/2008 Ikadai
7,530,944 B1 5/2009 Kain
7,534,203 B2 5/2009 Gil
D609,361 S 2/2010 McGarry et al.
D612,510 S 3/2010 Byle
7,682,321 B2 3/2010 Naldoni
D613,417 S 4/2010 Imboden et al.
D621,950 S 8/2010 Seki et al.
7,828,717 B2 11/2010 Lee
D637,308 S 5/2011 Imboden et al.
D637,309 S 5/2011 Park
7,967,740 B2 6/2011 Mertens et al.
D649,657 S 11/2011 Petersen et al.
D652,523 S 1/2012 Bradley et al.
8,100,887 B2 1/2012 Weston et al.
8,147,399 B2 4/2012 Gloth
D665,091 S 8/2012 Mistry et al.
D666,303 S 8/2012 Ding et al.
D671,226 S 11/2012 Aulwes et al.
8,371,999 B2 2/2013 DeAlva
8,382,656 B1 2/2013 Brown
D681,225 S 4/2013 Chen

(56) References Cited

U.S. PATENT DOCUMENTS

D681,842 S 5/2013 Chang
D689,382 S 9/2013 Juhng et al.
D692,570 S 10/2013 Luzon et al.
8,556,798 B2 10/2013 Mertens et al.
8,568,342 B2 10/2013 Shaviv
D693,247 S 11/2013 Juhng et al.
8,579,837 B1 * 11/2013 Makower ........... A61H 23/0263 601/6
8,647,255 B2 2/2014 Levy
8,708,998 B2 4/2014 Weston et al.
D704,345 S 5/2014 Tai
D706,440 S 6/2014 Hahr et al.
D706,441 S 6/2014 Hahr et al.
D706,444 S 6/2014 Hahr et al.
D708,440 S 7/2014 Owen et al.
8,784,297 B2 7/2014 Mertens et al.
8,821,421 B2 9/2014 Imboden et al.
8,874,215 B2 10/2014 Forsell
8,876,760 B2 11/2014 Bosman et al.
D723,160 S 2/2015 Rodan et al.
D723,707 S 3/2015 Matsuura
D723,711 S 3/2015 Elliott
9,022,925 B2 5/2015 Nan
RE45,585 E 6/2015 Peddicord
9,107,797 B2 8/2015 Levy
9,114,056 B2 8/2015 Imboden et al.
D739,951 S 9/2015 Tai
9,132,058 B2 9/2015 Imboden et al.
D759,256 S 6/2016 Chen
D759,261 S 6/2016 Son et al.
9,370,656 B2 6/2016 Forsell
RE46,163 E 9/2016 Peddicord
D768,309 S 10/2016 Hetzel
D768,310 S 10/2016 Hetzel
D771,389 S 11/2016 Since
D771,828 S 11/2016 Sedic
D772,419 S 11/2016 Courtion et al.
D773,061 S 11/2016 Loebel et al.
D773,065 S 11/2016 Driscoll et al.
9,486,388 B2 11/2016 Wright, Jr.
9,498,404 B2 11/2016 Murison
D773,823 S 12/2016 Wong
D793,571 S 8/2017 Iurchenko
D794,854 S 8/2017 Zepter
D796,054 S 8/2017 Chen
D796,055 S 8/2017 Chen
9,737,457 B2 8/2017 Allen
9,737,458 B1 8/2017 Olivares et al.
D797,302 S 9/2017 Vahlensieck et al.
9,763,851 B2 9/2017 Lenke
D802,784 S 11/2017 Lee
D804,332 S 12/2017 Lim et al.
D805,781 S 12/2017 Szymanski et al.
9,849,061 B2 12/2017 Lenke
D809,150 S 1/2018 Nolasco et al.
D809,170 S 1/2018 Marzynski
9,855,186 B2 1/2018 Goldenberg et al.
D809,945 S 2/2018 Prommel et al.
9,931,271 B2 4/2018 Peter
9,937,097 B2 4/2018 Lenke
D822,843 S 7/2018 Lenke
D825,073 S 8/2018 Enke
10,085,913 B2 10/2018 Blenk et al.
D846,754 S 4/2019 Nelson et al.
10,342,728 B2 7/2019 Nelson et al.
10,675,208 B2 6/2020 Nelson et al.
10,857,063 B2 12/2020 Lenke
10,973,731 B2 4/2021 Taskinen et al.
11,039,978 B2 6/2021 Forsell
11,090,220 B2 8/2021 Lenke
11,103,418 B2 8/2021 Lenke
11,484,463 B2 11/2022 Witt
12,090,110 B2 9/2024 Lenke
12,329,710 B2 6/2025 Lenke
2001/0041848 A1 11/2001 Ito et al.
2002/0120219 A1 * 8/2002 Hovland ................ A61H 19/34 601/72
2002/0198488 A1 12/2002 Yao
2003/0114804 A1 6/2003 Putzer
2003/0125768 A1 7/2003 Peter
2003/0176817 A1 9/2003 Chang
2004/0102822 A1 5/2004 Cohn
2004/0193079 A1 9/2004 Siddhartha
2004/0236254 A1 11/2004 Nichols
2004/0260209 A1 12/2004 Ella et al.
2004/0260210 A1 12/2004 Ella et al.
2004/0260212 A1 12/2004 Cho
2005/0159684 A1 7/2005 Ikadai
2005/0159760 A1 * 7/2005 Ikadai ..................... A61M 1/77 606/131
2005/0203446 A1 9/2005 Takashima
2005/0256369 A1 11/2005 Gloth
2005/0273024 A1 12/2005 Nan
2006/0089572 A1 4/2006 Byon
2006/0116612 A1 6/2006 Drysdale
2006/0229494 A1 10/2006 Wu
2007/0049792 A1 3/2007 Levy
2007/0100259 A1 5/2007 Nan
2007/0185553 A1 8/2007 Kennedy
2008/0011310 A1 1/2008 Anderson
2008/0071138 A1 3/2008 Mertens et al.
2008/0091060 A1 4/2008 Heilman
2008/0106896 A1 5/2008 Liu et al.
2008/0275386 A1 11/2008 Myers
2008/0304984 A1 * 12/2008 Chan .................... A61H 9/0057 417/415
2008/0312674 A1 12/2008 Chen et al.
2009/0016563 A1 1/2009 Wei et al.
2009/0038069 A1 2/2009 Heilman
2009/0048581 A1 2/2009 Sebban
2009/0069629 A1 3/2009 Calvo
2009/0099413 A1 4/2009 Kobashikawa et al.
2009/0118573 A1 5/2009 Tsao
2009/0275796 A1 11/2009 Gil
2009/0306577 A1 12/2009 Akridge et al.
2010/0056963 A1 3/2010 Shaviv
2010/0298745 A1 11/2010 Liu et al.
2011/0034837 A1 2/2011 Lee
2011/0098613 A1 4/2011 Thomas et al.
2011/0133910 A1 6/2011 Alarcon
2011/0218395 A1 9/2011 Stout
2011/0230802 A1 9/2011 Nan
2011/0288370 A1 11/2011 Orten et al.
2011/0295162 A1 12/2011 Chang et al.
2012/0150076 A1 6/2012 Clarvoe
2012/0330097 A1 12/2012 Lee
2013/0012769 A1 1/2013 Carlson
2013/0041295 A1 2/2013 Koenig et al.
2013/0060081 A1 3/2013 Carter et al.
2013/0109913 A1 5/2013 Imboden et al.
2013/0116503 A1 5/2013 Mertens et al.
2013/0226050 A1 8/2013 Lee
2013/0237751 A1 9/2013 Alexander
2013/0261385 A1 10/2013 Zipper
2013/0303975 A1 11/2013 Gvodas, Jr.
2014/0046127 A1 2/2014 Topolovac et al.
2014/0088351 A1 3/2014 Murison
2014/0088468 A1 3/2014 Murison
2014/0088470 A1 3/2014 Topolovac et al.
2014/0135798 A1 5/2014 David
2014/0142374 A1 5/2014 Makower et al.
2014/0179994 A1 6/2014 Topolovac et al.
2014/0188017 A1 7/2014 Wu
2014/0194794 A1 7/2014 Sedic
2014/0228629 A1 8/2014 Baetica et al.
2014/0236151 A1 8/2014 Lee
2014/0243590 A1 8/2014 Fang et al.
2014/0309565 A1 10/2014 Allen
2014/0350333 A1 11/2014 Stout
2015/0000678 A1 1/2015 Buckler et al.
2015/0003644 A1 1/2015 George et al.
2015/0105609 A1 4/2015 Jochum
2015/0133832 A1 5/2015 Courtion et al.
2015/0133833 A1 5/2015 Bradley et al.

(56) References Cited

U.S. PATENT DOCUMENTS

| | | | |
|---|---|---|---|
| 2015/0164678 | A1 | 6/2015 | Lee et al. |
| 2015/0174387 | A1 | 6/2015 | McInnes et al. |
| 2015/0196453 | A1 | 7/2015 | Wu |
| 2015/0196455 | A1 | 7/2015 | Mertens et al. |
| 2015/0257921 | A1 | 9/2015 | Sheffy |
| 2015/0328081 | A1 | 11/2015 | Goldenberg et al. |
| 2015/0351999 | A1 | 12/2015 | Brouse |
| 2015/0366751 | A1 | 12/2015 | Stemple |
| 2016/0000647 | A1 | 1/2016 | Eberhardt |
| 2016/0015595 | A1 | 1/2016 | Blenk et al. |
| 2016/0022533 | A1 | 1/2016 | Makower et al. |
| 2016/0045392 | A1 | 2/2016 | Massey et al. |
| 2016/0058509 | A1 | 3/2016 | Van De Wouw et al. |
| 2016/0058620 | A1 | 3/2016 | George et al. |
| 2016/0074276 | A1 | 3/2016 | Scheuring et al. |
| 2016/0120375 | A1 | 5/2016 | Philips |
| 2016/0120737 | A1 | 5/2016 | Sedic |
| 2016/0128897 | A1 | 5/2016 | George et al. |
| 2016/0136036 | A1 | 5/2016 | Cai |
| 2016/0151236 | A1 | 6/2016 | Makower et al. |
| 2016/0175186 | A1 | 6/2016 | Shadduck |
| 2016/0213557 | A1 | 7/2016 | Lenke |
| 2016/0235621 | A1 | 8/2016 | Choe |
| 2016/0296417 | A1 | 10/2016 | Topolovac et al. |
| 2017/0027809 | A1 | 2/2017 | Lenke |
| 2017/0027810 | A1 | 2/2017 | Murison |
| 2017/0065483 | A1 | 3/2017 | Lenke |
| 2017/0095399 | A1 | 4/2017 | Lee |
| 2017/0135895 | A1 | 5/2017 | Jafri |
| 2017/0156971 | A1 | 6/2017 | Topolovac et al. |
| 2017/0196801 | A1 | 7/2017 | Ghazvini et al. |
| 2017/0202731 | A1 | 7/2017 | Goldfarb et al. |
| 2017/0216135 | A1 | 8/2017 | Lenke |
| 2017/0281457 | A1 | 10/2017 | Witt |
| 2017/0319430 | A1 | 11/2017 | Shadduck |
| 2017/0367925 | A1 | 12/2017 | Allen |
| 2018/0031089 | A1 | 2/2018 | Wong et al. |
| 2018/0031090 | A1 | 2/2018 | Wong et al. |
| 2018/0071167 | A1 | 3/2018 | Lee |
| 2018/0092799 | A1 | 4/2018 | Lenke |
| 2018/0125748 | A1 | 5/2018 | Goldenberg et al. |
| 2018/0153764 | A1 | 6/2018 | Lenke |
| 2018/0243161 | A1 | 8/2018 | Lenke |
| 2018/0243162 | A1 | 8/2018 | Lenke |
| 2019/0015291 | A1 | 1/2019 | Sedic et al. |
| 2019/0083354 | A1 | 3/2019 | Pahl |
| 2020/0046599 | A1 | 2/2020 | Sedic |
| 2020/0069850 | A1 | 3/2020 | Beadle et al. |
| 2020/0085676 | A1 | 3/2020 | Haddock et al. |
| 2020/0093681 | A1 | 3/2020 | Haddock et al. |
| 2020/0188221 | A1 | 6/2020 | Lenke |
| 2020/0214932 | A1 | 7/2020 | Pahl et al. |
| 2020/0237609 | A1 | 7/2020 | Kirsten et al. |
| 2020/0281808 | A1 | 9/2020 | Kirsten et al. |
| 2021/0038468 | A1 | 2/2021 | Lenke |
| 2021/0038469 | A1 | 2/2021 | Zegenhagen et al. |
| 2021/0038470 | A1 | 2/2021 | Zegenhagen |
| 2021/0052463 | A1 | 2/2021 | Lenke |
| 2022/0211569 | A1 | 7/2022 | Lenke |
| 2022/0211570 | A1 | 7/2022 | Zegenhagen |

FOREIGN PATENT DOCUMENTS

| | | | | | |
|---|---|---|---|---|---|
| AU | 2014323661 | | | 3/2018 | |
| AU | 2015386680 | | | 3/2018 | |
| CA | 2923526 | | | 3/2015 | |
| CA | 2978495 | | | 9/2016 | |
| CA | 2943097 | | | 10/2017 | |
| CH | 329193 | | | 4/1958 | |
| CN | 2153351 | | | 1/1994 | |
| CN | 2153351 | Y | * | 1/1994 | ............... A61H 9/00 |
| CN | 2157772 | | | 3/1994 | |
| CN | 2198900 | | | 5/1995 | |
| CN | 2696611 | Y | | 5/2005 | |
| CN | 2765609 | | | 3/2006 | |
| CN | 1299659 | | | 2/2007 | |
| CN | 201067499 | | | 6/2008 | |
| CN | 201101685 | | | 8/2008 | |
| CN | 201119979 | | | 9/2008 | |
| CN | 201139737 | | | 10/2008 | |
| CN | 101401739 | | | 4/2009 | |
| CN | 101848688 | | | 9/2010 | |
| CN | 102151219 | | | 8/2011 | |
| CN | 202154785 | | | 3/2012 | |
| CN | 102600034 | | | 7/2012 | |
| CN | 102743275 | | | 10/2012 | |
| CN | 102743276 | | | 10/2012 | |
| CN | 202715029 | | | 2/2013 | |
| CN | 103070767 | A | | 5/2013 | |
| CN | 103517697 | | | 1/2014 | |
| CN | 103961246 | | | 8/2014 | |
| CN | 104248500 | | | 12/2014 | |
| CN | 104284648 | | | 1/2015 | |
| CN | 204931954 | | | 1/2016 | |
| CN | 105616124 | | | 6/2016 | |
| CN | 205494128 | | | 8/2016 | |
| CN | 107137218 | | | 9/2017 | |
| CN | 108599516 | | | 9/2018 | |
| DE | 278733 | | | 8/1912 | |
| DE | 538578 | | | 11/1931 | |
| DE | 582196 | | | 8/1933 | |
| DE | 1463673 | | | 5/1939 | |
| DE | 856788 | | | 11/1952 | |
| DE | 1703184 | | | 7/1955 | |
| DE | 7237890 | | | 3/1973 | |
| DE | 3222467 | | | 12/1983 | |
| DE | 3515691 | A1 | | 2/1986 | |
| DE | 3515691 | C2 | | 8/1990 | |
| DE | 9309994 | | | 10/1993 | |
| DE | 4243876 | | | 6/1994 | |
| DE | 4304091 | | | 8/1994 | |
| DE | 4341790 | | | 6/1995 | |
| DE | 69108892 | | | 12/1995 | |
| DE | 19505047 | C1 | | 1/1997 | |
| DE | 19615557 | A1 | | 10/1997 | |
| DE | 29809041 | | | 11/1998 | |
| DE | 29809828 | | | 11/1998 | |
| DE | 19853353 | | | 6/2000 | |
| DE | 10011289 | | | 9/2001 | |
| DE | 20112384 | | | 10/2001 | |
| DE | 20106065 | | | 11/2001 | |
| DE | 10100795 | | | 8/2002 | |
| DE | 10218124 | | | 11/2003 | |
| DE | 202005004843 | | | 7/2005 | |
| DE | 102004017702 | | | 10/2005 | |
| DE | 102006016401 | | | 8/2007 | |
| DE | 102005042092 | | | 10/2007 | |
| DE | 202007016874 | | | 2/2008 | |
| DE | 202007019339 | | | 1/2012 | |
| DE | 202012005414 | | | 6/2012 | |
| DE | 102012015471 | | | 2/2014 | |
| DE | 102013100943 | | | 7/2014 | |
| DE | 212013000027 | | | 8/2014 | |
| DE | 102013110501 | | | 3/2015 | |
| DE | 202014009296 | U1 | | 3/2015 | |
| DE | 202015005041 | | | 10/2015 | |
| DE | 202015105689 | | | 11/2015 | |
| DE | 102016105019 | | | 7/2017 | |
| DE | 202016008414 | | | 11/2017 | |
| DE | 202016008435 | | | 12/2017 | |
| DE | 102017104052 | | | 8/2018 | |
| DE | 202017104021 | | | 10/2018 | |
| EP | 0251430 | | | 1/1988 | |
| EP | 0365230 | | | 4/1990 | |
| EP | 472965 | | | 3/1992 | |
| EP | 0503027 | | | 4/1995 | |
| EP | 1477149 | | | 11/2004 | |
| EP | 1554947 | | | 7/2005 | |
| EP | 1143909 | | | 6/2008 | |
| EP | 2042147 | | | 4/2009 | |
| EP | 2645979 | | | 10/2013 | |
| EP | 2674142 | | | 12/2013 | |
| EP | 2712601 | | | 4/2014 | |
| EP | 2777680 | | | 9/2014 | |

(56) References Cited

FOREIGN PATENT DOCUMENTS

| | | | |
|---|---|---|---|
| EP | 2895135 | | 7/2015 |
| EP | 3031438 | | 6/2016 |
| EP | 3260106 | | 12/2017 |
| EP | 3305266 | | 4/2018 |
| EP | 3357383 | | 8/2018 |
| EP | 2976057 | | 12/2018 |
| FR | 2627693 | A1 | 9/1989 |
| FR | 2746639 | | 10/1997 |
| GB | 191018973 | | 11/1910 |
| GB | 1049972 | * | 11/1966 |
| GB | 1060507 | | 3/1967 |
| GB | 1077143 | A | 7/1967 |
| GB | 2137097 | | 10/1984 |
| JP | S4728781 | Y | 8/1972 |
| JP | 52-157289 | | 11/1977 |
| JP | 53135768 | | 11/1978 |
| JP | 53149442 | | 12/1978 |
| JP | S547433 | Y | 4/1979 |
| JP | 54115952 | | 9/1979 |
| JP | 57099986 | | 6/1982 |
| JP | H05037234 | | 5/1993 |
| JP | H6209975 | | 8/1994 |
| JP | 2555943 | | 11/1997 |
| JP | 2000197518 | | 7/2000 |
| JP | 2005288079 | | 10/2005 |
| JP | 2008125577 | | 6/2008 |
| JP | 2011-083423 | | 4/2011 |
| JP | 2011-188921 | A | 9/2011 |
| JP | 2011188921 | | 9/2011 |
| JP | 2017164130 | | 9/2017 |
| KR | 2000-0002800 | | 2/2000 |
| KR | 10-2001-0093088 | | 10/2001 |
| KR | 200439531 | | 4/2008 |
| KR | 20130068426 | | 6/2013 |
| RU | 2014059 | | 6/1994 |
| RU | 2005134513 | | 4/2006 |
| TW | 201507719 | | 3/2015 |
| TW | 201542190 | | 11/2015 |
| TW | 201603797 | | 2/2016 |
| WO | WO9205758 | | 4/1992 |
| WO | 199611767 | | 4/1996 |
| WO | 00/28939 | | 5/2000 |
| WO | 2004004610 | | 1/2004 |
| WO | 2004058134 | | 7/2004 |
| WO | 2005061042 | | 7/2005 |
| WO | 2005099366 | | 10/2005 |
| WO | 2005110331 | | 11/2005 |
| WO | 2006058291 | | 6/2006 |
| WO | 2006063461 | | 6/2006 |
| WO | 2007119034 | | 10/2007 |
| WO | 2007121107 | | 10/2007 |
| WO | 2008002625 | | 1/2008 |
| WO | 2008028076 | | 3/2008 |
| WO | 2008052151 | | 5/2008 |
| WO | 2008107902 | | 9/2008 |
| WO | 2009012172 | | 1/2009 |
| WO | 2009087627 | | 7/2009 |
| WO | 2010149168 | | 12/2010 |
| WO | 2011146948 | | 11/2011 |
| WO | 2012062256 | | 5/2012 |
| WO | 2012152297 | | 11/2012 |
| WO | 2013003954 | | 1/2013 |
| WO | 2013067367 | | 5/2013 |
| WO | 2013134388 | | 9/2013 |
| WO | 2013138658 | | 9/2013 |
| WO | 2013178223 | | 12/2013 |
| WO | 2014008606 | | 1/2014 |
| WO | 2014047718 | | 4/2014 |
| WO | 2014048884 | | 4/2014 |
| WO | 2014081600 | | 5/2014 |
| WO | 2014085736 | | 6/2014 |
| WO | 2014127531 | | 8/2014 |
| WO | 2014131110 | | 9/2014 |
| WO | WO2015039787 | | 3/2015 |
| WO | 2015060717 | | 4/2015 |
| WO | 2015070242 | | 5/2015 |
| WO | 2015096179 | | 7/2015 |
| WO | 2015101790 | | 7/2015 |
| WO | 2016146206 | | 9/2016 |
| WO | 2016162319 | A1 | 10/2016 |
| WO | 2016172653 | | 10/2016 |
| WO | 2017141037 | | 8/2017 |
| WO | 2017158107 | | 9/2017 |
| WO | 2018065540 | | 4/2018 |
| WO | 2018154134 | | 8/2018 |
| WO | 2018158250 | | 9/2018 |
| WO | 2019158240 | | 8/2019 |
| WO | 2019192660 | | 10/2019 |
| WO | 2019192661 | | 10/2019 |
| WO | 2020056208 | | 3/2020 |
| WO | 2020056218 | | 3/2020 |

OTHER PUBLICATIONS

IP Australia, "Notice of Acceptance for Patent Application," issued in connection with Australian Application No. 2017228536, on Jun. 21, 2018, 3 pages.

Sparks et al., "Use of Silicone Materials to Simulate Tissue Biomechanics as Related to Deep Tissue Injury," Advances in Skin & Wound Care; vol. 28 No. 2, Feb. 2015; pp. 59-68, 10 pages.

Wu et al., "Simultaneous determination of the nonlinear-elastic properties of skin and subcutaneous tissue in unconfined compression tests," Skin Research and Technology 2007; 13: pp. 34-42, 9 pages.

Zahouani et al., "Characterization of the mechanical properties of a dermal equivalent compared with human skin in vivo by indentation and static friction tests," Skin Research and Technology 2009; 15: pp. 68-76, 9 pages.

The International Bureau of WIPO, "International Search Report and Written Opinion," issued in connection with International Application No. PCT/EP2015/067017, on Jul. 22, 2016, 34 pages (English translation included).

Linder-Ganz et al., "Assessment of mechanical conditions in sub-dermal tissues during sitting: a combined experimental-MRI and finite element approach," Journal of Biomechanics 40 (2007) pp. 1443-1454, 12 pages.

"valve," Merriam Webster.com, Merriam Webster, 2016, Dec. 26, 2016, 1 pg.

"can," Thefreedictionary.com, The free dictionary by Farlex, 2016, Dec. 26, 2016, 1 pg.

"pump," Merriam Webster.com, Merriam Webster, 2016, Dec. 26, 2016, 1 pg.

United States Patent and Trademark Office, "Notice of Allowance and Fee(s) Due," issued in connection with U.S. Appl. No. 15/023,471, filed May 12, 2017, 10 pages.

United States Patent and Trademark Office, "Non-Final Office action," issued in connection with U.S. Appl. No. 15/302,981, filed Jun. 2, 2017, 17 pages.

United States Patent and Trademark Office, "Non-Final Office action," issued in connection with U.S. Appl. No. 15/487,123, filed Jun. 2, 2017, 16 pages.

United States Patent and Trademark Office, "Final Office action," issued in connection with U.S. Appl. No. 15/354,599, filed Sep. 12, 2017, 47 pages.

United States Patent and Trademark Office, "Final Office action," issued in connection with U.S. Appl. No. 15/487,123, filed Sep. 29, 2017, 7 pages.

United States Patent and Trademark Office, "Notice of Allowance and Fee(s) Due," issued in connection with U.S. Appl. No. 15/302,981, filed Oct. 12, 2017, 5 pages.

United States Patent and Trademark Office, "Restriction Requirement," issued in connection with U.S. Appl. No. 15/719,085, filed Nov. 8, 2017, 6 pages.

United States Patent and Trademark Office, "Supplemental Notice of Allowability," issued in connection with U.S. Appl. No. 15/302,981, filed Nov. 17, 2017, 2 pages.

(56) References Cited

OTHER PUBLICATIONS

United States Patent and Trademark Office, "Notice of Allowance and Fee(s) Due," issued in connection with U.S. Appl. No. 15/487,123, filed Dec. 11, 2017, 5 pages.
United States Patent and Trademark Office, "Non-Final Office action," issued in connection with U.S. Appl. No. 15/354,599, filed Dec. 29, 2017, 46 pages.
United States Patent and Trademark Office, "Non-Final Office action," issued in connection with U.S. Appl. No. 15/719,085, filed Jan. 25, 2018, 15 pages.
United States Patent and Trademark Office, "Corrected Notice of Allowability," issued in connection with U.S. Appl. No. 15/487,123, filed Mar. 13, 2018, 2 pages.
United States Patent and Trademark Office, "Notice of Allowance and Fee(s) Due," issued in connection with U.S. Appl. No. 15/719,085, filed Dec. 12, 2018, 11 pages.
United States Patent and Trademark Office, "Supplemental Notice of Allowability," issued in connection with U.S. Appl. No. 15/719,085, filed Jan. 11, 2019, 9 pages.
IP Australia, "Examination Report No. 2 for Standard Patent Application," issued in connection with Australian Application No. 2018200852, on Dec. 19, 2018, 4 pages.
International Searching Authority, "International Search Report and Written Opinion," issued in connection with International Application No. PCT/EP2018/082681, on Jan. 30, 2019, 21 pages (includes English translation of pp. 13 to 17).
United States Patent and Trademark Office, "Notice of Allowance," issued in connection with U.S. Appl. No. 15/719,085, filed Mar. 20, 2019, 12 pages.
China National Intellectual Property Administration, "First Office Action," issued in connection with Chinese Application No. 201710927530.4, on Mar. 25, 2019, 5 pages (English translation included).
German Patent and Trademark Office, "Examination Report," issued in connection with German Application No. 10 2016 118 911.1, on Nov. 4, 2016, 10 pages (English translation included).
Zimmerman et al., "The Gentle Touch Receptors of Mammalian Skin," Special Section: Skin, Science, Nov. 21, 2014, vol. 346, Issue 6212, 6 pages.
Verkauf et al., "Clitoral Size in Normal Women," Obstetrics & Gynecology, vol. 80, No. 1, Jul. 1992, 4 pages.
International Searching Authority, "Written Opinion," issued in connection with International Application No. PCT/EP2017/075400, on May 18, 2018, 10 pages.
International Searching Authority, "International Search Report," issued in connection with International Application No. PCT/EP2017/075400, on May 18, 2018, 6 pages.
*EIS, Inc.* v. *Wow Tech International GmbH*, "Memorandum Opinion," issued by the United States District Court for the District of Delaware in connection with Case No. 1:19-cv-01227-LPS on Nov. 30, 2020, 26 pages.
*EIS, Inc.* v. *Wow Tech International GmbH*, "Second Amended Complaint," filed with the United States District Court for the District of Delaware in connection with Case No. 1:19-cv-01227-LPS on Dec. 22, 2020, 748 pages. (Uploaded in two parts.).
European Patent Office, "Notification under Article 94 (3) EPC," issued in connection with European Application No. 18206800.7, on Nov. 12, 2020, 10 pages. (English translation included.).
"Notification of an Opposition," issued by the European Patent Office in connection with European Patent No. EP3405158 on Oct. 5, 2020, opposition filed by EIS GmbH, 88 pages (includes English translation).
Mexican Institute of IP, "First Office Action," issued in connection with Mexican Patent Application No. MX/a/2017/012780, dated Jan. 8, 2021, 5 pages (includes English translation).
"Patent Owner's Sur-Reply Pursuant to 37 C.F.R. 42.23," filed with the United States Patent and Trademark Office in connection with Case IPR2019-01444 on Mar. 9, 2021, 38 pages.
"Patent Owner's Sur-Reply Pursuant to 37 C.F.R. 42.23, Exhibit 2061," filed with the United States Patent and Trademark Office in connection with Case IPR2019-01444 on Mar. 9, 2021, 39 pages.
"Petitioner's Reply to Patent Owner's Response," filed with the United States Patent and Trademark Office in connection with Case IPR2020-00007 on Mar. 12, 2021, 39 pages.
"Petitioner's Reply to Patent Owner's Response, Exhibit 1014" filed with the United States Patent and Trademark Office in connection with Case IPR2020-00007 on Mar. 12, 2021, 177 pages.
"Petitioner's Reply to Patent Owner's Response, Exhibit 1017" filed with the United States Patent and Trademark Office in connection with Case IPR2020-00007 on Mar. 12, 2021, 192 pages.
"Petitioner's Reply to Patent Owner's Response, Exhibit 1018" filed with the United States Patent and Trademark Office in connection with Case IPR2020-00007 on Mar. 12, 2021, 74 pages.
"Petitioner's Reply to Patent Owner's Response, Exhibit 1020" filed with the United States Patent and Trademark Office in connection with Case IPR2020-00007 on Mar. 12, 2021, 42 pages.
"Petitioner's Reply to Patent Owner's Response, Exhibit 1036" filed with the United States Patent and Trademark Office in connection with Case IPR2020-00007 on Mar. 12, 2021, 7 pages.
"Petitioner's Reply to Patent Owner's Response, Exhibit 1037" filed with the United States Patent and Trademark Office in connection with Case IPR2020-00007 on Mar. 12, 2021, 3 pages.
"Petitioner's Reply to Patent Owner's Response, Exhibit 1043" filed with the United States Patent and Trademark Office in connection with Case IPR2020-00007 on Mar. 12, 2021, 8 pages.
IP Australia, "Opposition—Section 104 Amendments," issued in connection with Australian Patent Application No. 2018203659 on Mar. 23, 2021, 6 pages.
"Opponent's Reply," filed with the European Patent Office by Fun Factory GmbH in connection with European Patent No. EP2976057 on Apr. 9, 2021, 233 pages (includes English translation).
"Opponent's Reply, Exhibit A2," filed with the European Patent Office by Fun Factory GmbH in connection with European Patent No. EP2976057 on Apr. 9, 2021, 24 pages (includes English translation).
"Opponent's Reply, Exhibit D34," filed with the European Patent Office by Fun Factory GmbH in connection with European Patent No. EP2976057 on Apr. 9, 2021, 1 page.
"Opponent's Reply, Exhibit D35," filed with the European Patent Office by Fun Factory GmbH in connection with European Patent No. EP2976057 on Apr. 9, 2021, 10 pages (includes English translation).
"Opponent's Reply, Exhibit E4," filed with the European Patent Office by Fun Factory GmbH in connection with European Patent No. EP2976057 on Apr. 9, 2021, 7 pages (includes English translation).
"Opponent's Reply," filed with the European Patent Office by Fun Factory GmbH in connection with European Patent No. EP3308762 on Apr. 9, 2021, 119 pages (includes English translation).
"Opponent's Reply," filed with the European Patent Office by EIS GmbH in connection with European Patent No. EP3308762 on Apr. 9, 2021, 111 pages (includes English translation).
Patent Owner's Sur-Reply Pursuant to 37 C.F.R. 42.23, filed with the United States Patent and Trademark Office in connection with Case IPR2020-00007 on Apr. 23, 2021, 40 pages.
"Opposition to a European Patent," filed with the European Patent Office by Fun Factory GmbH in connection with European Patent No. EP3305266 on Feb. 11, 2021, 138 pages (includes English translation).
"Opposition to a European Patent, Exhibit D15" filed with the European Patent Office by Fun Factory GmbH in connection with European Patent No. EP3305266 on Feb. 11, 2021, 62 pages (includes English translation).
"Opposition to a European Patent," filed with the European Patent Office by EIS GmbH in connection with European Patent No. EP3305266 on Feb. 15, 2021, 199 pages (includes English translation).
"Opposition to a European Patent, Exhibit E36" filed with the European Patent Office by EIS GmbH in connection with European Patent No. EP3305266 on Feb. 15, 2021, 2 pages.

(56) References Cited

OTHER PUBLICATIONS

"Statement of Grounds and Particulars of Opposition," filed with IP Australia in connection with Australian Patent Application No. 2018222907 on Feb. 24, 2021, 15 pages.
"Evidence in Support," filed with IP Australia by EIS GmbH in connection with Australian Patent Application No. 2018222907 on May 18, 2021, 53 pages.
Canadian Patent Office, "Office Action," issued in connection with Canadian Application No. 2,978,739, on Jan. 25, 2018, 5 pages.
European Patent Office, "Message," issued in connection with opposition of European Patent No. EP3308762 on Jun. 4, 2021, 40 pages (includes English translation).
European Patent Office, "Message," issued in connection with opposition of European Patent No. EP2976057 on Jun. 1, 2021, 35 pages (includes English translation).
United States Patent and Trademark Office, "Judgment, Final Written Decision," issued in connection with Case IPR2019-01302 on Jun. 14, 2021, 75 pages.
United States Patent and Trademark Office, "Final Office Action," issued in connection with U.S. Appl. No. 15/965,117, filed Dec. 6, 2018, 14 pages.
United States Patent and Trademark Office, "Final Office Action," issued in connection with U.S. Appl. No. 15/965,208, filed Dec. 10, 2018, 18 pages.
United States Patent and Tradmark Office, "Non-Final Office action," issued in connection with U.S. Appl. No. 15/354,599, filed Nov. 13, 2018, 34 pages.
New Zealand Intellectual Property Office, "Further Examination Report," issued in connection with NZ Application No. 735229, on Aug. 23, 2018, 4 pages.
Singapore Patent Office, "Written Opinion," issued in connection with Singapore Application No. 11201707395T, on Jul. 24, 2018, 8 pages.
"Statement of Grounds and Particulars of Opposition," filed with the Australian Patent Office in connection with Australian Patent Application No. 2015386680 on Sep. 21, 2018, 11 pages.
Taiwan Patent Office, "English Translation of Office Action," issued in connection with Taiwanese Application No. 106132654, on Aug. 9, 2018, 3 pages.
United States Patent and Trademark Office, "Non-Final Office action," issued in connection with U.S. Appl. No. 15/719,085, filed Aug. 31, 2018, 17 pages.
European Patent Office, "Search Report," issued in connection with European Application No. 17190856, on Apr. 27, 2018, 9 pages (includes English translation).
Singapore Patent Office, "Search Report and Written Opinion," issued in connection with Singapore Application No. 10201707736X, on May 18, 2018, 9 pages.
"Minutes of the Public Hearing in Opposition Proceedings Before the Patent Division 44 of the German Patent and Trademark Office," issued in connection with opposition of German Patent No. 102013110501.7, Apr. 17, 2018, 6 pages (includes English translation).
*EIS, Inc.* v. *Wow Tech International GmbH*, et al., "First Amended Complaint," filed with the United States District Court for the District of Delaware, case No. 1:19-cv-01227-LPS, Sep. 9, 2019, 40 pages.
*EIS, Inc.* v. *Wow Tech International GmbH*, et al., "First Amended Complaint—Exhibits 1-31," filed with the United States District Court for the District of Delaware, case No. 1:19-cv-01227-LPS, Sep. 9, 2019, 527 pages.
"Petition for Inter Partes Review of U.S. Pat. No. 9,849,061," filed with the United States Patent and Trademark Office on Oct. 2, 2019, 97 pages.
"Petition for Inter Partes Review of U.S. Pat. No. 9,849,061," Exhibit 1001, filed with the United States Patent and Trademark Office on Oct. 2, 2019, 18 pages.
"Petition for Inter Partes Review of U.S. Pat. No. 9,849,061," Exhibit 1002, filed with the United States Patent and Trademark Office on Oct. 2, 2019, 137 pages. (Uploaded in 5 parts).
"Petition for Inter Partes Review of U.S. Pat. No. 9,849,061," Exhibit 1003, filed with the United States Patent and Trademark Office on Oct. 2, 2019, 1,367 pages. (Uploaded in 5 parts).
"Petition for Inter Partes Review of U.S. Pat. No. 9,849,061," Exhibit 1004, filed with the United States Patent and Trademark Office on Oct. 2, 2019, 9 pages.
"Petition for Inter Partes Review of U.S. Pat. No. 9,849,061," Exhibit 1006, filed with the United States Patent and Trademark Office on Oct. 2, 2019, 34 pages.
"Petition for Inter Partes Review of U.S. Pat. No. 9,849,061," Exhibit 1007, filed with the United States Patent and Trademark Office on Oct. 2, 2019, 22 pages.
"Petition for Inter Partes Review of U.S. Pat. No. 9,849,061," Exhibit 1008, filed with the United States Patent and Trademark Office on Oct. 2, 2019, 40 pages.
"Petition for Inter Partes Review of U.S. Pat. No. 9,849,061," Exhibit 1010, filed with the United States Patent and Trademark Office on Oct. 2, 2019, 5 pages.
"Petition for Inter Partes Review of U.S. Pat. No. 9,849,061," Exhibit 1011, filed with the United States Patent and Trademark Office on Oct. 2, 2019, 17 pages.
"Petition for Inter Partes Review of U.S. Pat. No. 9,849,061," Exhibit 1012, filed with the United States Patent and Trademark Office on Oct. 2, 2019, 61 pages.
"Petition for Inter Partes Review of U.S. Pat. No. 9,849,061," Exhibit 1013, filed with the United States Patent and Trademark Office on Oct. 2, 2019, 46 pages.
"Notification of an Opposition," issued by the European Patent Office in connection with European Patent No. EP2976057 on Sep. 12, 2019, opposition filed by EIS GmbH, 132 pages (includes English translation).
"Notification of an Opposition," issued by the European Patent Office in connection with European Patent No. EP2976057 on Sep. 10, 2019, opposition filed by Fun Factory Ltd., 117 pages (includes English translation).
"Notification of an Opposition," issued by the European Patent Office in connection with European Patent No. EP2976057 on Sep. 12, 2019, opposition filed by Hu Xiaorong, 35 pages (includes English translation).
"Opposition to a European Patent," filed with the European Patent Office by EIS GmbH in connection with European Patent No. EP3308762 on Sep. 11, 2019, 95 pages (includes English translation).
"Opposition to a European Patent," filed with the European Patent Office by Fun Factory Ltd. in connection with European Patent No. EP3308762 on Sep. 11, 2019, 124 pages (includes English translation).
IP Australia, "Examination Report," issued in connection with Australian Application No. 2018222907 on Sep. 3, 2019, 4 pages.
IP Australia, "Examination Report," issued in connection with Australian Application No. 2019201070 on Jul. 9, 2019, 4 pages.
Korean Patent Office, "Office Action," issued in connection with Korean Application No. 10-2017-0129112 on Aug. 29, 2019, 9 pages (includes English summary of Office action).
Korean Patent Office, "Office Action," issued in connection with Korean Application No. 10-2017-7028845 on Sep. 18, 2019, 7 pages (includes English summary of Office action).
European Patent Office, "Notice of Submission of Third Party Observation," issued in connection with European Application No. EP17202394.7 on Jul. 9, 2019, 5 pages.
"Opposition Document," filed in connection with opposition of German Patent No. 102013110501.7 on Jan. 24, 2018, 69 pages (includes English translation).
*EIS, Inc.* v. *Wow Tech International GmbH*, et al., "Defendants' Consolidated Motion to Dismiss EIS, Inc.'s Complaint Pursuant to Federal Rules of Civil Procedure 12(B)(2) and 12(b)(6)," filed with the United States District Court for the District of Delaware in connection with Case No. 1:19-cv-1277-LPS on Oct. 2, 2019, 3 pages.
United States Patent and Trademark Office, "Corrected Notice of Allowability," issued in connection with U.S. Appl. No. 15/354,599, filed Nov. 12, 2019, 2 pages.

(56) References Cited

OTHER PUBLICATIONS

German Patent and Trademark Office, "English Translation of Invitation to Speak," issued in connection with opposition of German Patent No. 102013110501.7 on Nov. 17, 2016, 20 pages.
"English Translation of Patentee Submission," filed with the German Patent and Trademark Office in connection with opposition of German Patent No. 102013110501.7 on Sep. 18, 2017, 38 pages.
"English Translation of Submission of Opponent," filed with the German Patent and Trademark Office in connection with opposition of German Patent No. 102013110501.7 on Oct. 5, 2017, 6 pages.
"English Translation of Submission of Opponent," filed with the German Patent and Trademark Office in connection with opposition of German Patent No. 102013110501.7 on Nov. 13, 2017, 8 pages.
German Patent and Trademark Office, "English Translation of Summons to Attend Oral Proceedings," issued in connection with opposition of German Patent No. 102013110501.7 on Nov. 28, 2017, 3 pages.
"English Translation of Patentee Submission," filed with the German Patent and Trademark Office in connection with opposition of German Patent No. 102013110501.7 on Jan. 30, 2018, 5 pages.
German Patent and Trademark Office, "English Translation of Additions to Summons," issued in connection with opposition of German Patent No. 102013110501.7 on Nov. 24, 2017, 1 page.
German Patent and Trademark Office, "English Translation of Summons to Attend Oral Proceedings," issued in connection with opposition of German Patent No. 102013110501.7 on Feb. 2, 2018, 3 pages.
"English Translation of Opponent Submission," filed with the German Patent and Trademark Office in connection with opposition of German Patent No. 102013110501.7 on Mar. 14, 2018, 5 pages.
"English Translation of Patentee Submission," filed with the German Patent and Trademark Office in connection with opposition of German Patent No. 102013110501.7 on Apr. 3, 2018, 2 pages.
"English Translation of Patentee Submission," filed with the German Patent and Trademark Office, in connection with opposition of German Patent No. 102013110501.7 on Apr. 12, 2018, 45 pages.
"English Translation of Auxiliary Request 1," filed with the German Patent and Trademark Office in connection with opposition of German Patent No. 2013110501.7 on Apr. 16, 2018, 5 pages.
"English Translation of Auxiliary Request 2," filed with the German Patent and Trademark Office in connection with opposition of German Patent No. 2013110501.7 on Apr. 16, 2018, 6 pages.
"English Translation of Auxiliary Request 3," filed with the German Patent and Trademark Office in connection with opposition of German Patent No. 2013110501.7 on Apr. 16, 2018, 5 pages.
*Novoluto GmbH* v. *EIS GmbH*, "Judgment," issued by the German Court in connection with German litigation proceeding on Dec. 14, 2017, 71 pages (includes English translation).
*Novoluto GmbH* v. *EIS GmbH*, "Transcript," filed with the German Court in connection German litigation proceeding on Jul. 20, 2017, 44 pages (includes English translation).
*Novoluto GmbH* v. *EIS GmbH*, "Complaint," filed the German Court in connection German litigation proceeding on Aug. 5, 2016, 75 pages (includes English translation).
United States Patent and Trademark Office, "Notice of Filing Date Accorded to Petition and Time for Filing Patent Owner Preliminary Response," issued in connection with Case IPR2019-01302 on Jul. 18, 2019, 5 pages.
"Patent Owner's Amended Mandatory Notices Pursuant to 37 C.F.R. 42.8," filed with the United States Patent and Trademark Office in connection with Case IPR2019-01302 on Sep. 3, 2019, 6 pages.
"Patent Owner's Amended Mandatory Notices Pursuant to 37 C.F.R. 42.8," filed with the United States Patent and Trademark Office in connection with Case IPR2019-01302 on Sep. 30, 2019, 6 pages.
"Patent Owner's Amended Mandatory Notices Pursuant to 37 C.F.R. 42.8," filed with the United States Patent and Trademark Office in connection with Case IPR2019-01302 on Oct. 18, 2019, 6 pages.
"Patent Owner's Mandatory Notices," filed with the United States Patent and Trademark Office in connection with Case IPR2019-01302 on Jul. 24, 2019, 4 pages.
"Patent Owner's Updated Mandatory Notices," filed with the United States Patent and Trademark Office in connection with Case IPR2019-01302 on Aug. 21, 2019, 4 pages.
"Petitioner's Amended Mandatory Notices Pursuant to 37 C.F.R. 42.8," filed with the United States Patent and Trademark Office in connection with Case IPR2019-01302 on Oct. 8, 2019, 5 pages.
"Patent Owner's Preliminary Response Pursuant to 37 C.F.R. § 42.107," filed with the United States Patent and Trademark Office in connection with Case IPR2019-01302 on Oct. 18, 2019, 85 pages.
"Patent Owner's Preliminary Response Pursuant to 37 C.F.R. § 42.107," Exhibit 2001, filed with the United States Patent and Trademark Office in connection with Case IPR2019-01302 on Oct. 18, 2019, 80 pages.
"Patent Owner's Preliminary Response Pursuant to 37 C.F.R. § 42.107," Exhibit 2002, filed with the United States Patent and Trademark Office in connection with Case IPR2019-01302 on Oct. 18, 2019, 30 pages.
"Patent Owner's Preliminary Response Pursuant to 37 C.F.R. § 42.107," Exhibit 2003, filed with the United States Patent and Trademark Office in connection with Case IPR2019-01302 on Oct. 18, 2019, 18 pages.
"Patent Owner's Preliminary Response Pursuant to 37 C.F.R. § 42.107," Exhibit 2004, filed with the United States Patent and Trademark Office in connection with Case IPR2019-01302 on Oct. 18, 2019, 47 pages.
"Patent Owner's Preliminary Response Pursuant to 37 C.F.R. § 42.107," Exhibit 2005, filed with the United States Patent and Trademark Office in connection with Case IPR2019-01302 on Oct. 18, 2019, 60 pages.
"Patent Owner's Preliminary Response Pursuant to 37 C.F.R. § 42.107," Exhibit 2006, filed with the United States Patent and Trademark Office in connection with Case IPR2019-01302 on Oct. 18, 2019, 19 pages.
"Patent Owner's Preliminary Response Pursuant to 37 C.F.R. § 42.107," Exhibit 2007, filed with the United States Patent and Trademark Office in connection with Case IPR2019-01302 on Oct. 18, 2019, 16 pages.
"Patent Owner's Preliminary Response Pursuant to 37 C.F.R. § 42.107," Exhibit 2008, filed with the United States Patent and Trademark Office in connection with Case IPR2019-01302 on Oct. 18, 2019, 10 pages.
"Patent Owner's Preliminary Response Pursuant to 37 C.F.R. § 42.107," Exhibit 2009, filed with the United States Patent and Trademark Office in connection with Case IPR2019-01302 on Oct. 18, 2019, 12 pages.
"Patent Owner's Preliminary Response Pursuant to 37 C.F.R. § 42.107," Exhibit 2010, filed with the United States Patent and Trademark Office in connection with Case IPR2019-01302 on Oct. 18, 2019, 9 pages.
"Patent Owner's Preliminary Response Pursuant to 37 C.F.R. § 42.107," Exhibit 2011, filed with the United States Patent and Trademark Office in connection with Case IPR2019-01302 on Oct. 18, 2019, 2 pages.
"Patent Owner's Preliminary Response Pursuant to 37 C.F.R. § 42.107," Exhibit 2012, filed with the United States Patent and Trademark Office in connection with Case IPR2019-01302 on Oct. 18, 2019, 7 pages.
"Patent Owner's Preliminary Response Pursuant to 37 C.F.R. § 42.107," Exhibit 2013, filed with the United States Patent and Trademark Office in connection with Case IPR2019-01302 on Oct. 18, 2019, 4 pages.
"Patent Owner's Preliminary Response Pursuant to 37 C.F.R. § 42.107," Exhibit 2014, filed with the United States Patent and Trademark Office in connection with Case IPR2019-01302 on Oct. 18, 2019, 77 pages.
"Patent Owner's Preliminary Response Pursuant to 37 C.F.R. § 42.107," Exhibit 2015, filed with the United States Patent and Trademark Office in connection with Case IPR2019-01302 on Oct. 18, 2019, 76 pages.

(56) References Cited

OTHER PUBLICATIONS

"Patent Owner's Preliminary Response Pursuant to 37 C.F.R. § 42.107," Exhibit 2016, filed with the United States Patent and Trademark Office in connection with Case IPR2019-01302 on Oct. 18, 2019, 169 pages.
"Patent Owner's Preliminary Response Pursuant to 37 C.F.R. § 42.107," Exhibit 2017, filed with the United States Patent and Trademark Office in connection with Case IPR2019-01302 on Oct. 18, 2019, 40 pages.
"Patent Owner's Preliminary Response Pursuant to 37 C.F.R. § 42.107," Exhibit 2018, filed with the United States Patent and Trademark Office in connection with Case IPR2019-01302 on Oct. 18, 2019, 15 pages.
"Patent Owner's Preliminary Response Pursuant to 37 C.F.R. § 42.107," Exhibit 2019, filed with the United States Patent and Trademark Office in connection with Case IPR2019-01302 on Oct. 18, 2019, 8 pages.
"Patent Owner's Preliminary Response Pursuant to 37 C.F.R. § 42.107," Exhibit 2020, filed with the United States Patent and Trademark Office in connection with Case IPR2019-01302 on Oct. 18, 2019, 11 pages.
"Patent Owner's Preliminary Response Pursuant to 37 C.F.R. § 42.107," Exhibit 2021, filed with the United States Patent and Trademark Office in connection with Case IPR2019-01302 on Oct. 18, 2019, 25 pages.
"Patent Owner's Preliminary Response Pursuant to 37 C.F.R. § 42.107," Exhibit 2022, filed with the United States Patent and Trademark Office in connection with Case IPR2019-01302 on Oct. 18, 2019, 97 pages.
"Patent Owner's Preliminary Response Pursuant to 37 C.F.R. § 42.107," Exhibit 2023, filed with the United States Patent and Trademark Office in connection with Case IPR2019-01302 on Oct. 18, 2019, 4 pages.
"Patent Owner's Preliminary Response Pursuant to 37 C.F.R. § 42.107," Exhibit 2024, filed with the United States Patent and Trademark Office in connection with Case IPR2019-01302 on Oct. 18, 2019, 7 pages.
"Patent Owner's Preliminary Response Pursuant to 37 C.F.R. § 42.107," Exhibit 2025, filed with the United States Patent and Trademark Office in connection with Case IPR2019-01302 on Oct. 18, 2019, 1 page.
Maria M. Kettenring, "Erotische Partnermassage", Grafe und User Publishers, 2004, 5 pages (includes English summary).
"Gesundheitsminister. Mehr Sex gegen Bluthochdruck," http://www.heilpraxisnet.delnaturheilpraxis/sex-gegen-bluthochdruck-665.php, Apr. 2010, 2 pages (English translation included).
Beate Lakotta, "Schmerz und Gluckseligkeit, Der Spiegel", pp. 136-138, Jun. 2006, 7 pages (English translation included).
"Sex hilflt gegen Erkaltung," Focus Online, Dec. 5, 2004; 2 pages (English translation included).
Gillan et al., "Vaginal and Pelvic Floor Responses to Sexual Stimulation," Psychophysiology, vol. 16, No. 5 (Sep. 1979), pp. 471-481, 12 pages.
IP Australia, "Examination Report," issued in connection with Australian Application No. 2017228536, on Dec. 20, 2017, 5 pages.
New Zealand Intellectual Property Office, "Office Action," issued in connection with NZ Application No. 735370, on Mar. 1, 2018, 5 pages.
European Patent Office, "Announcement According to Article 94 (3) EPU," issued in connection with European Application No. 14741640.8, on Mar. 8, 2018, 12 pages (includes English translation).
United States Patent and Trademark Office, "Non-Final Office action," issued in connection with U.S. Appl. No. 15/023,471, filed Aug. 26, 2016, 26 pages.
United States Patent and Trademark Office, "Final Office action," issued in connection with U.S. Appl. No. 15/023,471, filed Jan. 6, 2017, 28 pages.
United States Patent and Trademark Office, "Non-final Office action," issued in connection with U.S. Appl. No. 15/354,599, filed Feb. 24, 2017, 38 pages.
United States Patent and Trademark Office, "Non-Final Office action," issued in connection with U.S. Appl. No. 15/888,568, filed Jan. 10, 2019, 15 pages.
United States Patent and Trademark Office, "Final Office Action," issued in connection with U.S. Appl. No. 15/888,568, filed Oct. 29, 2019, 7 pages.
United States Patent and Trademark Office, "Final Office Action," issued in connection with U.S. Appl. No. 15/888,568, dated Apr. 16, 2020, 7 pages.
United States Patent and Trademark Office, "Notice of Allowance," issued in connection with U.S. Appl. No. 15/888,568, dated Feb. 8, 2021, 8 pages.
United States Patent and Trademark Office, "Restriction Requirement" issued in connection with U.S. Appl. No. 16/752,283, dated Apr. 19, 2022, 6 pages.
United States Patent and Trademark Office, "Notice of Allowance," issued in connection with U.S. Appl. No. 15/888,568, dated May 11, 2022, 8 pages.
International Searching Authority, "Partial International Search Report," issued in connection with International Application No. PCT/EP2017/075400, on Mar. 6, 2018, 46 pages (includes English translation).
International Searching Authority, "Partial International Search Report," issued in connection with International Application No. PCT/EP2017/075399, on Mar. 1, 2018, 34 pages (includes English translation).
International Searching Authority, "International Search Report," issued in connection with International Application No. PCT/DE2019/100309, on Jul. 15, 2019, 7 pages (includes English translation).
International Searching Authority, "Written Opinion," issued in connection with International Application No. PCT/DE2019/100309, on Jul. 15, 2019, 13 pages (includes English translation).
International Searching Authority, "International Search Report," issued in connection with International Application No. PCT/DE2019/100860, on Dec. 18, 2019, 6 pages (includes English machine translation).
*EIS Inc.* v. *IntiHealth Ger GmbH* et al., "Joint Claim Construction Chart," filed with the United States District Court for the District of Delaware, case No. 1:19-cv-01227-VAC-MPT, Mar. 23, 2022, 13 pages.
*EIS Inc.* v. *IntiHealth Ger GmbH* et al., "Appendix to Joint Claim Construction Chart," filed with the United States District Court for the District of Delaware, case No. 1:19-cv-01227-VAC-MPT, Mar. 23, 2022, 267 pages (uploaded in two parts).
"Grounds of Appeal," filed with the European Patent Office by Fun Factory GmBH in connection with European Patent No. EP2976057 on Jan. 3, 2022, 203 pages (includes English translation).
"Grounds of Appeal," filed with the European Patent Office by EIS GmBH in connection with European Patent No. EP2976057 on Jan. 3, 2022, 279 pages (includes English translation).
"Grounds of Appeal, Exhibit B1a" filed with the European Patent Office by EIS GmBH in connection with European Patent No. EP2976057 on Jan. 3, 2022, 2 pages (includes English translation).
"Grounds of Appeal, Exhibit D41" filed with the European Patent Office by EIS GmBH in connection with European Patent No. EP2976057 on Jan. 3, 2022, 2 pages (includes English translation).
"Grounds of Appeal, Exhibit D42" filed with the European Patent Office by EIS GmBH in connection with European Patent No. EP2976057 on Jan. 3, 2022, 18 pages (includes English translation).
"Grounds of Appeal, Exhibit D43" filed with the European Patent Office by EIS GmBH in connection with European Patent No. EP2976057 on Jan. 3, 2022, 12 pages (includes English translation).
"Grounds of Appeal, Exhibit D44" filed with the European Patent Office by EIS GmBH in connection with European Patent No. EP2976057 on Jan. 3, 2022, 11 pages (includes English translation).
"Grounds of Appeal, Exhibit D45" filed with the European Patent Office by EIS GmBH in connection with European Patent No. EP2976057 on Jan. 3, 2022, 4 pages (includes English translation).
"Grounds of Appeal, Exhibit D46" filed with the European Patent Office by EIS GmBH in connection with European Patent No. EP2976057 on Jan. 3, 2022, 13 pages.

(56) References Cited

OTHER PUBLICATIONS

"Grounds of Appeal, Exhibit D47" filed with the European Patent Office by EIS GmBH in connection with European Patent No. EP2976057 on Jan. 3, 2022, 3 pages.
"Grounds of Appeal, Exhibit D48" filed with the European Patent Office by EIS GmBH in connection with European Patent No. EP2976057 on Jan. 3, 2022, 4 pages (includes English translation).
"Grounds of Appeal, Exhibit D49" filed with the European Patent Office by EIS GmBH in connection with European Patent No. EP2976057 on Jan. 3, 2022, 4 pages (includes English translation).
"Grounds of Appeal," filed with the European Patent Office by Fun Factory GmBH in connection with European Patent No. EP3308762 on Jan. 3, 2022, 198 pages (includes English translation).
"Grounds of Appeal," filed with the European Patent Office by EIS GmBH in connection with European Patent No. EP3308762 on Jan. 3, 2022, 270 pages (includes English translation).
"Grounds of Appeal, Exhibit B1a" filed with the European Patent Office by EIS GmBH in connection with European Patent No. EP3308762 on Jan. 3, 2022, 2 pages (includes English translation).
"Grounds of Appeal, Exhibit D40" filed with the European Patent Office by EIS GmBH in connection with European Patent No. EP3308762 on Jan. 3, 2022, 4 pages (includes English translation).
"Grounds of Appeal, Exhibit D41" filed with the European Patent Office by EIS GmBH in connection with European Patent No. EP3308762 on Jan. 3, 2022, 4 pages (includes English translation).
"Grounds of Appeal, Exhibit D42" filed with the European Patent Office by EIS GmBH in connection with European Patent No. EP3308762 on Jan. 3, 2022, 4 pages (includes English translation).
"Accompanying Letter for Later Submitted Documents" filed with the European Patent Office by Fun Factory GmbH in connection with European Patent No. EP2976057 on Mar. 2, 2022, 24 pages (includes English translation).
"Accompanying Letter for Later Submitted Documents, Exhibits 50 and 50a" filed with the European Patent Office by Fun Factory GmbH in connection with European Patent No. EP2976057 on Mar. 2, 2022, 48 pages.
"Accompanying Letter for Later Submitted Documents" filed with the European Patent Office by Fun Factory GmbH in connection with European Patent No. EP3308762 on Mar. 2, 2022, 24 pages (includes English translation).
"Accompanying Letter for Later Submitted Documents, Exhibits 43 and 43a" filed with the European Patent Office by Fun Factory GmbH in connection with European Patent No. EP3308762 on Mar. 2, 2022, 48 pages.
"Notification of an Opposition," issued by the European Patent Office in connection with European Patent No. EP3685809 on Mar. 4, 2022, opposition filed by EIS GmbH, 179 pages (includes English translation).
"Follow-up to Statement of Complaint," filed with the European Patent Office by EIS GmBH in connection with European Patent No. EP2976057 on Apr. 26, 2022, 47 pages (includes English translation).
"Follow-up to Statement of Complaint, Exhibit D51," filed with the European Patent Office by EIS GmbH in connection with European Patent No. EP2976057 on Apr. 26, 2022, 17 pages (includes English translation).
"Follow-up to Statement of Complaint, Exhibit B4," filed with the European Patent Office by EIS GmbH in connection with European Patent No. EP2976057 on Apr. 26, 2022, 14 pages (includes English translation).
"Follow-up to Statement of Complaint," filed with the European Patent Office by EIS GmbH in connection with European Patent No. EP3308762 on Apr. 26, 2022, 46 pages (includes English translation).
"Follow-up to Statement of Complaint, Exhibit D44," filed with the European Patent Office by EIS GmbH in connection with European Patent No. EP3308762 on Apr. 26, 2022, 17 pages (includes English translation).
"Follow-up to Statement of Complaint, Exhibit B4," filed with the European Patent Office by EIS GmbH in connection with European Patent No. EP3308762 on Apr. 26, 2022, 18 pages (includes English translation).
United States Patent and Trademark Office, "Notice of Filing Date Accorded to Petition and Time for Filing Patent Owner Preliminary Response," issued in connection with Case IPR2019-01444 on Aug. 14, 2019, 6 pages.
"Patent Owner's Amended Mandatory Notices Pursuant to 37 C.F.R. 42.8," filed with the United States Patent and Trademark Office in connection with case IPR2019-01444 on Aug. 26, 2019, 6 pages.
"Patent Owner's Amended Mandatory Notices Pursuant to 37 C.F.R. 42.8," filed with the United States Patent and Trademark Office in connection with case IPR2019-01444 on Sep. 30, 2019, 6 pages.
"Patent Owner's Amended Mandatory Notices Pursuant to 37 C.F.R. 42.8," filed with the United States Patent and Trademark Office in connection with case IPR2019-01444 on Oct. 23, 2019, 6 pages.
"Patent Owner's Mandatory Notices," filed with the United States Patent and Trademark Office in connection with case IPR2019-01444 on Aug. 21, 2019, 5 pages.
"Petitioner's Amended Mandatory Notices," filed with the United States Patent and Trademark Office in connection with case IPR2019-01444 on Oct. 8, 2019, 5 pages.
"Patent Owner's Preliminary Response Pursuant to 37 C.F.R. § 42.107," filed with the United States Patent and Trademark Office in connection with case IPR2019-01444 on Nov. 14, 2019, 88 pages.
"Patent Owner's Preliminary Response Pursuant to 37 C.F.R. § 42.107," Exhibit 2001, filed with the United States Patent and Trademark Office in connection with Case IPR2019-01444 on Nov. 14, 2019, 81 pages.
"Patent Owner's Preliminary Response Pursuant to 37 C.F.R. § 42.107," Exhibit 2002, filed with the United States Patent and Trademark Office in connection with Case IPR2019-01444 on Nov. 14, 2019, 36 pages.
"Patent Owner's Preliminary Response Pursuant to 37 C.F.R. § 42.107," Exhibit 2003, filed with the United States Patent and Trademark Office in connection with Case IPR2019-01444 on Nov. 14, 2019, 18 pages.
"Patent Owner's Preliminary Response Pursuant to 37 C.F.R. § 42.107," Exhibit 2004, filed with the United States Patent and Trademark Office in connection with Case IPR2019-01444 on Nov. 14, 2019, 97 pages.
"Patent Owner's Preliminary Response Pursuant to 37 C.F.R. § 42.107," Exhibit 2005, filed with the United States Patent and Trademark Office in connection with Case IPR2019-01444 on Nov. 14, 2019, 61 pages.
"Patent Owner's Preliminary Response Pursuant to 37 C.F.R. § 42.107," Exhibit 2006, filed with the United States Patent and Trademark Office in connection with Case IPR2019-01444 on Nov. 14, 2019, 60 pages.
"Patent Owner's Preliminary Response Pursuant to 37 C.F.R. § 42.107," Exhibit 2007, filed with the United States Patent and Trademark Office in connection with Case IPR2019-01444 on Nov. 14, 2019, 22 pages.
"Patent Owner's Preliminary Response Pursuant to 37 C.F.R. § 42.107," Exhibit 2008, filed with the United States Patent and Trademark Office in connection with Case IPR2019-01444 on Nov. 14, 2019, 12 pages.
"Patent Owner's Preliminary Response Pursuant to 37 C.F.R. § 42.107," Exhibit 2009, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2010, filed with the United States Patent and Trademark Office in connection with Case IPR2019-01444 on Nov. 14, 2019, 16 pages.
"Patent Owner's Preliminary Response Pursuant to 37 C.F.R. § 42.107," Exhibit 2011, filed with the United States Patent and Trademark Office in connection with Case IPR2019-01444 on Nov. 14, 2019, 10 pages.

(56) References Cited

OTHER PUBLICATIONS

"Patent Owner's Preliminary Response Pursuant to 37 C.F.R. § 42.107," Exhibit 2012, filed with the United States Patent and Trademark Office in connection with Case IPR2019-01444 on Nov. 14, 2019, 12 pages.
"Patent Owner's Preliminary Response Pursuant to 37 C.F.R. § 42.107," Exhibit 2013, filed with the United States Patent and Trademark Office in connection with Case IPR2019-01444 on Nov. 14, 2019, 9 pages.
"Patent Owner's Preliminary Response Pursuant to 37 C.F.R. § 42.107," Exhibit 2014, filed with the United States Patent and Trademark Office in connection with Case IPR2019-01444 on Nov. 14, 2019, 2 pages.
"Patent Owner's Preliminary Response Pursuant to 37 C.F.R. § 42.107," Exhibit 2015, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2016, filed with the United States Patent and Trademark Office in connection with Case IPR2019-01444 on Nov. 14, 2019, 172 pages.
"Patent Owner's Preliminary Response Pursuant to 37 C.F.R. § 42.107," Exhibit 2017, filed with the United States Patent and Trademark Office in connection with Case IPR2019-01444 on Nov. 14, 2019, 40 pages.
"Patent Owner's Preliminary Response Pursuant to 37 C.F.R. § 42.107," Exhibit 2018, filed with the United States Patent and Trademark Office in connection with Case IPR2019-01444 on Nov. 14, 2019, 153 pages.
"Patent Owner's Preliminary Response Pursuant to 37 C.F.R. § 42.107," Exhibit 2019, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2020, filed with the United States Patent and Trademark Office in connection with Case IPR2019-01444 on Nov. 14, 2019, 3 pages.
"Patent Owner's Preliminary Response Pursuant to 37 C.F.R. § 42.107," Exhibit 2021, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2022, filed with the United States Patent and Trademark Office in connection with Case IPR2019-01444 on Nov. 14, 2019, 11 pages.
"Patent Owner's Preliminary Response Pursuant to 37 C.F.R. § 42.107," Exhibit 2023, filed with the United States Patent and Trademark Office in connection with Case IPR2019-01444 on Nov. 14, 2019, 8 pages.
"Patent Owner's Preliminary Response Pursuant to 37 C.F.R. § 42.107," Exhibit 2024, filed with the United States Patent and Trademark Office in connection with Case IPR2019-01444 on Nov. 14, 2019, 20 pages.
"Patent Owner's Preliminary Response Pursuant to 37 C.F.R. § 42.107," Exhibit 2025, filed with the United States Patent and Trademark Office in connection with Case IPR2019-01444 on Nov. 14, 2019, 3 pages.
"Patent Owner's Preliminary Response Pursuant to 37 C.F.R. § 42.107," Exhibit 2026, filed with the United States Patent and Trademark Office in connection with Case IPR2019-01444 on Nov. 14, 2019, 9 pages.
"Patent Owner's Preliminary Response Pursuant to 37 C.F.R. § 42.107," Exhibit 2027, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2028, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2029, filed with the United States Patent and Trademark Office in connection with Case IPR2019-01444 on Nov. 14, 2019, 3 pages.
"Patent Owner's Preliminary Response Pursuant to 37 C.F.R. § 42.107," Exhibit 2030, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2031, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2032, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2033, filed with the United States Patent and Trademark Office in connection with Case IPR2019-01444 on Nov. 14, 2019, 25 pages.
"Patent Owner's Preliminary Response Pursuant to 37 C.F.R. § 42.107," Exhibit 2034, filed with the United States Patent and Trademark Office in connection with Case IPR2019-01444 on Nov. 14, 2019, 3 pages.
United States Patent and Trademark Office, "Notice of Filing Date Accorded to Petition and Time for Filing Patent Owner Preliminary Response," issued in connection with Case IPR2020-00007 on Oct. 8, 2019, 5 pages.
"Patent Owner's Amended Mandatory Notices Pursuant to 37 C.F.R. 42.8," filed with the United States Patent and Trademark Office in connection with case IPR2020-00007 on Oct. 23, 2019, 6 pages.
*EIS, Inc.* v. *Wow Tech International GmbH*, "Declaration of Frank Ferrari in Support of Defendants, Wow Tech International GmbH, Wow Tech Canada Ltd., and Novoluto GmbH's Consolidated Motion to Dismiss," filed with the United States District Court for the District of Delaware in connection with Case No. 1:19-cv-1277-LPS on Oct. 2, 2019, 3 pages.
*EIS, Inc.* v. *Wow Tech International GmbH*, "Declaration of Florian Holst in Support of Defendants, Wow Tech International GmbH, Wow Tech Canada Ltd., and Novoluto GmbH's Consolidated Motion to Dismiss," filed with the United States District Court for the District of Delaware in connection with Case No. 1:19-cv-1277-LPS on Oct. 2, 2019, 3 pages.
*EIS, Inc.* v. *Wow Tech International GmbH*, "Declaration of Johannes Plettenberg in Support of Defendants, Wow Tech International GmbH, Wow Tech Canada Ltd., and Novoluto GmbH's Consolidated Motion to Dismiss," filed with the United States District Court for the District of Delaware in connection with Case No. 1:19-cv-1277-LPS on Oct. 2, 2019, 3 pages.
*EIS, Inc.* v. *Wow Tech International GmbH*, "Defendants' Opening Brief in Support of their Consolidated Motion to Dismiss Pursuant to Federal Rules of Civil Procedure 12(B)(2) and 12(B)(6)," filed with the United States District Court for the District of Delaware in connection with Case No. 1:19-cv-1277-LPS on Oct. 2, 2019, 42 pages.
The International Bureau of WIPO, "English Translation of International Report on Patentability," issued in connection with application No. PCT/EP2017/075400, on Apr. 9, 2019, 12 pages.
Israel Patent Office, "Office Action," issued in connection with Israeli Patent Application No. 254607, on Dec. 1, 2019, 6 pages (includes English translation).
Canadian Patent Office, "Office Action," issued in connection with Canadian Patent Application No. 3,051,672, on Oct. 3, 2019, 7 pages.
United States Patent and Trademark Office, "Notice of Allowance," issued in connection with U.S. Appl. No. 15/354,599, filed Dec. 16, 2019, 21 pages.
"Patent Owner's Preliminary Response Pursuant to 37 C.F.R. § 42.107," filed with the United States Patent and Trademark Office in connection with case IPR2020-00007 on Jan. 8, 2020, 87 pages.

(56) References Cited

OTHER PUBLICATIONS

"Patent Owner's Preliminary Response Pursuant to 37 C.F.R. § 42.107," Exhibit 2001, filed with the United States Patent and Trademark Office in connection with Case IPR2020-00007 on Jan. 8, 2020, 72 pages.
"Patent Owner's Preliminary Response Pursuant to 37 C.F.R. § 42.107," Exhibit 2002, filed with the United States Patent and Trademark Office in connection with Case IPR2020-00007 on Jan. 8, 2020, 36 pages.
"Patent Owner's Preliminary Response Pursuant to 37 C.F.R. § 42.107," Exhibit 2003, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2004, filed with the United States Patent and Trademark Office in connection with Case IPR2020-00007 on Jan. 8, 2020, 62 pages.
"Patent Owner's Preliminary Response Pursuant to 37 C.F.R. § 42.107," Exhibit 2005, filed with the United States Patent and Trademark Office in connection with Case IPR2020-00007 on Jan. 8, 2020, 60 pages.
"Patent Owner's Preliminary Response Pursuant to 37 C.F.R. § 42.107," Exhibit 2006, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2007, filed with the United States Patent and Trademark Office in connection with Case IPR2020-00007 on Jan. 8, 2020, 5 pages.
"Patent Owner's Preliminary Response Pursuant to 37 C.F.R. § 42.107," Exhibit 2008, filed with the United States Patent and Trademark Office in connection with Case IPR2020-00007 on Jan. 8, 2020, 10 pages.
"Patent Owner's Preliminary Response Pursuant to 37 C.F.R. § 42.107," Exhibit 2009, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2010, filed with the United States Patent and Trademark Office in connection with Case IPR2020-00007 on Jan. 8, 2020, 14 pages.
"Patent Owner's Preliminary Response Pursuant to 37 C.F.R. § 42.107," Exhibit 2011, filed with the United States Patent and Trademark Office in connection with Case IPR2020-00007 on Jan. 8, 2020, 16 pages.
"Patent Owner's Preliminary Response Pursuant to 37 C.F.R. § 42.107," Exhibit 2012, filed with the United States Patent and Trademark Office in connection with Case IPR2020-00007 on Jan. 8, 2020, 12 pages.
"Patent Owner's Preliminary Response Pursuant to 37 C.F.R. § 42.107," Exhibit 2013, filed with the United States Patent and Trademark Office in connection with Case IPR2020-00007 on Jan. 8, 2020, 9 pages.
"Patent Owner's Preliminary Response Pursuant to 37 C.F.R. § 42.107," Exhibit 2014, filed with the United States Patent and Trademark Office in connection with Case IPR2020-00007 on Jan. 8, 2020, 2 pages.
"Patent Owner's Preliminary Response Pursuant to 37 C.F.R. § 42.107," Exhibit 2015, filed with the United States Patent and Trademark Office in connection with Case IPR2020-00007 on Jan. 8, 2020, 7 pages.
"Patent Owner's Preliminary Response Pursuant to 37 C.F.R. § 42.107," Exhibit 2016, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2017, filed with the United States Patent and Trademark Office in connection with Case IPR2020-00007 on Jan. 8, 2020, 77 pages.
"Patent Owner's Preliminary Response Pursuant to 37 C.F.R. § 42.107," Exhibit 2018, filed with the United States Patent and Trademark Office in connection with Case IPR2020-00007 on Jan. 8, 2020, 76 pages.
"Patent Owner's Preliminary Response Pursuant to 37 C.F.R. § 42.107," Exhibit 2019, filed with the United States Patent and Trademark Office in connection with Case IPR2020-00007 on Jan. 8, 2020, 169 pages.
"Patent Owner's Preliminary Response Pursuant to 37 C.F.R. § 42.107," Exhibit 2020, filed with the United States Patent and Trademark Office in connection with Case IPR2020-00007 on Jan. 8, 2020, 40 pages.
"Patent Owner's Preliminary Response Pursuant to 37 C.F.R. § 42.107," Exhibit 2021, filed with the United States Patent and Trademark Office in connection with Case IPR2020-00007 on Jan. 8, 2020, 7 pages.
"Patent Owner's Preliminary Response Pursuant to 37 C.F.R. § 42.107," Exhibit 2022, filed with the United States Patent and Trademark Office in connection with Case IPR2020-00007 on Jan. 8, 2020, 6 pages.
"Patent Owner's Preliminary Response Pursuant to 37 C.F.R. § 42.107," Exhibit 2023, filed with the United States Patent and Trademark Office in connection with Case IPR2020-00007 on Jan. 8, 2020, 8 pages.
"Patent Owner's Preliminary Response Pursuant to 37 C.F.R. § 42.107," Exhibit 2024, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2025, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2026, filed with the United States Patent and Trademark Office in connection with Case IPR2020-00007 on Jan. 8, 2020, 13 pages.
"Patent Owner's Preliminary Response Pursuant to 37 C.F.R. § 42.107," Exhibit 2027, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2028, filed with the United States Patent and Trademark Office in connection with Case IPR2020-00007 on Nov. 14, 2019, 7 pages.
"Patent Owner's Preliminary Response Pursuant to 37 C.F.R. § 42.107," Exhibit 2029, filed with the United States Patent and Trademark Office in connection with Case IPR2020-00007 on Jan. 8, 2020, 25 pages.
"Patent Owner's Preliminary Response Pursuant to 37 C.F.R. § 42.107," Exhibit 2030, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2031, filed with the United States Patent and Trademark Office in connection with Case IPR2020-00007 on Jan. 8, 2020, 4 pages.
Josefson, D., FDA Approves Device for Female Sexual Dysfunction, 320 BMJ 7247 at 1427 (2000).
German Patent and Trademark Office, "Examination Report," issued in connection with German Application No. 10 2015 017 096.1, on Aug. 13, 2021, 23 pages (includes English translation).
"Petitioner's Notice of Appeal," filed with the United States Patent and Trademark Office in connection with Case IPR2019-01302 on Aug. 13, 2021, 80 pages.
"Opposition to a German Patent," filed with the German Patent and Trademark Office by Fun Factory GmbH in connection with German Patent No. 10 2013 022 393.8 on Sep. 9, 2021, 175 pages (includes English translation).
"Opposition to a German Patent, Exhibit 5A," filed with the German Patent and Trademark Office by Fun Factory GmbH in connection with German Patent No. 10 2013 022 393.8 on Sep. 9, 2021, 10 pages.

(56) References Cited

OTHER PUBLICATIONS

United States Patent and Trademark Office, "Judgment, Final Written Decision," issued in connection with Case IPR2020-00007 on Sep. 23, 2021, 78 pages.
*EIS Inc.* v. *IntiHealth Ger GmbH* et al., "Plaintiff EIS Inc.'s Answer and Affirmative Defenses to Defendant Novoluto's Counterclaims," filed with the United States District Court for the District of Delaware, case No. 1:19-cv-01227-LPS, Nov. 12, 2021, 53 pages.
*EIS Inc.* v. *IntiHealth Ger GmbH* et al., "Plaintiff EIS Inc.'s Answer and Affirmative Defenses to Defendant Novoluto's Counterclaims, Exhibit A," filed with the United States District Court for the District of Delaware, case No. 1:19-cv-01227-LPS, Nov. 12, 2021, 95 pages.
*EIS Inc.* v. *IntiHealth Ger GmbH* et al., "Plaintiff EIS Inc.'s Answer and Affirmative Defenses to Defendant Novoluto's Counterclaims, Exhibit B," filed with the United States District Court for the District of Delaware, case No. 1:19-cv-01227-LPS, Nov. 12, 2021, 91 pages.
*EIS Inc.* v. *IntiHealth Ger GmbH* et al., "Plaintiff EIS Inc.'s Answer and Affirmative Defenses to Defendant Novoluto's Counterclaims, Exhibit C," filed with the United States District Court for the District of Delaware, case No. 1:19-cv-01227-LPS, Nov. 12, 2021, 88 pages.
*EIS Inc.* v. *IntiHealth Ger GmbH* et al., "Plaintiff EIS Inc.'s Answer and Affirmative Defenses to Defendant Novoluto's Counterclaims, Exhibit D," filed with the United States District Court for the District of Delaware, case No. 1:19-cv-01227-LPS, Nov. 12, 2021, 5 pages.
*EIS Inc.* v. *IntiHealth Ger GmbH* et al., "Plaintiff EIS Inc.'s Answer and Affirmative Defenses to Defendant Novoluto's Counterclaims, Exhibit E," filed with the United States District Court for the District of Delaware, case No. 1:19-cv-01227-LPS, Nov. 12, 2021, 7 pages.
*EIS Inc.* v. *IntiHealth Ger GmbH* et al., "Plaintiff EIS Inc.'s Answer and Affirmative Defenses to Defendant Novoluto's Counterclaims, Exhibit F," filed with the United States District Court for the District of Delaware, case No. 1:19-cv-01227-LPS, Nov. 12, 2021, 6 pages.
*EIS Inc.* v. *IntiHealth Ger GmbH* et al., "Plaintiff EIS Inc.'s Answer and Affirmative Defenses to Defendant Novoluto's Counterclaims, Exhibit G," filed with the United States District Court for the District of Delaware, case No. 1:19-cv-01227-LPS, Nov. 12, 2021, 9 pages.
*EIS Inc.* v. *IntiHealth Ger GmbH* et al., "Plaintiff EIS Inc.'s Answer and Affirmative Defenses to Defendant Novoluto's Counterclaims, Exhibit H," filed with the United States District Court for the District of Delaware, case No. 1:19-cv-01227-LPS, Nov. 12, 2021, 54 pages.
*EIS Inc.* v. *IntiHealth Ger GmbH* et al., "Plaintiff EIS Inc.'s Answer and Affirmative Defenses to Defendant Novoluto's Counterclaims, Exhibit I," filed with the United States District Court for the District of Delaware, case No. 1:19-cv-01227-LPS, Nov. 12, 2021, 17 pages.
*EIS Inc.* v. *IntiHealth Ger GmbH* et al., "Plaintiff EIS Inc.'s Answer and Affirmative Defenses to Defendant Novoluto's Counterclaims, Exhibit J," filed with the United States District Court for the District of Delaware, case No. 1:19-cv-01227-LPS, Nov. 12, 2021, 30 pages.
*EIS Inc.* v. *IntiHealth Ger GmbH* et al., "Letter to the Honorable Leonard P. Stark from Paul D. Brown regarding Motion to Strike Invalidity Contentions," filed with the United States District Court for the District of Delaware in connection with Case No. 1:19-cv-1227-LPS on Nov. 17, 2021, 3 pages.
*EIS Inc.* v. *IntiHealth Ger GmbH* et al., "Letter to the Honorable Leonard P. Stark from Paul D. Brown regarding Motion to Strike Invalidity Contentions, Exhibit 1," filed with the United States District Court for the District of Delaware in connection with Case No. 1:19-cv-1227-LPS on Nov. 17, 2021, 382 pages.
*EIS Inc.* v. *IntiHealth Ger GmbH* et al., "Letter to the Honorable Leonard P. Stark in Opposition to Defendants' Motion to Strike EIS's Initial Invalidity Contentions," filed with the United States District Court for the District of Delaware in connection with Case No. 1:19-cv-1227-LPS on Nov. 30, 2021, 7 pages.
*EIS Inc.* v. *IntiHealth Ger GmbH* et al., "Letter to the Honorable Leonard P. Stark from Gregory E. Stuhlman, Esquire Regarding Motion to Strike Invalidity Contentions," filed with the United States District Court for the District of Delaware in connection with Case No. 1:19-cv-1227-LPS on Dec. 3, 2021, 2 pages.
*EIS Inc.* v. *IntiHealth Ger GmbH* et al., "Counterclaim Defendants EIS GmbH, Triple A Import GmbH, and Triple A Marketing GmbH's Answer and Affirmative Defenses to Defendant Novoluto's Counterclaims," filed with the United States District Court for the District of Delaware in connection with Case No. 1:19-cv-1227-LPS on Dec. 13, 2021, 54 pages.
*EIS Inc.* v. *IntiHealth Ger GmbH* et al., "Plaintiff EIS Inc.'s Opening Brief in Support of its Motion for Temporary Restraining Order and Preliminary Injunction (Public Version)," filed with the United States District Court for the District of Delaware in connection with Case No. 1:19-cv-1227-LPS on Dec. 15, 2021, 26 pages.
*EIS Inc.* v. *IntiHealth Ger GmbH* et al., "Plaintiff EIS Inc.'s Opening Brief in Support of its Motion for Temporary Restraining Order and Preliminary Injunction (Public Version), Exhibit A-12" filed with the United States District Court for the District of Delaware in connection with Case No. 1:19-cv-1227-LPS on Dec. 15, 2021, 22 pages.
*EIS Inc.* v. *IntiHealth Ger GmbH* et al., "Letter to the Honorable Leonard P. Stark Regarding Motion for Temporary Restraining Order (Public Version)," filed with the United States District Court for the District of Delaware in connection with Case No. 1:19-cv-1227-LPS on Dec. 15, 2021, 6 pages.
*EIS Inc.* v. *IntiHealth Ger GmbH* et al., "Letter to the Honorable Leonard P. Stark Regarding Reply in Support of Plaintiff EIS's Inc.'s Motion for Temporary Restraining Order and Preliminary Injunction (Public Version)," filed with the United States District Court for the District of Delaware in connection with Case No. 1:19-cv-1227-LPS on Dec. 15, 2021, 4 pages.
IP Australia, "Opposition—Decision Issued," issued in connection with Australian Patent Application No. 2018203659 on Jan. 5, 2021, 35 pages.
United States Patent and Trademark Office, "Final Office action," issued in connection with U.S. Appl. No. 15/354,599, filed Jun. 28, 2018, 25 pages.
United States Patent and Trademark Office, "Non-Final Office action," issued in connection with U.S. Appl. No. 15/965,117, filed Jun. 29, 2018, 16 pages.
International Searching Authority, "International Search Report," issued in connection with International Application No. PCT/DE2019/100308, on Oct. 10, 2019, 10 pages (includes English translation).
International Searching Authority, "Written Opinion," issued in connection with International Application No. PCT/DE2019/100308, on Oct. 10, 2019, 21 pages (includes English translation).
*EIS, Inc.* v. *Wow Tech International GmbH*, "Defendants' Response to Plaintiff's Second Notice of Supplemental Authority," filed with the United States District Court for the District of Delaware in connection with Case No. 1:19-cv-01227-LPS on Aug. 21, 2020, 191 pages.
European Patent Office, "Search Report," issued in connection with European Application No. 20174260, on Sep. 22, 2020, 18 pages (includes English translation).
United States Patent and Trademark Office, "Non-Final Office action," issued connection with U.S. Appl. No. 15/965,208, filed Jun. 29, 2018, 15 pages.
International Searching Authority, "Written Opinion," issued in connection with International Application No. PCT/DE2019/100860, on Dec. 18, 2019, 11 pages (includes English translation).
"Decision Granting Petitioner's Request on Rehearing of Decision Denying Institution, Granting Institution of Inter Partes Review," issued by the United States Patent and Trademark Office in connection with Case IPR 2020-00007 on Sep. 25, 2020, 22 pages.
IP Australia, "Notice of Opposition," issued in connection with Australian Patent Application No. 2018222907 on Dec. 4, 2020, 110 pages.
Canadian Patent Office, "Office Action," issued in connection with Canadian Application No. 2,978,739, on Jun. 12, 2018, 4 pages.

(56) References Cited

OTHER PUBLICATIONS

"Petitioner's Reply to Patent Owner's Response," filed with the United States Patent and Trademark Office in connection with Case IPR2019-01302 on Dec. 4, 2020, 41 pages.
"Petitioner's Reply to Patent Owner's Response," Exhibit 1018, filed with the United States Patent and Trademark Office in connection with Case IPR2019-01302 on Dec. 4, 2020, 79 pages.
"Petitioner's Reply to Patent Owner's Response," Exhibit 1019, filed with the United States Patent and Trademark Office in connection with Case IPR2019-01302 on Dec. 4, 2020, 4 pages.
"Petitioner's Reply to Patent Owner's Response," Exhibit 1020, filed with the United States Patent and Trademark Office in connection with Case IPR2019-01302 on Dec. 4, 2020, 55 pages.
"Petitioner's Reply to Patent Owner's Response," Exhibit 1021, filed with the United States Patent and Trademark Office in connection with Case IPR2019-01302 on Dec. 4, 2020, 16 pages.
"Petitioner's Reply to Patent Owner's Response," Exhibit 1022, filed with the United States Patent and Trademark Office in connection with Case IPR2019-01302 on Dec. 4, 2020, 258 pages.
"Petitioner's Reply to Patent Owner's Response," Exhibit 1023, filed with the United States Patent and Trademark Office in connection with Case IPR2019-01302 on Dec. 4, 2020, 234 pages.
"Petitioner's Reply to Patent Owner's Response," Exhibit 1024, filed with the United States Patent and Trademark Office in connection with Case IPR2019-01302 on Dec. 4, 2020, 19 pages.
"Petitioner's Reply to Patent Owner's Response," Exhibit 1025, filed with the United States Patent and Trademark Office in connection with Case IPR2019-01302 on Dec. 4, 2020, 22 pages.
"Petitioner's Reply to Patent Owner's Response," Exhibit 1026, filed with the United States Patent and Trademark Office in connection with Case IPR2019-01302 on Dec. 4, 2020, 3 pages.
"Petitioner's Reply to Patent Owner's Response," Exhibit 1027, filed with the United States Patent and Trademark Office in connection with Case IPR2019-01302 on Dec. 4, 2020, 4 pages.
"Petitioner's Reply to Patent Owner's Response," Exhibit 1028, filed with the United States Patent and Trademark Office in connection with Case IPR2019-01302 on Dec. 4, 2020, 4 pages.
"Petitioner's Reply to Patent Owner's Response," Exhibit 1029, filed with the United States Patent and Trademark Office in connection with Case IPR2019-01302 on Dec. 4, 2020, 9 pages.
"Petitioner's Reply to Patent Owner's Response," Exhibit 1030, filed with the United States Patent and Trademark Office in connection with Case IPR2019-01302 on Dec. 4, 2020, 9 pages.
"Petitioner's Reply to Patent Owner's Response," Exhibit 1031, filed with the United States Patent and Trademark Office in connection with Case IPR2019-01302 on Dec. 4, 2020, 18 pages.
"Petitioner's Reply to Patent Owner's Response," Exhibit 1032, filed with the United States Patent and Trademark Office in connection with Case IPR2019-01302 on Dec. 4, 2020, 15 pages.
"Petitioner's Reply to Patent Owner's Response," Exhibit 1033, filed with the United States Patent and Trademark Office in connection with Case IPR2019-01302 on Dec. 4, 2020, 17 pages.
"Petitioner's Reply to Patent Owner's Response," Exhibit 1034, filed with the United States Patent and Trademark Office in connection with Case IPR2019-01302 on Dec. 4, 2020, 2 pages.
"Petitioner's Reply to Patent Owner's Response," Exhibit 1035, filed with the United States Patent and Trademark Office in connection with Case IPR2019-01302 on Dec. 4, 2020, 11 pages.
"Petitioner's Reply to Patent Owner's Response," Exhibit 1036, filed with the United States Patent and Trademark Office in connection with Case IPR2019-01302 on Dec. 4, 2020, 7 pages.
"Petitioner's Reply to Patent Owner's Response," Exhibit 1037, filed with the United States Patent and Trademark Office in connection with Case IPR2019-01302 on Dec. 4, 2020, 17 pages.
"Petitioner's Reply to Patent Owner's Response," Exhibit 1038, filed with the United States Patent and Trademark Office in connection with Case IPR2019-01302 on Dec. 4, 2020, 16 pages.
"Petitioner's Reply to Patent Owner's Response," Exhibit 1039, filed with the United States Patent and Trademark Office in connection with Case IPR2019-01302 on Dec. 4, 2020, 29 pages.
"Petitioner's Reply to Patent Owner's Response," Exhibit 1040, filed with the United States Patent and Trademark Office in connection with Case IPR2019-01302 on Dec. 4, 2020, 74 pages.
"Petitioner's Reply to Patent Owner's Response," Exhibit 1041, filed with the United States Patent and Trademark Office in connection with Case IPR2019-01302 on Dec. 4, 2020, 1 page.
"Petitioner's Reply to Patent Owner's Response," Exhibit 1042, filed with the United States Patent and Trademark Office in connection with Case IPR2019-01302 on Dec. 4, 2020, 1 page.
"Petitioner's Reply to Patent Owner's Response," Exhibit 1043, filed with the United States Patent and Trademark Office in connection with Case IPR2019-01302 on Dec. 4, 2020, 6 pages.
"Petitioner's Reply to Patent Owner's Response," Exhibit 1044, filed with the United States Patent and Trademark Office in connection with Case IPR2019-01302 on Dec. 4, 2020, 136 pages.
"Petitioner's Reply to Patent Owner's Response," Exhibit 1045, filed with the United States Patent and Trademark Office in connection with Case IPR2019-01302 on Dec. 4, 2020, 1 page.
"Petitioner's Reply to Patent Owner's Response," Exhibit 1046, filed with the United States Patent and Trademark Office in connection with Case IPR2019-01302 on Dec. 4, 2020, 1 page.
"Petitioner's Reply to Patent Owner's Response," Exhibit 1047, filed with the United States Patent and Trademark Office in connection with Case IPR2019-01302 on Dec. 4, 2020, 4 pages.
"Petitioner's Reply to Patent Owner's Response," Exhibit 1048, filed with the United States Patent and Trademark Office in connection with Case IPR2019-01302 on Dec. 4, 2020, 5 pages.
"Petitioner's Reply to Patent Owner's Response," Exhibit 1049, filed with the United States Patent and Trademark Office in connection with Case IPR2019-01302 on Dec. 4, 2020, 4 pages.
"Petitioner's Reply to Patent Owner's Response," Exhibit 1050, filed with the United States Patent and Trademark Office in connection with Case IPR2019-01302 on Dec. 4, 2020, 9 pages.
"Patent Owner's Amended Mandatory Notices Pursuant to 37 C.F.R. 42.8," filed with the United States Patent and Trademark Office in connection with Case IPR2019-01302 on Jan. 12, 2021, 9 pages.
"Patent Owner's Sur-Reply Pursuant to 37 C.F.R. 42.23," filed with the United States Patent and Trademark Office in connection with Case IPR2019-01302 on Jan. 15, 2021, 38 pages.
"Patent Owner's Sur-Reply Pursuant to 37 C.F.R. 42.23," Exhibit 2048, filed with the United States Patent and Trademark Office in connection with Case IPR2019-01302 on Jan. 15, 2021, 39 pages.
"Patent Owner's Sur-Reply Pursuant to 37 C.F.R. 42.23," Exhibit 2049, filed with the United States Patent and Trademark Office in connection with Case IPR2019-01302 on Jan. 15, 2021, 13 pages.
"Patent Owner's Sur-Reply Pursuant to 37 C.F.R. 42.23," Exhibit 2050, filed with the United States Patent and Trademark Office in connection with Case IPR2019-01302 on Jan. 15, 2021, 14 pages.
"Patent Owner's Sur-Reply Pursuant to 37 C.F.R. 42.23," Exhibit 2051, filed with the United States Patent and Trademark Office in connection with Case IPR2019-01302 on Jan. 15, 2021, 3 pages.
"Petitioner's Reply to Patent Owner's Response," filed with the United States Patent and Trademark Office in connection with Case IPR2019-01444 on Jan. 26, 2021, 41 pages.
"Petitioner's Reply to Patent Owner's Response," Exhibit 1013, filed with the United States Patent and Trademark Office in connection with Case IPR2019-01444 on Jan. 26, 2021, 32 pages.
"Petitioner's Reply to Patent Owner's Response," Exhibit 1014, filed with the United States Patent and Trademark Office in connection with Case IPR2019-01444 on Jan. 26, 2021, 29 pages.
"Petitioner's Reply to Patent Owner's Response," Exhibit 1015, filed with the United States Patent and Trademark Office in connection with Case IPR2019-01444 on Jan. 26, 2021, 196 pages.
"Petitioner's Reply to Patent Owner's Response," Exhibit 1016, filed with the United States Patent and Trademark Office in connection with Case IPR2019-01444 on Jan. 26, 2021, 253 pages.
"Petitioner's Reply to Patent Owner's Response," Exhibit 1017, filed with the United States Patent and Trademark Office in connection with Case IPR2019-01444 on Jan. 26, 2021, 88 pages.
"Petitioner's Reply to Patent Owner's Response," Exhibit 1018, filed with the United States Patent and Trademark Office in connection with Case IPR2019-01444 on Jan. 26, 2021, 93 pages.

(56) References Cited

OTHER PUBLICATIONS

"Petitioner's Reply to Patent Owner's Response," Exhibit 1019, filed with the United States Patent and Trademark Office in connection with Case IPR2019-01444 on Jan. 26, 2021, 4 pages.
"Petitioner's Reply to Patent Owner's Response," Exhibit 1020, filed with the United States Patent and Trademark Office in connection with Case IPR2019-01444 on Jan. 26, 2021, 41 pages.
"Petitioner's Reply to Patent Owner's Response," Exhibit 1021, filed with the United States Patent and Trademark Office in connection with Case IPR2019-01444 on Jan. 26, 2021, 16 pages.
"Petitioner's Reply to Patent Owner's Response," Exhibit 1022, filed with the United States Patent and Trademark Office in connection with Case IPR2019-01444 on Jan. 26, 2021, 258 pages.
"Petitioner's Reply to Patent Owner's Response," Exhibit 1023, filed with the United States Patent and Trademark Office in connection with Case IPR2019-01444 on Jan. 26, 2021, 234 pages.
"Petitioner's Reply to Patent Owner's Response," Exhibit 1024, filed with the United States Patent and Trademark Office in connection with Case IPR2019-01444 on Jan. 26, 2021, 11 pages.
"Petitioner's Reply to Patent Owner's Response," Exhibit 1025, filed with the United States Patent and Trademark Office in connection with Case IPR2019-01444 on Jan. 26, 2021, 6 pages.
"Petitioner's Reply to Patent Owner's Response," Exhibit 1026, filed with the United States Patent and Trademark Office in connection with Case IPR2019-01444 on Jan. 26, 2021, 3 pages.
"Petitioner's Reply to Patent Owner's Response," Exhibit 1027, filed with the United States Patent and Trademark Office in connection with Case IPR2019-01444 on Jan. 26, 2021, 4 pages.
"Petitioner's Reply to Patent Owner's Response," Exhibit 1028, filed with the United States Patent and Trademark Office in connection with Case IPR2019-01444 on Jan. 26, 2021, 4 pages.
"Petitioner's Reply to Patent Owner's Response," Exhibit 1029, filed with the United States Patent and Trademark Office in connection with Case IPR2019-01444 on Jan. 26, 2021, 9 pages.
"Petitioner's Reply to Patent Owner's Response," Exhibit 1030, filed with the United States Patent and Trademark Office in connection with Case IPR2019-01444 on Jan. 26, 2021, 9 pages.
"Petitioner's Reply to Patent Owner's Response," Exhibit 1031, filed with the United States Patent and Trademark Office in connection with Case IPR2019-01444 on Jan. 26, 2021, 18 pages.
"Petitioner's Reply to Patent Owner's Response," Exhibit 1032, filed with the United States Patent and Trademark Office in connection with Case IPR2019-01444 on Jan. 26, 2021, 15 pages.
"Petitioner's Reply to Patent Owner's Response," Exhibit 1033, filed with the United States Patent and Trademark Office in connection with Case IPR2019-01444 on Jan. 26, 2021, 17 pages.
"Petitioner's Reply to Patent Owner's Response," Exhibit 1034, filed with the United States Patent and Trademark Office in connection with Case IPR2019-01444 on Jan. 26, 2021, 2 pages.
"Petitioner's Reply to Patent Owner's Response," Exhibit 1035, filed with the United States Patent and Trademark Office in connection with Case IPR2019-01444 on Jan. 26, 2021, 11 pages.
"Petitioner's Reply to Patent Owner's Response," Exhibit 1036, filed with the United States Patent and Trademark Office in connection with Case IPR2019-01444 on Jan. 26, 2021, 18 pages.
"Petitioner's Reply to Patent Owner's Response," Exhibit 1037, filed with the United States Patent and Trademark Office in connection with Case IPR2019-01444 on Jan. 26, 2021, 17 pages.
"Petitioner's Reply to Patent Owner's Response," Exhibit 1038, filed with the United States Patent and Trademark Office in connection with Case IPR2019-01444 on Jan. 26, 2021, 16 pages.
"Petitioner's Reply to Patent Owner's Response," Exhibit 1039, filed with the United States Patent and Trademark Office in connection with Case IPR2019-01444 on Jan. 26, 2021, 5 pages.
"Petitioner's Reply to Patent Owner's Response," Exhibit 1040, filed with the United States Patent and Trademark Office in connection with Case IPR2019-01444 on Jan. 26, 2021, 74 pages.
"Petitioner's Reply to Patent Owner's Response," Exhibit 1041, filed with the United States Patent and Trademark Office in connection with Case IPR2019-01444 on Jan. 26, 2021, 5 pages.
"Petitioner's Reply to Patent Owner's Response," Exhibit 1043, filed with the United States Patent and Trademark Office in connection with Case IPR2019-01444 on Jan. 26, 2021, 6 pages.
"Petitioner's Reply to Patent Owner's Response," Exhibit 1044, filed with the United States Patent and Trademark Office in connection with Case IPR2019-01444 on Jan. 26, 2021, 136 pages.
"Petitioner's Reply to Patent Owner's Response," Exhibit 1045, filed with the United States Patent and Trademark Office in connection with Case IPR2019-01444 on Jan. 26, 2021, 1 page.
"Petitioner's Reply to Patent Owner's Response," Exhibit 1046, filed with the United States Patent and Trademark Office in connection with Case IPR2019-01444 on Jan. 26, 2021, 1 page.
"Petitioner's Reply to Patent Owner's Response," Exhibit 1047, filed with the United States Patent and Trademark Office in connection with Case IPR2019-01444 on Jan. 26, 2021, 4 pages.
"Petitioner's Reply to Patent Owner's Response," Exhibit 1048, filed with the United States Patent and Trademark Office in connection with Case IPR2019-01444 on Jan. 26, 2021, 5 pages.
"Petitioner's Reply to Patent Owner's Response," Exhibit 1049, filed with the United States Patent and Trademark Office in connection with Case IPR2019-01444 on Jan. 26, 2021, 4 pages.
"Petitioner's Reply to Patent Owner's Response," Exhibit 1050, filed with the United States Patent and Trademark Office in connection with Case IPR2019-01444 on Jan. 26, 2021, 12 pages.
United States Patent and Trademark Office, "Office Communication Concerning Third Party Submission Under 37 C.F.R. § 1.290," issued in connection with U.S. Appl. No. 17/029,974, dated May 23, 2022, 19 pages.
"Decision Denying Institution of Inter Partes Review," issued by the United States Patent and Trademark Office in connection with Case IPR2019-01302 on Jan. 13, 2020, 21 pages.
*EIS, Inc.* v. *Wow Tech International GmbH*, "Letter to the Honorable Leonard P. Stark from Jack B. Blumenfeld regarding Discovery Dispute," filed with the United States District Court for the District of Delaware in connection with Case No. 1:19-cv-1277-LPS on Dec. 5, 2019, 176 pages.
*EIS, Inc.* v. *Wow Tech International GmbH*, "Letter to the Honorable Leonard P. Stark from Paul D. Brown regarding Discovery Dispute," filed with the United States District Court for the District of Delaware in connection with Case No. 1:19-cv-1277-LPS on Dec. 6, 2019, 4 pages.
United Stated Patent and Trademark Office, "Notice of Allowance," issued in connection with U.S. Appl. No. 15/719,085, filed Oct. 15, 2019, 12 pages.
United States Patent and Trademark Office, "Non-Final Office Action," issued in connection with U.S. Appl. No. 15/965,117, filed Jun. 27, 2019, 14 pages.
"English Translation of Grounds of Appeal," filed in connection with opposition of German Patent No. 102013110501.7 on Dec. 21, 2018, 44 pages (includes English translation of Exhibit B1).
"English Translation of Exhibit B2 of Grounds of Appeal," filed with the German Patent and Trademark in connection with opposition of German Patent No. 102013110501.7 on Dec. 21, 2018, 11 pages.
"Evidence in Support," filed with IP Australia in connection with Australian Patent Application No. 2018203659 on Nov. 8, 2019, 245 pages.
IP Australia, "Opposition—Evidence," issued in connection with Australian Patent Application No. 2018203659 on Nov. 12, 2019, 1 page.
"Decision Denying Institution of Inter Partes Review," issued by the United States Patent and Trademark Office in connection with Case IPR2019-01444 on Feb. 10, 2020, 16 pages.
"Summary of Opponent's Submissions," filed with IP Australia in connection with Australian Patent Application No. 2015386680 on Feb. 5, 2020, 39 pages.
*EIS, Inc.* v. *Wow Tech International GmbH*, "Defendant's Revised Motion to Dismiss EIS, Inc.'s Complaint Pursuant to Federal Rule of Civil Procedure 12(b)(6)," filed with the United States District Court for the District of Delaware in connection with Case No. 1:19-cv-01227-LPS on Feb. 4, 2020, 3 pages.
*EIS, Inc.* v. *Wow Tech International GmbH*, "Defendant's Opening Brief in Support of the Revised Motion to Dismiss Pursuant to Rule

(56) References Cited

OTHER PUBLICATIONS

12(b)(6)," filed with the United States District Court for the District of Delaware in connection with Case No. 1:19-cv-01227-LPS on Feb. 4, 2020, 30 pages.
*EIS, Inc.* v. *Wow Tech International GmbH*, "Plaintiff EIS's Answering Brief in Opposition to Defendant's Revised Motion to Dismiss Pursuant to Rule 12(b)(6)," filed with the United States District Court for the District of Delaware in connection with Case No. 1:19-cv-01227-LPS on Feb. 4, 2020, 33 pages.
United Stated Patent and Trademark Office, "Notice of Allowance," issued in connection with U.S. Appl. No. 15/719,085, filed Feb. 3, 2020, 12 pages.
European Patent Office, "Extended European Search Report," issued in connection with European Patent Application No. EP 19161328.0, on Jul. 18, 2019, 9 pages (includes English translation of written opinion).
"Petitioner's Request for Rehearing Under 37 C.F.R. 42.71," filed with the United States Patent and Trademark Office in connection with Case IPR2019-01302 on Feb. 7, 2020, 20 pages.
"Petitioner's Amended Mandatory Notices Pursuant to 37 C.F.R. 42.8," filed with the United States Patent and Trademark Office in connection with Case IPR2019-01302 on Feb. 25, 2020, 5 pages.
"Petitioner's Amended Mandatory Notices Pursuant to 37 C.F.R. 42.8," filed with the United States Patent and Trademark Office in connection with Case IPR2019-01444 on Feb. 25, 2020, 5 pages.
"Petitioner's Request for Rehearing Under 37 C.F.R. 42.71," filed with the United States Patent and Trademark Office in connection with Case IPR2019-01444 on Mar. 6, 2020, 19 pages.
United States Patent and Trademark Office, "Notice of Allowance," issued in connection with U.S. Appl. No. 15/719,085, dated Mar. 13, 2020, 12 pages.
*EIS, Inc.* v. *Wow Tech International GmbH*, "Defendant's Reply in Support of Their Revised Motion to Dismiss Pursuant to Rule 12(b)(6)," filed with the United States District Court for the District of Delaware in connection with Case No. 1:19-cv-01227-LPS on Mar. 10, 2020, 16 pages.
Canadian Patent Office, "Notice of Allowance," issued in connection with Canadian Patent Application No. 2978739, dated Jan. 30, 2020, 1 page.
United States Patent and Trademark Office, "Notice of Allowance," issued in connection with U.S. Appl. No. 15/965,117, dated Mar. 17, 2020, 9 pages.
Canadian Patent Office, "Office Action," issued in connection with Canadian Patent Application No. 3051672, dated Mar. 4, 2020, 4 pages.
United States Patent and Trademark Office, "Notice of Allowance," issued in connection with U.S. Appl. No. 15/354,599, dated Mar. 25, 2020, 21 pages.
Korean Patent Office, "Notice of Allowance," issued in connection with Korean Patent Application No. 10-2017-7028845, dated Mar. 30, 2020, 6 pages (includes English translation).
"Order," issued by the United States Patent and Trademark Office in connection with Case IPR2019-01302 on Apr. 6, 2020, 2 pages.
"Order," issued by the United States Patent and Trademark Office in connection with Case IPR2019-01444 on Apr. 6, 2020, 2 pages.
"Decision Denying Institution of Inter Partes Review," filed with the United States Patent and Trademark Office in connection with Case IPR2020-00007 on Apr. 6, 2020, 31 pages.
United States Patent and Trademark Office, "Supplemental Notice of Allowability," issued in connection with U.S. Appl. No. 15/719,085, dated Apr. 3, 2020, 7 pages.
United States Patent and Trademark Office, "Notice of Allowance," issued in connection with U.S. Appl. No. 15/965,208, dated Apr. 8, 2020, 9 pages.
"Petition for Inter Partes Review of U.S. Pat. No. 9,937,097," filed with the United States Patent and Trademark Office on Jul. 3, 2019, 95 pages.
"Petition for Inter Partes Review of U.S. Pat. No. 9,937,097," Exhibit 1001, filed with the United States Patent and Trademark Office on Jul. 3, 2019, 18 pages.
"Petition for Inter Partes Review of U.S. Pat. No. 9,937,097," Exhibit 1002, filed with the United States Patent and Trademark Office on Jul. 3, 2019, 215 pages.
"Petition for Inter Partes Review of U.S. Pat. No. 9,937,097," Exhibit 1003, filed with the United States Patent and Trademark Office on Jul. 3, 2019, 360 pages.
"Petition for Inter Partes Review of U.S. Pat. No. 9,937,097," Exhibit 1004, filed with the United States Patent and Trademark Office on Jul. 3, 2019, 9 pages.
"Petition for Inter Partes Review of U.S. Pat. No. 9,937,097," Exhibit 1005, filed with the United States Patent and Trademark Office on Jul. 3, 2019, 34 pages.
"Petition for Inter Partes Review of U.S. Pat. No. 9,937,097," Exhibit 1006, filed with the United States Patent and Trademark Office on Jul. 3, 2019, 13 pages.
"Petition for Inter Partes Review of U.S. Pat. No. 9,937,097," Exhibit 1007, filed with the United States Patent and Trademark Office on Jul. 3, 2019, 11 pages.
"Petition for Inter Partes Review of U.S. Pat. No. 9,937,097," Exhibit 1008, filed with the United States Patent and Trademark Office on Jul. 3, 2019, 46 pages.
"Petition for Inter Partes Review of U.S. Pat. No. 9,937,097," Exhibit 1009, filed with the United States Patent and Trademark Office on Jul. 3, 2019, 1837 pages. (Uploaded in 4 parts.).
"Petition for Inter Partes Review of U.S. Pat. No. 9,937,097," Exhibit 1010, filed with the United States Patent and Trademark Office on Jul. 3, 2019, 17 pages.
"Petition for Inter Partes Review of U.S. Pat. No. 9,937,097," Exhibit 1011, filed with the United States Patent and Trademark Office on Jul. 3, 2019, 6 pages.
"Petition for Inter Partes Review of U.S. Pat. No. 9,937,097," Exhibit 1012, filed with the United States Patent and Trademark Office on Jul. 3, 2019, 47 pages.
"Petition for Inter Partes Review of U.S. Pat. No. 9,937,097," Exhibit 1013, filed with the United States Patent and Trademark Office on Jul. 3, 2019, 61 pages.
"Petition for Inter Partes Review of U.S. Pat. No. 9,937,097," Exhibit 1014, filed with the United States Patent and Trademark Office on Jul. 3, 2019, 5 pages.
"Petition for Inter Partes Review of U.S. Pat. No. 9,937,097," Exhibit 1015, filed with the United States Patent and Trademark Office on Jul. 3, 2019, 1049 pages.
United States Patent and Trademark Office, "Notice of Allowance," issued in connection with U.S. Appl. No. 15/719,085, dated on Apr. 21, 2020, 12 pages.
"Petitioner's Amended Mandatory Notices Pursuant to 37 C.F.R. 42.8," filed with the United States Patent and Trademark Office in connection with Case IPR2020-00007 on Feb. 25, 2020, 5 pages.
China National Intellectual Property Administration, "Second Office Action," issued in connection with Chinese Patent Application No. 201710927530.4, dated Apr. 16, 2020, 6 pages (English Translation Included).
United States Patent and Trademark Office, "Notice of Allowance," issued in connection with U.S. Appl. No. 15/719,085, dated May 6, 2020, 12 pages.
United States Patent and Trademark Office, "Notice of Allowance," issued in connection with U.S. Appl. No. 15/354,599, dated on May 6, 2020, 21 pages.
"Petitioner's Request for Rehearing Under 37 C.F.R. 42.71," filed with the United States Patent and Trademark Office in connection with Case IPR2020-00007 on May 6, 2020, 20 pages.
"Petitioner's Amended Mandatory Notices Pursuant to 37 C.F.R. 42.8," filed with the United States Patent and Trademark Office in connection with Case IPR2019-01302 on Apr. 17, 2020, 5 pages.
"Petitioner's Amended Mandatory Notices Pursuant to 37 C.F.R. 42.8," filed with the United States Patent and Trademark Office in connection with Case IPR2019-01444 on Apr. 17, 2020, 5 pages.
United States Patent and Trademark Office, "Notice of Allowance," issued in connection with U.S. Appl. No. 15/965,117, dated May 14, 2020, 9 pages.
United States Patent and Trademark Office, "Notice of Allowance," issued in connection with U.S. Appl. No. 15/965,208, dated May 15, 2020, 9 pages.

(56) References Cited

OTHER PUBLICATIONS

United States Patent and Trademark Office, "Supplemental Notice of Allowability," issued in connection with U.S. Appl. No. 15/719,085, dated May 12, 2020, 6 pages.
United States Patent and Trademark Office, "Supplemental Notice of Allowability," issued in connection with U.S. Appl. No. 15/719,085, dated May 27, 2020, 6 pages.
United States Patent and Trademark Office, "Corrected Notice of Allowability," issued in connection with U.S. Appl. No. 15/354,599, dated May 27, 2020, 19 pages.
United States Patent and Trademark Office, "Corrected Notice of Allowability," issued in connection with U.S. Appl. No. 15/965,117, dated Jun. 15, 2020, 3 pages.
United States Patent and Trademark Office, "Corrected Notice of Allowability," issued in connection with U.S. Appl. No. 15/965,208, mailed on Jun. 12, 2020, 3 pages.
"Decision Granting Petitioner's Request on Rehearing of Decision Denying Institution, Granting Institution of Inter Partes Review," issued by the United States Patent and Trademark Office in connection with Case IPR2019-01302 on Jun. 17, 2020, 9 pages.
*EIS, Inc.* v. *Wow Tech International GmbH*, "Notice of Supplemental Authority in Support of Plaintiff EIS Inc.'s Opposition to Defendants' Motion to Dismiss," filed with the United States District Court for the District of Delaware in connection with Case No. 1:19-cv-01227-LPS on Jun. 19, 2020, 13 pages.
*EIS*, Inc. v. *Wow Tech International GmbH*, "Defendant's Response to Plaintiff Notice of Supplemental Authority," filed with the United States District Court for the District of Delaware in connection with Case No. 1:19-cv-01227-LPS on Jun. 23, 2020, 8 pages.
*EIS GmbH* v. *USPTO*, "Complaint," filed with the United States District Court for the Eastern District of Virginia in connection with Case No. 1:20-cv-00430-LMB-TCB on Apr. 17, 2020, 636 pages.
*EIS GmbH* v. *USPTO*, "Amended Complaint," filed with the United States District Court for the Eastern District of Virginia in connection with Case No. 1:20-cv-00430-LMB-TCB on Jun. 25, 2020, 577 pages.
United States Patent and Trademark Office, "Corrected Notice of Allowability," issued in connection with U.S. Appl. No. 15/354,599, dated Jul. 13, 2020, 2 pages.
United States Patent and Trademark Office, "Corrected Notice of Allowability," issued in connection with U.S. Appl. No. 15/354,599, dated Aug. 3, 2020, 2 pages.
United States and Trademark Office, "Corrected Notice of Allowability," issued in connection with U.S. Appl. No. 15/965,117, dated Jul. 22, 2020, 3 pages.
United States Patent and Trademark Office, "Supplemental Notice of Allowability," issued in connection with U.S. Appl. No. 15/719,085, dated Jul. 27, 2020, 2 pages.
United States Patent and Trademark Office, "Corrected Notice of Allowability," issued in connection with U.S. Appl. No. 15/965,208, dated Jul. 22, 2020, 3 pages.
"Decision Granting Petitioner's Request on Rehearing of Decision Denying Institution, Granting Institution of Inter Partes Review," issued by the United States Patent and Trademark Office in connection with Case IPR2019-01444 on Aug. 11, 2020, 13 pages.
*EIS, Inc.* v. *Wow Tech International GmbH*, "Notice of Supplemental Authority in Support of Plaintiff EIS Inc.'s Opposition to Defendants' Motion to Dismiss," filed with the United States District Court for the District of Delaware in connection with Case No. 1:19-cv-01227-LPS on Aug. 14, 2020, 17 pages.
European Patent Office, "Extended European Search Report," issued in connection with European Application No. 17190856.9, on May 14, 2018, 30 pages. (English translation included.).
European Patent Office, "European Search Report," issued in connection with European Application No. 17190856.9, on Feb. 2, 2018, 34 pages. (English translation included.).
The International Bureau of WIPO, "International Report on Patentability," issued in connection with International Application No. PCT/EP2017/075399, on Apr. 9, 2019, 15 pages.
International Searching Authority, "Written Opinion," issued in connection with International Application No. PCT/EP2017/075399, on Apr. 25, 2018, 14 pages.
International Searching Authority, "International Search Report," issued in connection with International Application No. PCT/EP2017/075399, on Apr. 25, 2018, 9 pages. (English Translation Included.).
IP Australia, "Examination Report No. 1 for Standard Patent Application," issued in connection with Australian Application No. 2015386680, on Nov. 15, 2017, 3 pages.
IP Australia, "Examination Report No. 1 for Standard Patent Application," issued in connection with Australian Application No. 2018203659, on Dec. 14, 2018, 2 pages.
Canadian Patent Office, "Office Action," issued in connection with Canadian Application No. 2,978,495, on Nov. 20, 2017, 4 pages.
Canadian Patent Office, "Office Action," issued in connection with Canadian Application No. 2,978,495, on Apr. 11, 2018, 4 pages.
China National Intellectual Property Administration, "First Office Action," issued in connection with Chinese Application No. 201580077725.3, on Feb. 3, 2019, 5 pages (English translation included).
German Patent and Trademark Office, "Examination Report," issued in connection with German Application No. 10 2015 103 694.0, on Mar. 24, 2015, 8 pages. (English translation included.).
German Patent and Trademark Office, "Examination Report," issued in connection with German Application No. 10 2015 103 694.0, on Dec. 7, 2016, 12 pages. (English translation included.).
European Patent Office, "Extended European Search Report," issued in connection with European Patent Application No. 18175171.0, on Sep. 14, 2018, 28 pages. (English translation included.).
European Patent Office, "Communication Pursuant to Article 94 (3) EPC," issued in connection with European Application No. 18175171.0, on Jun. 14, 2019, 8 pages. (English translation included.).
New Zealand Intellectual Property Office, "First Examination Report," issued in connection with NZ Application No. 735229, on May 2, 2018, 4 pages.
New Zealand Intellectual Property Office, "Further Examination Report," issued in connection with NZ Application No. 735229, on Dec. 17, 2018, 3 pages.
The International Bureau of WIPO, "International Preliminary Report on Patentability," issued in connection with International Application No. PCT/EP2015/067017, on Sep. 19, 2017, 13 pages. (corresponds to English translation of Written Opinion for International Application No. PCT/EP2015/067017 dated Jul. 22, 2016, cited as NPL 6 in IDS filed on Sep. 29, 2023).
IP Australia, "Examination Report No. 1 for Standard Patent Application," issued in connection with Australian Patent Application No. 2014323661, on Mar. 2, 2017, 4 pages.
IP Australia, "Examination Report No. 1 for Standard Patent Application," issued in connection with Australian Application No. 2018200852, on Feb. 15, 2018, 5 pages.
Canadian Patent Office, "Office Action," issued in connection with Canadian Patent Application No. 2,923,526, on May 24, 2018, 5 pages.
Canadian Patent Office, "Office Action," issued in connection with Canadian Patent Application No. 2,923,526, on Oct. 16, 2018, 3 pages.
China National Intellectual Property Administration, "First Office Action," issued in connection with Chinese Patent Application No. 201480052194.8, on Sep. 28, 2016, 7 pages. (English Translation Included.).
China National Intellectual Property Administration, "Second Office Action," issued in connection with Chinese Patent Application No. 201480052194.8, on Jan. 3, 2017, 10 pages. (English Translation Included.).
China National Intellectual Property Administration, "Third Office Action," issued in connection with Chinese Patent Application No. 201480052194.8, on Jul. 4, 2017, 11 pages. (English Translation Included.).
China National Intellectual Property Administration, "First Office Action," issued in connection with Chinese Patent Application No. 201710709587.7, on Feb. 28, 2019, 5 pages. (English Translation Included.).

(56) References Cited

OTHER PUBLICATIONS

German Patent and Trademark Office, "Office Action," issued in connection with German Patent Application No. 10 2013 110 501.7, on Oct. 1, 2013, 8 pages. (English translation included.).
German Patent and Trademark Office, "Office Action," issued in connection with German Patent Application No. 10 2013 110 501.7, on Apr. 15, 2014, 8 pages. (English translation included.).
German Patent and Trademark Office, "Office Action," issued in connection with German Patent Application No. 10 2013 110 501.7, on Feb. 6, 2015, 10 pages. (English translation included.).
German Patent and Trademark Office, "Office Action," issued in connection with German Patent Application No. 10 2013 110 501.7, on Nov. 18, 2015, 8 pages. (English translation included.).
German Patent and Trademark Office, "Office Action," issued in connection with German Patent Application No. 10 2013 022 511.6, on May 9, 2019, 16 pages. (English translation included.).
German Patent and Trademark Office, "Office Action," issued in connection with German Patent Application No. 10 2013 022 512.4, on May 3, 2019, 14 pages. (English translation included.).
German Patent and Trademark Office, "Office Action," issued in connection with German Patent Application No. 10 2013 022 520.5, on May 9, 2019, 14 pages. (English translation included.).
European Patent Office, "Communication Pursuant to Article 94 (3) EPC," issued in connection with European Application No. 14741640.8, on Aug. 23, 2016, 8 pages. (English translation included.).
European Patent Office, "Communication Pursuant to Article 94 (3) EPC," issued in connection with European Application No. 14741640.8, on Mar. 8, 2018, 12 pages. (English translation included.).
European Patent Office, "Communication Pursuant to Article 94 (3) EPC," issued in connection with European Application No. 17202385.5, on May 18, 2018, 12 pages. (English translation included.).
European Patent Office, "Result of the Consultation" issued in connection with European Application No. 17202385.5, on Jul. 18, 2018, 6 pages. (English translation included.).
European Patent Office, "Search Report," issued in connection with European Application No. 17202385.5, on Mar. 8, 2018, 6 pages. (English translation included.).
European Patent Office, "Communication Pursuant to Article 94 (3) EPC," issued in connection with European Application No. 17202394.7, on May 18, 2018, 12 pages. (English translation included.).
European Patent Office, "Result of the Consultation" issued in connection with European Application No. 17202394.7, on Jul. 18, 2018, 6 pages. (English translation included.).
European Patent Office, "Search Report," issued in connection with European Application No. 17202394.7, on Mar. 8, 2018, 8 pages. (English translation included.).
European Patent Office, "Communication Pursuant to Article 94 (3) EPC," issued in connection with European Application No. 18206800.7, on Apr. 8, 2019, 10 pages. (English translation included.).
European Patent Office, "Search Report," issued in connection with European Application No. 18206800.7, on Feb. 27, 2019, 8 pages. (English translation included.).
International Searching Authority, "Written Opinion of the International Searching Authority," issued in connection with International Application No. PCT/EP2014/065734, on Sep. 25, 2014, 19 pages. (English Translation Included.).
The International Bureau of WIPO, "International Preliminary Report on Patentability," issued in connection with International Application No. PCT/EP2014/065734, on Mar. 29, 2016, 7 pages. (corresponds to English translation of Written Opinion for International Application No. PCT/EP2014/065734 dated Sep. 25, 2014, cited herein as NPL43).
United States Patent and Trademark Office, "Notice of Allowance and Fee(s) Due," issued in connection with Design U.S. Appl. No. 29/590,450, filed May 8, 2018, 7 pages.
United States Patent and Trademark Office, "Notice of Allowance and Fee(s) Due," issued in connection with Design U.S. Appl. No. 35/502,986, filed May 1, 2018, 9 pages.
United Stated Patent and Trademark Office, "Notice of Allowance and Fee(s) Due," issued in connection with U.S. Appl. No. 15/719,085, filed Jul. 3, 2019, 12 pages.
European Patent Office, "Examination Report," issued in connection with application No. 15748202.7 on Jun. 24, 2019, 8 pages (English translation included).
"Petition for Inter Partes Review of U.S. Pat. No. 9,763,851," filed with the United States Patent and Trademark Office on Jul. 31, 2019, 87 pages.
"Petition for Inter Partes Review of U.S. Pat. No. 9,763,851," Exhibit 1001, filed with the United States Patent and Trademark Office on Jul. 31, 2019, 17 pages.
"Petition for Inter Partes Review of U.S. Pat. No. 9,763,851," Exhibit 1002, filed with the United States Patent and Trademark Office on Jul. 31, 2019, 109 pages.
"Petition for Inter Partes Review of U.S. Pat. No. 9,763,851," Exhibit 1003 Part 1, filed with the United States Patent and Trademark Office on Jul. 31, 2019, 649 pages.
"Petition for Inter Partes Review of U.S. Pat. No. 9,763,851," Exhibit 1003 Part 2, filed with the United States Patent and Trademark Office on Jul. 31, 2019, 663 pages.
"Petition for Inter Partes Review of U.S. Pat. No. 9,763,851," Exhibit 1004, filed with the United States Patent and Trademark Office on Jul. 31, 2019, 11 pages.
"Petition for Inter Partes Review of U.S. Pat. No. 9,763,851," Exhibit 1005, filed with the United States Patent and Trademark Office on Jul. 31, 2019, 34 pages.
"Petition for Inter Partes Review of U.S. Pat. No. 9,763,851," Exhibit 1006, filed with the United States Patent and Trademark Office on Jul. 31, 2019, 46 pages.
"Petition for Inter Partes Review of U.S. Pat. No. 9,763,851," Exhibit 1007, filed with the United States Patent and Trademark Office on Jul. 31, 2019, 36 pages.
"Petition for Inter Partes Review of U.S. Pat. No. 9,763,851," Exhibit 1008, filed with the United States Patent and Trademark Office on Jul. 31, 2019, 46 pages.
"Petition for Inter Partes Review of U.S. Pat. No. 9,763,851," Exhibit 1009, filed with the United States Patent and Trademark Office on Jul. 31, 2019, 5 pages.
"Petition for Inter Partes Review of U.S. Pat. No. 9,763,851," Exhibit 1010, filed with the United States Patent and Trademark Office on Jul. 31, 2019, 61 pages.
"Petition for Inter Partes Review of U.S. Pat. No. 9,763,851," Exhibit 1011, filed with the United States Patent and Trademark Office on Jul. 31, 2019, 6 pages.
"Petition for Inter Partes Review of U.S. Pat. No. 9,763,851," Exhibit 1012, filed with the United States Patent and Trademark Office on Jul. 31, 2019, 1049 pages. (Uploaded in 3 parts.).
United States Patent and Trademark Office, "Non-Final Office Action," issued in connection with U.S. Appl. No. 15/965,208, filed Aug. 22, 2019, 17 pages.
United States Patent and Trademark Office, "Notice of Allowance and Fee(s) Due," issued in connection with U.S. Appl. No. 15/354,599, filed Aug. 29, 2019, 19 pages.
IP Australia, "Notice of Opposition," issued in connection with Australian Patent Application No. 2015386680 on Jun. 21, 2018, 4 pages.
"Opponent's Letter," filed with IP Australia in connection with Australian Patent Application No. 2015386680 on Jun. 28, 2019, 10 pages.
IP Australia, "General Correspondence," issued in connection with Australian Patent Application No. 2015386680 on Jul. 24, 2019, 2 pages.
"Opponent's Letter," filed with IP Australia in connection with Australian Patent Application No. 2015386680 on Aug. 7, 2019, 2 pages.
IP Australia, "Reg, 5.23," issued in connection with Australian Patent Application No. 2015386680 on Aug. 16, 2019, 4 pages.
"Statement of Grounds and Particulars of Opposition," filed with IP Australia in connection with Australian Patent Application No. 201803659 on Aug. 14, 2019, 15 pages.
"Exhibit D1," filed with IP Australia in connection with Australian Patent Application No. 2018203659 on Aug. 14, 2019, 9 pages.

(56) References Cited

OTHER PUBLICATIONS

"Exhibit D2," filed with IP Australia in connection with Australian Patent Application No. 2018203659 on Aug. 14, 2019, 9 pages.
"Exhibit D3," filed with IP Australia in connection with Australian Patent Application No. 2018203659 on Aug. 14, 2019, 51 pages.
"Exhibit D4," filed with IP Australia in connection with Australian Patent Application No. 2018203659 on Aug. 14, 2019, 6 pages.
"Exhibit D5," filed with IP Australia in connection with Australian Patent Application No. 2018203659 on Aug. 14, 2019, 5 pages.
"Exhibit D6," filed with IP Australia in connection with Australian Patent Application No. 2018203659 on Aug. 14, 2019, 3 pages.
"Exhibit D7," filed with IP Australia in connection with Australian Patent Application No. 2018203659 on Aug. 14, 2019, 28 pages.
"Exhibit D8," filed with IP Australia in connection with Australian Patent Application No. 2018203659 on Aug. 14, 2019, 8 pages.
"Exhibit D9," filed with IP Australia in connection with Australian Patent Application No. 2018203659 on Aug. 14, 2019, 11 pages.
"Exhibit D10," filed with IP Australia in connection with Australian Patent Application No. 2018203659 on Aug. 14, 2019, 33 pages.
"Exhibit D11," filed with IP Australia in connection with Australian Patent Application No. 2018203659 on Aug. 14, 2019, 2 pages.
"Exhibit D12," filed with IP Australia in connection with Australian Patent Application No. 2018203659 on Aug. 14, 2019, 9 pages.
IP Australia, "Opposition—Statement or Grounds and Particulars," issued in connection with Australian Patent Application No. 2018203659 on Aug. 15, 2019, 1 page.
"Grounds on Appeal," issued by the German Federal Patent Court in connection with appeal regarding German Patent No. 102013110501.7 on May 22, 2023, 67 pages (includes English translation).
European Patent Office, Board of Appeals, "Oral Proceedings: Minutes," issued in connection with opposition of European Patent No. EP2976057 on May 24, 2023, 14 pages (includes English translation).
European Patent Office, Board of Appeals, "Decision of May 16, 2023," issued in connection with opposition of European Patent No. EP2976057 on Jun. 21, 2023, 46 pages (includes English translation).
European Patent Office, Board of Appeals, "Oral Proceedings: Minutes," issued in connection with opposition of European Patent No. EP3308762 on May 24, 2023, 16 pages (includes English translation).
European Patent Office, Board of Appeals, "Decision of May 16, 2023," issued in connection with opposition of European Patent No. EP3308762 on Jun. 21, 2023, 48 pages (includes English translation).
*EIS Inc*. v. *IntiHealth Ger GmbH* et al., "Letter to The Honorable Gregory B. Williams from Jack B. Blumenfeld Regarding Discovery Dispute (Redacted Public Version)," filed with the United States District Court for the District of Delaware in connection with Case No. 1:19-cv-1227-GBW on Apr. 6, 2023 (redacted version filed Apr. 13, 2023), 433 pages (uploaded in 4 parts).
*EIS Inc*. v. *IntiHealth Ger GmbH* et al., "Defendant-Counterclaimant Novoluto's Reply Letter to the Honorable Gregory B. Williams Regarding Alleged Privilege Waiver by Defendants," filed with the United States District Court for the District of Delaware in connection with Case No. 1:19-cv-1227-GBW on Apr. 12, 2023, 4 pages.
"Preliminary Court Opinion," issued by the German Federal Patent Court in connection with appeal regarding German Patent No. 102013110501.7 on Dec. 14, 2022, 46 pages (includes English translation).
"Minutes of Oral Proceeding," issued by the German Federal Patent Court in connection with appeal regarding German Patent No. 102013110501.7 on Jan. 31, 2023, 9 pages (includes English translation).
*EIS Inc*. v. *IntiHealth Ger GmbH* et al., "Official Transcript of Markman Hearing Held on Nov. 21, 2022," issued on Nov. 29, 2022, in connection with Case No. 1:19-cv-1227-GBW before the United States District Court for the District of Delaware, 208 pages.
*EIS Inc*. v. *IntiHealth Ger GmbH* et al., "Memorandum Opinion," issued by the United States District Court for the District of Delaware in connection with Case No. 1:19-cv-1227-GBW on Jan. 9, 2023, 47 pages.
*EIS Inc*. v. *IntiHealth Ger GmbH* et al., "Defendants' Reply in Support of Its Motion for Leave to File Early Motion for Partial Summary Judgment," filed with the United States District Court for the District of Delaware in connection with Case No. 1:19-cv-1227-GBW on Jan. 17, 2023, 6 pages.
*EIS Inc*. v. *IntiHealth Ger GmbH* et al., "Plaintiff and Counterclaim-Defendants' Motion to Strike Untimely Doctrine of Equivalents Allegations," filed with the United States District Court for the District of Delaware in connection with Case No. 1:19-cv-1227-GBW on Mar. 6, 2023, 3 pages.
*EIS Inc*. v. *IntiHealth Ger GmbH* et al., "Letter to the Honorable Gregory B. Williams Regarding Counterclaim-Defendants' Motion to Strike Untimely Doctrine of Equivalents Allegations," filed with the United States District Court for the District of Delaware in connection with Case No. 1:19-cv-1227-GBW on Mar. 6, 2023, 25 pages.
*EIS Inc*. v. *IntiHealth Ger GmbH* et al., "Defendant/Counterclaimant Novoluto Gmbh's Motion to Strike Plaintiff and Counterclaim-Defendants' Election of Prior-Art-Based Invalidity Arguments Pursuant to IPR Estoppel, 35 U.S.C. § 315(E)(2)," filed with the United States District Court for the District of Delaware in connection with Case No. 1:19-CV-1227-GBW on Mar. 9, 2023, 3 pages.
*EIS Inc*. v. *IntiHealth Ger GmbH* et al., "Letter to the Honorable Gregory B. Williams from Paul D. Brown Regarding Defendant and Counterclaimant Novoluto GmbH's Motion to Strike Plaintiff's and Counterclaim-Defendants' Election of Prior-Art-Based Invalidity Arguments Pursuant to IPR Estoppel, 35 U.S.C. § 315(E)(2)," filed with the United States District Court for the District of Delaware in connection with Case No. 1:19-cv-1227-GBW on Mar. 9, 2023, 640 pages.
*EIS Inc*. v. *IntiHealth Ger GmbH* et al., "Letter to the Honorable Gregory B. Williams from Paul D. Brown Regarding Response to Counterclaim Defendants' Motion to Strike Doctrine of Equivalents Allegations," filed with the United States District Court for the District of Delaware in connection with Case No. 1:19-cv-1227-GBW on Mar. 13, 2023, 2 pages.
*EIS Inc*. v. *IntiHealth Ger GmbH* et al., "Letter to the Honorable Gregory B. Williams from Jack B. Blumenfeld Regarding Opposition to Defendants' Motion to Strike EIS's Election of Prior-Art-Based Invalidity Arguments," filed with the United States District Court for the District of Delaware in connection with Case No. 1:19-cv-1227-GBW on Mar. 20, 2023, 16 pages.
*EIS Inc*. v. *IntiHealth Ger GmbH* et al., "Letter to the Honorable Gregory B. Williams from Gregory E. Stuhlman, Esquire Regarding Reply Letter Regarding Defendant-Counterclaimant Novoluto GmbH's Motion to Strike Plaintiff's and Counterclaim-Defendants' Election of Prior-Art-Based Invalidity Arguments Pursuant to IPR Estoppel," filed with the United States District Court for the District of Delaware in connection with Case No. 1:19-cv-1227-GBW on Mar. 21, 2023, 9 pages.
*EIS Inc*. v. *IntiHealth Ger GmbH* et al., "Letter to the Honorable Gregory B. Williams from Jack B. Blumenfeld Regarding Response to the Court's Oral Order," filed with the United States District Court for the District of Delaware in connection with Case No. 1:19-cv-1227-GBW on Mar. 30, 2023, 1 page.
*Novoluto GmbH* v. *Uccellini LLC*, "Motion for Entry of Default and for Leave to Move for Default Judgment Pursuant to Fed. R. Civ. P. 55(b)(2)," filed with the United States District Court for the District of Oregon in connection with Case No. 6:20-cv-02284-MK on Mar. 15, 2023, 5 pages.
*Novoluto GmbH* v. *Uccellini LLC*, "Declaration of Tammy J. Terry in Support of Motion for Entry of Default and for Leave to Move for Default Judgment," filed with the United States District Court for the District of Oregon in connection with Case No. 6:20-cv-02284-MK on Mar. 15, 2023, 3 pages.
"Judgment," issued by the United States Court of Appeals for the Federal Circuit in connection with cases 2021-2215, 2022-1020, and 2022-1191 (Consolidated Appeal from the United States Patent

(56) References Cited

OTHER PUBLICATIONS and Trademark Office, Patent Trial and Appeal Board of Inter Partes Review Nos. IPR2019-01302, IPR2019-01444, and IPR2020-00007) on Mar. 13, 2023, 2 pages.
United States Patent and Trademark Office, "Notice of Allowance," issued in connection with U.S. Appl. No. 16/339,969, dated Dec. 8, 2022, 7 pages.
United States Patent and Trademark Office, "Notice of Allowance," issued in connection with U.S. Appl. No. 15/888,568, dated Jan. 18, 2023, 8 pages.
United States Patent and Trademark Office, "Non-Final Office Action," issued in connection with U.S. Appl. No. 16/752,283, dated Jan. 19, 2023, 16 pages.
United States Patent and Trademark Office, "Non-Final Office Action," issued in connection with U.S. Appl. No. 17/029,974, dated Feb. 28, 2023, 100 pages.
United States Patent and Trademark Office, "Non-Final Office Action," issued in connection with U.S. Appl. No. 17/403,609, dated Mar. 16, 2023, 6 pages.
United States Patent and Trademark Office, "Final Office Action," issued in connection with U.S. Appl. No. 16/811,907, dated Apr. 7, 2023, 32 pages.
United States Patent and Trademark Office, "Non-Final Office Action," issued in connection with U.S. Appl. No. 16/339,969, dated Apr. 12, 2023, 12 pages.
*EIS Inc.* v. *IntiHealth Ger GmbH* et al., "Plaintiff EIS, Inc.'s Notice of Subsequent Authority in Support of Its Opposition to Defendants' Motion to Strike EIS's Election of Prior-Art Based Invalidity Arguments (Redacted Public Version)," filed with the United States District Court for the District of Delaware in connection with Case No. 1:19-cv-1227-GBW on May 11, 2023, 1,179 pages (uploaded in 6 parts).
*EIS Inc.* v. *IntiHealth Ger GmbH* et al., "Letter to the Honorable Gregory B. Williams Regarding Counterclaim—Defendants' Motion to Strike Untimely Discovery and Expert Disclosures (Redacted Public Version)," filed with the United States District Court for the District of Delaware in connection with Case No. 1:19-cv-1227-GBW on May 16, 2023, 173 pages.
*EIS Inc.* v. *IntiHealth Ger GmbH* et al., "Plaintiff's and Counter-claim Defendants' Opening Brief in Support of Their Daubert Motion to Exclude Opinions of Robert L. Stoll (Redacted Public Version)," filed with the United States District Court for the District of Delaware in connection with Case No. 1:19-cv-1227-GBW on May 17, 2023, 16 pages.
*EIS Inc.* v. *IntiHealth Ger GmbH* et al., "Declaration of Allan M. Soobert in Support of Plaintiff's and Counterclaim Defendants' Daubert Motion to Exclude Opinions of Robert L. Stoll (Redacted Public Version)," filed with the United States District Court for the District of Delaware in connection with Case No. 1:19-cv-1227-GBW on May 17, 2023, 111 pages.
*EIS Inc.* v. *IntiHealth Ger GmbH* et al., "Plaintiff's and Counter-claim Defendants' Opening Brief in Support of Their Daubert Motion to Exclude Certain "Stimulation Device" Opinions (Public Version)," filed with the United States District Court for the District of Delaware in connection with Case No. 1:19-cv-1227-GBW on May 19, 2023, 9 pages.
*EIS Inc.* v. *IntiHealth Ger GmbH* et al., "Declaration of Allan M. Soobert in Support of Plaintiff's and Counterclaim Defendants' Opening Brief in Support of Their Daubert Motion to Exclude Certain "Stimulation Device" Opinions (Public Version)," filed with the United States District Court for the District of Delaware in connection with Case No. 1:19-cv-1227-GBW on May 19, 2023, 498 pages (uploaded in 2 parts).
*EIS Inc.* v. *IntiHealth Ger GmbH* et al., "Plaintiff's and Counter-claim Defendants' Opening Brief in Support of Their Daubert Motion to Exclude Certain Opinions of Drs. Cameron and Herbenick (Public Version)," filed with the United States District Court for the District of Delaware in connection with Case No. 1:19-cv-1227-GBW on May 19, 2023, 9 pages.
*EIS Inc.* v. *IntiHealth Ger GmbH* et al., "Declaration of Allan M. Soobert in Support of Plaintiff's and Counterclaim Defendants' Daubert Motion to Exclude Certain Opinions of Drs. Cameron and Herbenick (Public Version)," filed with the United States District Court for the District of Delaware in connection with Case No. 1:19-cv-1227-GBW on May 19, 2023, 125 pages (uploaded in 2 parts).
*EIS Inc.* v. *IntiHealth Ger GmbH* et al., "Plaintiff's and Counter-claim Defendants' Opening Brief in Support of Their Daubert Motion to Exclude the Opinions of Dr. Debra Herbenick (Public Version)," filed with the United States District Court for the District of Delaware in connection with Case No. 1:19-cv-1227-GBW on May 19, 2023, 8 pages.
*EIS Inc.* v. *IntiHealth Ger GmbH* et al., "Declaration of Allan M. Soobert in Support of Plaintiff's and Counterclaim Defendants' Daubert Motion to Exclude the Opinions of Dr. Debra Herbenick (Public Version)," filed with the United States District Court for the District of Delaware in connection with Case No. 1:19-cv-1227-GBW on May 19, 2023, 697 pages (uploaded in 3 parts).
*EIS Inc.* v. *IntiHealth Ger GmbH* et al., "Plaintiff's and Counter-claim Defendants' Brief in Support of Motion No. 2 for Partial Summary Judgment That the Asserted Claims of U.S. Pat. Nos. 11,090,220, 11,103,418, 9,937,097 Are Not Entitled to an Effective Filing Date of Their Respective Earliest U.S. Parent Patents (Public Version)," filed with the United States District Court for the District of Delaware in connection with Case No. 1:19-CV-1227-GBW on May 19, 2023, 10 pages.
*EIS Inc.* v. *IntiHealth Ger GmbH* et al., "Declaration of Allan M. Soobert in Support of Plaintiff's and Counterclaim Defendants' Motion No. 2 for Partial Summary Judgment That the Asserted Claims of U.S. Pat. Nos. 11,090,220, 11,103,418, 9,937,097 Are Not Entitled to an Effective Filing Date of Their Respective Earliest U.S. Parent Patents (Public Version)," filed with the United States District Court for the District of Delaware in connection with Case No. 1:19-cv-1227-GBW on May 19, 2023, 274 pages (uploaded in 2 parts).
*EIS Inc.* v. *IntiHealth Ger GmbH* et al., "Plaintiff's and Counter-claim Defendants' Concise Statement of Facts in Support of Motion No. 2 for Partial Summary Judgment That the Asserted Claims Of U.S. Pat. Nos. 11,090,220, 11,103,418, 9,937,097 Are Not Entitled to an Effective Filing Date of Their Respective Earliest U.S. Parent Patents (Public Version)," filed with the United States District Court for the District of Delaware in connection with Case No. 1:19-cv-1227-GBW on May 19, 2023, 8 pages.
*EIS Inc.* v. *IntiHealth Ger GmbH* et al., "Plaintiff's and Counter-claim Defendants' Brief in Support of Motion No. 4 for Partial Summary Judgment of Noninfringement of All Asserted Claims of U.S. Pat. No. 9,763,851 (Public Version)," filed with the United States District Court for the District of Delaware in connection with Case No. 1:19-cv-1227-GBW on May 19, 2023, 10 pages.
*EIS Inc.* v. *IntiHealth Ger GmbH* et al., "Declaration of Allan M. Soobert in Support of Plaintiff's and Counterclaim Defendants' Motion No. 4 for Partial Summary Judgment of Noninfringement of All Asserted Claims of U.S. Pat. No. 9,763,851 (Public Version)," filed with the United States District Court for the District of Delaware in connection with Case No. 1:19-cv-1227-GBW on May 19, 2023, 182 pages (uploaded in 3 parts).
*EIS Inc.* v. *IntiHealth Ger GmbH* et al., "Plaintiff's Concise Statement of Facts in Support of Motion No. 4 for Partial Summary Judgment of Noninfringement of All Asserted Claims of U.S. Pat. No. 9,763,851 (Public Version)," filed with the United States District Court for the District of Delaware in connection with Case No. 1:19-cv-1227-GBW on May 19, 2023, 8 pages.
*EIS Inc.* v. *IntiHealth Ger GmbH* et al., "Plaintiff's and Counter-claim Defendants' Brief in Support of Their Motion No. 5 for Partial Summary Judgment of Invalidity of the Asserted Claims of U.S. Pat. Nos. 11,090,220 and 11, 103,418 (Public Version)," filed with the United States District Court for the District of Delaware in connection with Case No. 1:19-cv-1227-GBW on May 19, 2023, 6 pages.
*EIS Inc.* v. *IntiHealth Ger GmbH* et al., "Declaration of Allan M. Soobert in Support of Plaintiff's and Counterclaim Defendants' Motion No. 5 for Partial Summary of Invalidity of the Asserted

(56) References Cited

OTHER PUBLICATIONS

Claims of U.S. Pat. Nos. 11,090,220 and 11,103,418 (Public Version)," filed with the United States District Court for the District of Delaware in connection with Case No. 1:19-cv-1227-GBW on May 19, 2023, 168 pages (uploaded in 2 parts).
*EIS Inc*. v. *IntiHealth Ger GmbH* et al., "Plaintiff's and Counterclaim Defendants' Concise Statement of Facts in Support of Their Motion No. 5 for Partial Summary Judgment of Invalidity of the Asserted Claims of U.S. Pat. Nos. 11,090,220 and 11,103,418 (Public Version)," filed with the United States District Court for the District of Delaware in connection with Case No. 1:19-cv-1227-GBW on May 19, 2023, 4 pages.
*EIS Inc*. v. *IntiHealth Ger GmbH* et al., "Reply Letter to the Honorable Gregory B. Williams in Support of Counterclaim-Defendants' Motion to Strike Untimely Discovery and Expert Disclosures," filed with the United States District Court for the District of Delaware in connection with Case No. 1:19-cv-1227-GBW on May 19, 2023, 28 pages.
Eros by NuGyn, Inc., May 31, 2011, available at https://www.youtube.com/watch?v=N9c3fv6vfeg, 1 page.
*EIS Inc*. v. *IntiHealth Ger GmbH* et al., "Plaintiff's and Counterclaim Defendants' Answering Brief in Opposition to Defendants' Summary Judgment and Daubert Motions (Redacted Public Version)," filed with the United States District Court for the District of Delaware in connection with Case No. 1:19-cv-1227-GBW on Jun. 16, 2023, 61 pages.
*EIS Inc*. v. *IntiHealth Ger GmbH* et al., "Plaintiff and Counterclaim Defendants' Statement of Material Facts and Responsive Statement of Material Facts (Redacted Public Version)," filed with the United States District Court for the District of Delaware in connection with Case No. 1:19-cv-1227-GBW on Jun. 16, 2023, 28 pages.
*EIS Inc*. v. *IntiHealth Ger GmbH* et al., "Declaration of Allan M. Soobert in Support of Plaintiff and Counterclaim Defendants' Opposition to Defendants' Motions for Partial Summary Judgment and Daubert Motions and Exhibits A-C," filed with the United States District Court for the District of Delaware in connection with Case No. 1:19-cv-1227-GBW on Jun. 16, 2023, 62 pages.
*EIS Inc*. v. *IntiHealth Ger GmbH* et al., "Exhibit D filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 124 pages (uploaded in 4 parts).
*EIS Inc*. v. *IntiHealth Ger GmbH* et al., "Exhibits E filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 91 pages.
*EIS Inc*. v. *IntiHealth Ger GmbH* et al., "Exhibit F filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 40 pages.
*EIS Inc*. v. *IntiHealth Ger GmbH* et al., "Exhibit G filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 110 pages.
*EIS Inc*. v. *IntiHealth Ger GmbH* et al., "Exhibit H filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 116 pages.
*EIS Inc*. v. *IntiHealth Ger GmbH* et al., "Exhibit I-N filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 101 pages.
*EIS Inc*. v. *IntiHealth Ger GmbH* et al., "Exhibits O-S filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 119 pages.
*EIS Inc*. v. *IntiHealth Ger GmbH* et al., "Exhibit T filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 325 pages.
*EIS Inc*. v. *IntiHealth Ger GmbH* et al., "Exhibit U filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 275 pages.
*EIS Inc*. v. *IntiHealth Ger GmbH* et al., "Exhibits V-AP filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-CV-1227-GBW on Jun. 16, 2023, 140 pages.
*EIS Inc*. v. *IntiHealth Ger GmbH* et al., "Exhibits AQ-BX filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 230 pages.
*EIS Inc*. v. *IntiHealth Ger GmbH* et al., "Defendants' Statement of Undisputed Material Facts in Support of Its Opposition to Plaintiff's and Counterclaimdefendants' Motion for Partial Summary Judgment (No. 4)," filed with the United States District Court for the District of Delaware in connection with Case No. 1:19-cv-1227-GBW on Jun. 2, 2023, 5 pages.
*EIS Inc*. v. *IntiHealth Ger GmbH* et al., "Defendants' Statement of Undisputed Material Facts in Support of Its Opposition to Plaintiff and Counterclaimdefendants' Motion for Partial Summary Judgment (No. 5)," filed with the United States District Court for the District of Delaware in connection with Case No. 1:19-cv-1227-GBW on Jun. 2, 2023, 4 pages.
*EIS Inc*. v. *IntiHealth Ger GmbH* et al., "Plaintiff's and Counterclaim Defendants' Reply in Support of Its Daubert Motion to Exclude Opinions of Robert L. Stoll," filed with the United States District Court for the District of Delaware in connection with Case No. 1:19-cv-1227-GBW on Jun. 9, 2023, 9 pages.
*EIS Inc*. v. *IntiHealth Ger GmbH* et al., "Plaintiff's and Counterclaim Defendants' Reply in Support of Their Daubert Motion to Exclude Certain "Stimulation Device" Opinions," filed with the United States District Court for the District of Delaware in connection with Case No. 1:19-cv-1227-GBW on Jun. 9, 2023, 5 pages.
*EIS Inc*. v. *IntiHealth Ger GmbH* et al., "Plaintiff's and Counterclaim Defendants' Reply in Support of Their Daubert Motion to Exclude Certain Opinions of Drs. Cameron and Herbenick," filed with the United States District Court for the District of Delaware in connection with Case No. 1:19-cv-1227-GBW on Jun. 9, 2023, 7 pages.
*EIS Inc*. v. *IntiHealth Ger GmbH* et al. "Declaration of Allan M. Soobert in Support of Plaintiff and Counterclaim Defendants' Reply in Support of Their Daubert Motion to Exclude Certain Opinions of Drs. Cameron and Herbenick," filed with the United States District Court for the District of Delaware in connection with Case No. 1:19-cv-1227-GBW on Jun. 9, 2023, 92 pages.
*EIS Inc*. v. *IntiHealth Ger GmbH* et al. "Plaintiff's and Counterclaim Defendants' Reply in Support of Its Daubert Motion to Exclude Opinions of Dr. Debra Herbenick," filed with the United States District Court for the District of Delaware in connection with Case No. 1:19-cv-1227-GBW on Jun. 9, 2023, 5 pages.

(56) References Cited

OTHER PUBLICATIONS

*EIS Inc*. v. *IntiHealth Ger GmbH* et al., "Plaintiff's and Counter-claim Defendants' Reply in Support of Their Motion for Partial Summary Judgment as to Effective Filing Date of the Asserted Claims of U.S. Pat. Nos. 11,090,220, 11,103,418, 9,937,097 (No. 2)," filed with the United States District Court for the District of Delaware in connection with Case No. 1:19-cv-1227-GBW on Jun. 9, 2023, 16 pages (includes publicly available version of Exhibit N retrieved from PACER).
*EIS Inc*. v. *IntiHealth Ger GmbH* et al., "Plaintiff's and Counter-claim Defendants' Response to Defendants' Statement of Material Facts Regarding Motion No. 2 for Partial Summary Judgment That the Asserted Claims of U.S. Pat. Nos. 11,090,220, 11,103,418, 9,937,097 are Not Entitled to an Effective Filing Date of Their Respective Earliest U.S. Parent Patents," filed with the United States District Court for the District of Delaware in connection with Case No. 1:19-cv-1227-GBW on Jun. 9, 2023, 7 pages.
*EIS Inc*. v. *IntiHealth Ger GmbH* et al., "Plaintiff's and Counter-claim Defendants' Reply in Support of Their Motion for Partial Summary Judgment of Noninfringement of All Asserted Claims of U.S. Pat. No. 9,763,851 (No. 4)," filed with the United States District Court for the District of Delaware in connection with Case No. 1:19-cv-1227-GBW on Jun. 9, 2023, 7 pages.
*EIS Inc*. v. *IntiHealth Ger GmbH* et al., "Plaintiff's and Counter-claim Defendants' Response to Defendant's Statement of Undis-puted Material Facts in Support of Its Opposition to Plaintiff and Counterclaim-Defendants' Motion for Partial Summary Judgment (No. 4)," filed with the United States District Court for the District of Delaware in connection with Case No. 1:19-cv-1227-GBW on Jun. 9, 2023, 5 pages.
*EIS Inc*. v. *IntiHealth Ger GmbH* et al., "Plaintiff's and Counter-claim Defendants' Reply in Support of Their Motion No. 5 for Partial Summary Judgment of Invalidity of the Asserted Claims of U.S. Pat. Nos. 11,090,220 and 11, 103,418," filed with the United States District Court for the District of Delaware in connection with Case No. 1:19- CV-1227-GBW on Jun. 9, 2023, 5 pages.
*EIS Inc*. v. *IntiHealth Ger GmbH* et al., "Plaintiff's and Counter-claim Defendants' Response to Defendant's Statement of Undis-puted Material Facts in Support of Its Opposition to Plaintiff and Counterclaim-Defendants' Motion for Partial Summary Judgment (No. 5)," filed with the United States District Court for the District of Delaware in connection with Case No. 1:19-cv-1227-GBW on Jun. 9, 2023, 6 pages.
*EIS Inc*. v. *IntiHealth Ger GmbH* et al., "Memorandum Order," issued by the United States District Court for the District of Delaware in connection with Case No. 1:19-cv-1227-GBW on Jun. 13, 2023, 3 pages.
*EIS Inc*. v. *IntiHealth Ger GmbH* et al., "Plaintiff's Letter Brief iin Opposition to Defendants' Motion to Strike Portions of Dr. Abra-ham's Reports on Invalidity," filed with the United States District Court for the District of Delaware in connection with Case No. 1:19-cv-1227-GBW on Jul. 6, 2023, 8 pages.
*EIS Inc*. v. *IntiHealth Ger GmbH* et al., "Defendant Novoluto's Concise Statement of Material Facts in Support of Its Motion for Summary Judgment of IPR Estoppel (Redacted Public Version)," filed with the United States District Court for the District of Delaware in connection with Case No. 1:19-cv-1227-GBW on Aug. 4, 2023, 8 pages.
*EIS Inc*. v. *IntiHealth Ger GmbH* et al., "Defendants' and Coun-terclaim Defendants' Answering Brief in Opposition to Defendants' Motion for Summary Judgment of IPR Estoppel (Redacted Public Version)," filed with the United States District Court for the District of Delaware in connection with Case No. 1:19-cv-1227-GBW on Aug. 14, 2023, 16 pages.
*EIS Inc*. v. *IntiHealth Ger GmbH* et al., "Declaration of Allan M. Soobert in Support of Plaintiff and Counterclaim Defendants' Opposition to Defendants' Motion for Summary Judgment of IPR Estoppel vol. 1 of 2 (Redacted Public Version) and Exhibit A (attachments 1-9)," filed with the United States District Court for the District of Delaware in connection with Case No. 1:19-cv-1227-GBW on Aug. 14, 2023, 239 pages.
*EIS Inc*. v. *IntiHealth Ger GmbH* et al., "Exhibit A (attachments 10-18) filed with Declaration of Allan M. Soobert in Support of Plaintiff and Counterclaim Defendants' Opposition to Defendants' Motion for Summary Judgment of IPR Estoppel vol. 1 of 2 (Redacted Public Version)," filed with the United States District Court for the District of Delaware in connection with Case No. 1:19-cv-1227-GBW on Aug. 14, 2023, 236 pages.
*EIS Inc*. v. *IntiHealth Ger GmbH* et al., "Exhibit A (attachments 19-23) filed with Declaration of Allan M. Soobert in Support of Plaintiff and Counterclaim Defendants' Opposition to Defendants' Motion for Summary Judgment of IPR Estoppel vol. 1 of 2 (Redacted Public Version)," filed with the United States District Court for the District of Delaware in connection with Case No. 1:19-cv-1227-GBW on Aug. 14, 2023, 239 pages.
*EIS Inc*. v. *IntiHealth Ger GmbH* et al., "Declaration of Allan M. Soobert in Support of Plaintiff and Counterclaim Defendants' Opposition to Defendants' Motion for Summary Judgment of IPR Estoppel vol. 2 of 2 (Redacted Public Version) and Exhibit A (attachments 23-29)," filed with the United States District Court for the District of Delaware in connection with Case No. 1:19-cv-1227-GBW on Aug. 14, 2023, 266 pages.
*EIS Inc*. v. *IntiHealth Ger GmbH* et al., "Exhibits B-D filed with Declaration of Allan M. Soobert in Support of Plaintiff and Coun-terclaim Defendants' Opposition to Defendants' Motion for Sum-mary Judgment of IPR Estoppel vol. 2 of 2 (Redacted Public Version)," filed with the United States District Court for the District of Delaware in connection with Case No. 1:19-cv-1227-GBW on Aug. 14, 2023, 204 pages.
*EIS Inc*. v. *IntiHealth Ger GmbH* et al., "Plaintiff's and Counter-claim Defendants' Statement of Material Facts and Responsive Statement of Material Facts (Redacted Public Version)," filed with the United States District Court for the District of Delaware in connection with Case No. 1:19-cv-1227-GBW on Aug. 14, 2023, 9 pages.
*Novoluto GmbH* v. *Uccellini LLC*, "First Amended Complaint," filed with the United States District Court for the District of Oregon in connection with Case No. 6:20-cv-02284-MK on Feb. 4, 2022, 369 pages (uploaded in 3 parts).
*Novoluto GmbH* v. *Uccellini LLC*, "Answer and Affirmative Defenses to First Amended Complaint," filed with the United States District Court for the District of Oregon in connection with Case No. 6:20-cv-02284-MK on Feb. 17, 2022, 18 pages.
*Novoluto GmbH* v. *Uccellini LLC*, "Novoluto GmbH's Notice that Claim Construction Briefing and Hearing Are Unnecessary," filed with the United States District Court for the District of Oregon in connection with Case No. 6:20-cv-02284-MK on Dec. 22, 2022, 29 pages.
Smith, J., "Fetish Fantasy Series Clit Pump: PD323100," May 21, 2013, https://www.youtube.com/watch?V=zJbKY1SQDas, 1 page.
FunkyCondom, "Jesse's Vibro Pussy Sucker," Feb. 5, 2011, https://www.youtube.com/watch?v=-YpufGFnKHQ, 1 page.
SexToyCanada, "Dr. Laura Berman Selene Vibrating Clitoral Pump Product Demo," Jun. 20, 2013, https://www.youtube.com/watch?v=4ZMybp0yWxU, 1 page.
Novelties for Lovers, "Dr. Laura Berman—Intimate Basics—Selene—Vibrating Clit Pump," Feb. 16, 2014, https://www.youtube.com/watch?v =-t85zgK2wHg, 1 page.
SexToyCanada, "Dr Laura Berman Intimate Basics Collection Thea Waterproof Silicone Clitoral PumpProduct D," Nov. 4, 2014, https://www.youtube.com/watch?v=K5jfBESc8p0.
SexToySuperMall, "Advanced Clitoral Pump," Sep. 1, 2009, https://www.youtube.com/watch?v=rlEaFHeiDCI, 1 page.
DiscreetFantasy, "Advanced Clitoral Pumps: SE062350," May 14, 2013, https://www.youtube.com/watch?v=E8a8J6TjENE, 1 page.
Pipedream, "Fetish Fantasy Series: Vibrating Stimulators," 2012, http://web.archive.org/web/20121105173055/http:/www.pipedreamproducts.com/showsection-20b.php?Section=04&Sub1=Vibrating%20Stimulators, 3 pages.
Extreme Restraints, "The Clit Intensifier Pump," 2022, https://www.extremerestraints.com/the-clit-intensifier-pump.html, 6 pages.

(56) References Cited

OTHER PUBLICATIONS

Extreme Restraints, "Unique Vibrators," 2012, http://web.archive.org/web/20120104164504/http:/www.extremerestraints.com/unique-vibrators_85/, 2 pages.
Katherine McAlpine, "Balls, Cups and Discs: A History of Vibrators and Massage Machines, 1900-1940, Dissertation 2012," available at https://www.academia.edu/28556168/Balls_Cups_and_Discs_A_history_of_vibrators_and_massage_machines_1900_1940_Dissertation_2012, 41 pages.
CalExotics, Intimate Pump Vibro Pussy Sucker, 2022, https://calexotics.com/intimate-pump-vibro-pussy-sucker/, 5 pages.
MySexToySpot.com, "Clit Suckers & Pussy Pumps," 2013, available at https://web.archive.org/web/20131214165302/http://mysextoyspot.com/Extras/Pussy-Pumps-Pelvic-Exercisers/Clit-Suckers-Pussy-Pumps, 2 pages.
California Exotic Novelties, "Couture Collection," 2009, available at https://web.archive.org/web/20100628224310/calexotics.com/index.php, 3 pages.
Schroder, M. et al., "Clitoral Therapy Device for Treatment of Sexual Dysfunction in Irradiated Cervical Cancer Patients," 2005, International Journal of Radiation Oncology Biology Physics, 61(4), pp. 1078-1086, 9 pages.
Cellulite, "A Little Cellulite: Primer for the Beauty Vital 1000/1002/3000 and the TheraVac," Oct. 31, 2013, available at https://www.yumpu.com/de/document/read/21185793/c-e-l-l-u-l-i-t-e-mag-frenkel-midovital, 10 pages (English translation provided upon request).
*EIS, Inc.* v. *Wow Tech International GmbH*, "Third Amended Complaint," filed with the United States District Court for the District of Delaware in connection with Case No. 1:19-cv-01227-LPS on Sep. 16, 2021, 753 pages. (uploaded in 5 parts).
"Brief for Appellant EIS GmbH" filed with the United States Court of Appeals for the Federal Circuit in connection with cases 2021-2215, 2022-1020, and 2022-1191 (Consolidated Appeal from the United States Patent and Trademark Office, Patent Trial and Appeal Board in Nos. IPR2019-01302, IPR2019-01444, and IPR2020-00007), filed Apr. 25, 2022, 321 pages (uploaded in 3 parts).
"Brief of Appellee Novoluto GmbH," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007), filed Jun. 21, 2022, 52 pages.
"Appellant's Reply Brief," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007), filed Aug. 2, 2022, 26 pages.
"Joint Appendix, vol. I of II," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007), filed Aug. 9, 2022, 674 pages (uploaded in 9 parts).
"Joint Appendix, vol. II of II," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007), filed Aug. 9, 2022, 682 pages (uploaded in 9 parts).
United States Patent and Trademark Office, "Office Action," issued in connection with U.S. Appl. No. 16/339,969, dated December 21, 2021, 7 pages.
United States Patent and Trademark Office, "Notice of Allowance," issued in connection with U.S. Appl. No. 16/339,969, dated April 4, 2022, 7 pages.
United States Patent and Trademark Office, "Non-Final Office Action," issued in connection with U.S. Appl. No. 16/811,907, dated July 22, 2022, 30 pages.
United States Patent and Trademark Office, "Notice of Allowance," issued in connection with U.S. Appl. No. 16/339,969, dated Aug. 10, 2022, 7 pages.
United States Patent and Trademark Office, "Notice of Allowance," issued in connection with U.S. Appl. No. 15/888,568, dated Aug. 26, 2022, 8 pages.
United States Patent and Trademark Office, "Final Office Action," issued in connection with U.S. Appl. No. 16/752,283, dated Oct. 11, 2023, 17 pages.
United States Patent and Trademark Office, "Notice of Allowance," issued in connection with U.S. Appl. No. 15/888,568, dated Oct. 19, 2023, 9 pages.
United States Patent and Trademark Office, "Notice of Allowance," issued in connection with U.S. Appl. No. 16/811,907 dated Oct. 30, 2023, 15 pages.
United States Patent and Trademark Office, "Final Office Action," issued in connection with U.S. Appl. No. 17/029,974, dated Nov. 24, 2023, 98 pages.
United States Patent and Trademark Office, "Final Office Action," issued in connection with U.S. Appl. No. 17/403,609, dated Dec. 21, 2023, 22 pages.
United States Patent and Trademark Office, "Non-Final Office Action," issued in connection with U.S. Appl. No. 17/044,501, dated Dec. 21, 2023, 16 pages.
United States Patent and Trademark Office, "Non-Final Office Action," issued in connection with U.S. Appl. No. 17/044,503, dated Dec. 21, 2023, 11 pages.
United States Patent and Trademark Office, "Final Office Action," issued in connection with U.S. Appl. No. 16/339,969, dated Jan. 24, 2024, 9 pages.
United States Patent and Trademark Office, "Advisory Action," issued in connection with U.S. Appl. No. 16/752,283, dated Jan. 31, 2024, 5 pages.
"Written Request for Invalidation and Exhibits," filed by third party with the Chinese National Intellectual Property Administration in connection with Chinese Patent Application No. 201480052194.8 on Oct. 18, 2023, 79 pages (includes English translation of written request for invalidation).
Chinese National Intellectual Property Administration, "Reexamination Decision," issued in connection with Chinese Patent Application No. 201580077725.3, dated Dec. 21, 2023, 19 pages (includes English translation).
European Patent Office, "Summons to Attend Oral Proceedings," issued in connection with opposition of European Patent No. 3267960 on Oct. 18, 2024, 48 pages (includes English translation).
European Patent Office, "Summons to Attend Oral Proceedings," issued in connection with opposition of European Patent No. 3400926 on Dec. 5, 2024, 66 pages (includes English translation).
"Response to the Complaint," filed with the European Patent Office in connection with opposition of European Patent No. EP3705106 on Nov. 19, 2024, 212 pages (includes English translation).
"Opposition to a European Patent," filed with the European Patent Office action in connection with opposition of European Patent No. 3998055 on Dec. 23, 2024, 237 pages (includes English translation).
"Opposition to a European Patent," filed with the European Patent Office action in connection with opposition of European Patent No. 3773406 on Dec. 27, 2024, 176 pages (includes English translation).
"Opposition to a European Patent, Exhibit D7" filed with the European Patent Office action in connection with opposition of European Patent No. 3773406 on Dec. 27, 2024, 10 pages (includes English translation).
"Opposition to a European Patent, Exhibit D10" filed with the European Patent Office action in connection with opposition of European Patent No. 3773406 on Dec. 27, 2024, 30 pages (includes English translation).
United States Patent and Trademark Office, "Office Action," issued in connection with U.S. Appl. No. 16/339,969, dated Oct. 21, 2024, 15 pages.

(56) References Cited

OTHER PUBLICATIONS

United States Patent and Trademark Office, "Office Action," issued in connection with U.S. Appl. No. 17/601,392, dated Dec. 4, 2024, 12 pages.
United States Patent and Trademark Office, "Notice of Allowance," issued in connection with U.S. Appl. No. 16/339,969, dated Jan. 6, 2025, 13 pages.
European Patent Office, "Extended European Search Report," issued in connection with European Patent Application No. 24195102.9, dated Nov. 14, 2024, 17 pages (includes English translation).
"Complaint Response," filed with the German Patent and Trademark in connection with opposition of German Patent No. 102013110501.7 on Apr. 14, 2022, 71 pages (includes English translation).
"Complaint Response, Exhibit ES2," filed with the German Patent and Trademark in connection with opposition of German Patent No. 102013110501.7 on Apr. 14, 2022, 82 pages.
"Accession of the Alleged Patent Infringer According to Art. 105 EPC," filed with the European Patent Office by Triple A Sales GmBH in connection with European Patent No. EP2976057 on May 3, 2022, 86 pages (includes English translation).
"Accession of the Alleged Patent Infringer According to Art. 105 EPC, Exhibit B1," filed with the European Patent Office by Triple A Sales GmBH in connection with European Patent No. EP2976057 on May 3, 2022, 16 pages (includes English translation).
"Accession of the Alleged Patent Infringer According to Art. 105 EPC, Exhibit B2," filed with the European Patent Office by Triple A Sales GmBH in connection with European Patent No. EP2976057 on May 3, 2022, 4 pages (includes English translation).
"Accession of the Alleged Patent Infringer According to Art. 105 EPC, Exhibit B3," filed with the European Patent Office by Triple A Sales GmBH in connection with European Patent No. EP2976057 on May 3, 2022, 12 pages (includes English translation).
"Accession of the Alleged Patent Infringer According to Art. 105 EPC, Exhibit B4," filed with the European Patent Office by Triple A Sales GmBH in connection with European Patent No. EP2976057 on May 3, 2022, 1 page.
"Accession of the Alleged Patent Infringer According to Art. 105 EPC, Exhibit B5," filed with the European Patent Office by Triple A Sales GmBH in connection with European Patent No. EP2976057 on May 3, 2022, 2 pages (includes English translation).
"Accession of the Alleged Patent Infringer According to Art. 105 EPC, Exhibit 50," filed with the European Patent Office by Triple A Sales GmBH in connection with European Patent No. EP2976057 on May 3, 2022, 24 pages.
"Accession of the Alleged Patent Infringer According to Art. 105 EPC, Exhibit 50A," filed with the European Patent Office by Triple A Sales GmBH in connection with European Patent No. EP2976057 on May 3, 2022, 24 pages.
"Accession of the Alleged Patent Infringer According to Art. 105 EPC, Exhibit 51," filed with the European Patent Office by Triple A Sales GmBH in connection with European Patent No. EP2976057 on May 3, 2022, 18 pages (includes English translation).
"Accession of the Alleged Patent Infringer According to Art. 105 EPC," filed with the European Patent Office by Triple A Sales GmBH in connection with European Patent No. 3308762 on May 3, 2022, 82 pages (includes English translation).
"Accession of the Alleged Patent Infringer According to Art. 105 EPC, Exhibit B1," filed with the European Patent Office by Triple A Sales GmBH in connection with European Patent No. EP3308762 on May 3, 2022, 16 pages (includes English translation).
"Accession of the Alleged Patent Infringer According to Art. 105 EPC, Exhibit B2," filed with the European Patent Office by Triple A Sales GmBH in connection with European Patent No. EP3308762 on May 3, 2022, 4 pages (includes English translation).
"Accession of the Alleged Patent Infringer According to Art. 105 EPC, Exhibit B3," filed with the European Patent Office by Triple A Sales GmBH in connection with European Patent No. EP3308762 on May 3, 2022, 12 pages (includes English translation).
"Accession of the Alleged Patent Infringer According to Art. 105 EPC, Exhibit B4," filed with the European Patent Office by Triple A Sales GmBH in connection with European Patent No. EP3308762 on May 3, 2022, 1 page.
"Accession of the Alleged Patent Infringer According to Art. 105 EPC, Exhibit B5," filed with the European Patent Office by Triple A Sales GmBH in connection with European Patent No. EP3308762 on May 3, 2022, 2 pages (includes English translation).
"Accession of the Alleged Patent Infringer According to Art. 105 EPC, Exhibit 43," filed with the European Patent Office by Triple A Sales GmBH in connection with European Patent No. EP3308762 on May 3, 2022, 24 pages.
"Accession of the Alleged Patent Infringer According to Art. 105 EPC, Exhibit 43A," filed with the European Patent Office by Triple A Sales GmBH in connection with European Patent No. EP3308762 on May 3, 2022, 24 pages.
"Accession of the Alleged Patent Infringer According to Art. 105 EPC, Exhibit 44," filed with the European Patent Office by Triple A Sales GmBH in connection with European Patent No. EP3308762 on May 3, 2022, 12 pages.
"Appeal Letter," filed with the European Patent Office by Novoluto GmBH in connection with European Patent No. EP2976057 on Jul. 20, 2022, 148 pages (includes English translation).
"Appeal Letter," filed with the European Patent Office by Novoluto GmBH in connection with European Patent No. EP3308762 on Jul. 20, 2022, 148 pages (includes English translation).
"Notification of an Opposition," issued by the European Patent Office in connection with European Patent No. EP375106 on Oct. 11, 2022, opposition filed by EIS GmbH, 128 pages (includes English translation).
"Opposition to a European Patent, Exhibit D6" filed with the European Patent Office by EIS GmbH in connection with European Patent No. EP375106 on Oct. 5, 2022, 18 pages (includes English translation).
"Opposition to a European Patent, Exhibit D7" filed with the European Patent Office by EIS GmbH in connection with European Patent No. EP375106 on Oct. 5, 2022, 18 pages (includes English translation).
"Opposition to a European Patent, Exhibit D8" filed with the European Patent Office by EIS GmbH in connection with European Patent No. EP375106 on Oct. 5, 2022, 18 pages (includes English translation).
Chinese National Intellectual Property Adminstration, "Fourth Office Action," issued in connection with Chinese Patent Application No. 201480052194.8, dated Oct. 10, 2022, 17 pages (includes English translation).
"Opposition to a European Patent," filed with the European Patent Office action in connection with opposition of European Patent No. 3773954 on Sep. 27, 2024, 116 pages (includes English translation).
"Opposition to a European Patent, Exhibit D1," filed with the European Patent Office action in connection with opposition of European Patent No. 3773954 on Sep. 27, 2024, 4 pages (includes English translation).
United States Patent and Trademark Office, "Office Action," issued in connection with U.S. Appl. No. 17/044,501, dated Jul. 5, 2024, 15 pages.
United States Patent and Trademark Office, "Office Action," issued in connection with U.S. Appl. No. 17/044,503, dated Jul. 5, 2024, 8 pages.
United States Patent and Trademark Office, "Office Action," issued in connection with U.S. Appl. No. 17/461,609, dated Aug. 6, 2024, 45 pages.
IP Australia, "Examination Report No. 2 for Standard Patent Application," issued in connection with Australian Application No. 2022203319, on Jul. 16, 2024, 4 pages.
IP Australia, "Examination Report No. 1 for Standard Patent Application," issued in connection with Australian Application No. 2020200457, on Aug. 29, 2024, 4 pages.
IP Australia, "Examination Report No. 2 for Standard Patent Application," issued in connection with Australian Application No. 2020200457, on Oct. 22, 2024, 5 pages.
*Novoluto GmbH* v. *XR, LLC*, "Answer, Affirmative Defenses and Counterclaims of Defendant XR, LLC and Request for Jury Trial,"

(56) References Cited

OTHER PUBLICATIONS filed with the United States District Court for the Central District of California, Southern Division, in connection with Case No. 8:24-cv-01907-JDE on Oct. 11, 2024, 31 pages.
*Novoluto GmbH* v. *XR, LLC*, "Exhibit 1 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 18 pages.
*Novoluto GmbH* v. *XR, LLC*, "Exhibit 2 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 10 pages.
*Novoluto GmbH* v. *XR, LLC*, "Exhibit 3 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 10 pages.
*Novoluto GmbH* v. *XR, LLC*, "Exhibit 4 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 10 pages.
*Novoluto GmbH* v. *XR, LLC*, "Exhibit 5 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 18 pages.
*Novoluto GmbH* v. *XR, LLC*, "Exhibit 6 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 12 pages.
"Written Request for Invalidation and Exhibits," filed by third party with the Chinese National Intellectual Property Administration in connection with Chinese Patent Application No. 201480052194.8 on Aug. 16, 2023, 74 pages (includes English translation of written request for invalidation).
"Supplemental Opinion," filed by third party with the Chinese National Intellectual Property Administration in connection with Chinese Patent Application No. 201480052194.8 on Sep. 11, 2023, 64 pages (includes English translation).
"Written Request for Invalidation and Exhibits," filed by third party with the Chinese National Intellectual Property Administration in connection with Chinese Patent Application No. 201480052194.8 on Sep. 25, 2023, 85 pages (includes English translation of written request for invalidation).
China National Intellectual Property Administration, "Fourth Office Action," issued in connection with Chinese Application No. CN201710709587.7, on Feb. 28, 2024, 10 pages (includes English translation).
European Patent Office, "Information About the Result of Oral Proceedings," issued in connection with opposition of European Patent No. 3705106 on Feb. 8, 2024, 34 pages (includes English translation).
European Patent Office, "Decision Revoking the European Patent," issued in connection with opposition of European Patent No. 3705106 on Mar. 19, 2024, 192 pages (includes English translation).
European Patent Office, "Decision Revoking the European Patent," issued in connection with opposition of European Patent No. 3305266 on Mar. 28, 2024, 303 pages (includes English translation).
IP Australia, "Examination Report," issued in connection with Australian Application No. 2020201615 on Feb. 9, 2024, 8 pages.
Canadian Patent Office, "Office Action," issued in connection with Canadian Patent Application No. 3,095,965 on Apr. 10, 2024, 5 pages.
United States Patent and Trademark Office, "Notice of Allowance," issued in connection with U.S. Appl. No. 16/811,907, dated Feb. 16, 2024, 16 pages.
United States Patent and Trademark Office, "Notice of Allowance," issued in connection with U.S. Appl. No. 16/752,283, dated Apr. 15, 2024, 9 pages.
Petition for Inter Partes Review of U.S. Pat. No. 9,763,851, filed Jul. 31, 2019 (assigned case No. IPR2019-01444), 87 pages.
Patent Owner's Preliminary Response to IPR Petition for U.S. Pat. No. 9,763,851, filed in case No. IPR2019-01444 on Nov. 14, 2019, 88 pages.
Patent Owner's Response Pursuant to 37 C.F.R. § 42.120, filed in case No. IPR2019-01444 on Nov. 3, 2020, filed in case No. IPR2019-01444, 94 pages.
Petitioner's Reply to Patent Owner's Response, filed in case No. IPR2019-01444 on Jan. 26, 2021, 41 pages.
Final Written Decision Determining No Challenged Claims Unpatentable, issued by the Patent Trial and Appeal Board in case No. IPR2019-01444 for U.S. Pat. No. 9,763,851, dated Aug. 5, 2021, 53 pages.
Opening Expert Report of Dr. John Abraham, Ph. D., Regarding the Invalidity of U.S. Pat. Nos. 9,763,851; 11,090,220; 11,103,418; 9,849,061; and 9,937,097, dated Feb. 9, 2023, in connection with *EIS Inc.* v. *IntiHealth Ger GmbH* et al., Case No. 1:19-cv-1227-GBW, in the United States District Court for the District of Delaware, 525 pages (uploaded in 5 parts).
Rebuttal Expert Report of Dr. Kimberly K. Cameron, Ph.D. on Validity (Redacted Version), dated Mar. 22, 2023, in connection with *EIS Inc.* v. *IntiHealth Ger GmbH* et al., Case No. 1:19-cv-1227-GBW, in the United States District Court for the District of Delaware, 245 pages.
Reply Expert Report of Dr. John P. Abraham, Ph.D. (Redacted Version), dated Apr. 12, 2023, in connection with *EIS Inc.* v. *IntiHealth Ger GmbH* et al., Case No. 1:19-cv-1227-GBW, in the United States District Court for the District of Delaware, 179 pages.
Excerpt of Trial Transcript corresponding to testimony of Dr. Kimberly K. Cameron, Ph.D. on Sep. 13, 2023, in *EIS Inc.* v. *IntiHealth Ger GmbH* et al., Case No. 1:19-cv-1227-GBW, in the United States District Court for the District of Delaware, 33 pages.
Jury Verdict Form completed by jury on Sep. 16, 2023 in *EIS Inc.* v. *IntiHealth Ger GmbH* et al., Case No. 1:19-cv-1227-GBW, in the United States District Court for the District of Delaware, 17 pages.
"Opposition to a European Patent," filed with the European Patent Office by EIS GmbH in connection with European Patent No. 3267960 on Mar. 7, 2024, 236 pages (includes English translation).
"Opposition to a European Patent, Exhibit D3" filed with the European Patent Office by EIS GmbH in connection with European Patent No. 3267960 on Mar. 7, 2024, 6 pages (includes English translation).
"Opposition to a European Patent, Exhibit D4" filed with the European Patent Office by EIS GmbH in connection with European Patent No. 3267960 on Mar. 7, 2024, 4 pages (includes English translation).
"Opposition to a European Patent, Exhibit D5" filed with the European Patent Office by EIS GmbH in connection with European Patent No. 3267960 on Mar. 7, 2024, 46 pages (includes English translation).
"Opposition to a European Patent, Exhibit D6" filed with the European Patent Office by EIS GmbH in connection with European Patent No. 3267960 on Mar. 7, 2024, 25 pages (includes English translation).
"Opposition to a European Patent, Exhibit D7" filed with the European Patent Office by EIS GmbH in connection with European Patent No. 3267960 on Mar. 7, 2024, 43 pages (includes English translation).
"Opposition to a European Patent, Exhibit D9" filed with the European Patent Office by EIS GmbH in connection with European Patent No. 3267960 on Mar. 7, 2024, 4 pages (includes English translation).

(56) References Cited

OTHER PUBLICATIONS

"Opposition to a European Patent, Exhibit D13" filed with the European Patent Office by EIS GmbH in connection with European Patent No. 3267960 on Mar. 7, 2024, 4 pages (includes English translation).
European Patent Office, "Brief Communication—Opposition Proceedings," issued in connection with opposition of European Patent No. 3267960 on Mar. 22, 2024, 6 pages (includes English translation).
"Opposition to a European Patent," filed with the European Patent Office by EIS GmbH in connection with European Patent No. 3400926 on Mar. 7, 2024, 236 pages (includes English translation).
"Opposition to a European Patent, Exhibit D18" filed with the European Patent Office by EIS GmbH in connection with European Patent No. 3400926 on Mar. 7, 2024, 2 pages (includes English translation).
"Opposition to a European Patent, Exhibit D19" filed with the European Patent Office by EIS GmbH in connection with European Patent No. 3400926 on Mar. 7, 2024, 18 pages (includes English translation).
"Opposition to a European Patent, Exhibit D20" filed with the European Patent Office by EIS GmbH in connection with European Patent No. 3400926 on Mar. 7, 2024, 12 pages (includes English translation).
"Opposition to a European Patent, Exhibit D21" filed with the European Patent Office by EIS GmbH in connection with European Patent No. 3400926 on Mar. 7, 2024, 10 pages (includes English translation).
"Opposition to a European Patent, Exhibit D22" filed with the European Patent Office by EIS GmbH in connection with European Patent No. 3400926 on Mar. 7, 2024, 44 pages (includes English translation).
European Patent Office, "Brief Communication—Opposition Proceedings," issued in connection with opposition of European Patent No. 3400926 on Mar. 22, 2024, 6 pages (includes English translation).
European Patent Office, "Notification under Article 94 (3) EPC," issued in connection with European Patent Application No. 18206800.7 on May 10, 2022, 8 pages (includes English translation).
European Patent Office, "Notice of Submission of Third Party Observation," issued in connection with European Patent Application No. 18206800.7 on Feb. 7, 2024, 6 pages (includes English translation).
European Patent Office, "Notification under Article 94 (3) EPC," issued in connection with European Patent Application No. 18206800.7 on Feb. 27, 2024, 10 pages (includes English translation).
IP Australia, "Opposition—Decision Issued," issued in connection with Australian Patent Application No. 2015386680 on Oct. 2, 2020, 53 pages.
IP Australia, "Opposition—Section 104 Amendments," issued in connection with Australian Patent Application No. 2018203659 on Jun. 30, 2021, 14 pages.
"Opponent Comments Regarding Final Determination," filed with the Australian in connection with opposition of Australian Patent Application No. 2018203659 on Feb. 18, 2022, 11 pages.
IP Australia, "Opposition—Decision Issued," issued in connection with Australian Patent Application No. 2018203659 on Apr. 28, 2022, 7 pages.
IP Australia, "Examination Report No. 1 for Standard Patent Application," issued in connection with Australian Application No. 2022203319, on Aug. 1, 2023, 6 pages.
European Patent Office, "Notification under Article 94 (3) EPC," issued in connection with European Application No. 19161328.0 on Nov. 2, 2020, 8 pages (includes English translation).
European Patent Office, "Extended European Search Report," issued in connection with European Patent Application No. 21216838.9 on Apr. 5, 2022, 15 pages (includes English translation).
European Patent Office, "Transmittal of Decision / Summons," issued in connection with opposition of European Patent No. 3705106 on Jun. 13, 2023, 37 pages (includes English translation).
"Written Submission in Preparation to/during Oral Proceedings," filed with the European Patent Office by EIS GmbH in connection with European Patent No. 3705106 on Dec. 8, 2023, 56 pages (includes English translation).
European Patent Office, "Transmittal of Decision / Summons," issued in connection with opposition of European Patent No. 3405158 on Jun. 14, 2021, 27 pages (includes English translation).
"Written Submission in Preparation to/during Oral Proceedings," filed with the European Patent Office by EIS GmbH in connection with opposition of European Patent No. 3405158 on Dec. 7, 2021, 82 pages (includes English translation).
European Patent Office, "Transmittal of Decision / Summons," issued in connection with opposition of European Patent No. 3405158 on May 18, 2022, 67 pages (includes English translation).
IP Australia, "Examination Report," issued in connection with Australian Application No. 2017341098 on Jan. 27, 2022, 5 pages.
IP Australia, "Examination Report," issued in connection with Australian Application No. 2017341098 on May 10, 2022, 6 pages.
IP Australia, "Examination Report," issued in connection with Australian Application No. 2017341098 on Sep. 20, 2022, 5 pages.
IP Australia, "Examination Report," issued in connection with Australian Application No. 2019250096 on Jul. 1, 2022, 4 pages.
IP Australia, "Examination Report," issued in connection with Australian Application No. 2019250096 on Oct. 25, 2022, 5 pages.
Canadian Patent Office, "Office Action," issued in connection with Canadian Patent Application No. 3098337 on Mar. 18, 2022, 5 pages.
Canadian Patent Office, "Office Action," issued in connection with Canadian Patent Application No. 3098337 on Jan. 19, 2023, 4 pages.
German Patent and Trademark Office, "Examination Report," issued in connection with German Application No. 102018107939 on Mar. 29, 2019, 12 pages (includes English translation).
European Patent Office, "Extended European Search Report," issued in connection with European Patent Application No. EP 19153494.0 on Sep. 17, 2019, 12 pages (includes English translation).
European Patent Office, "Notification under Article 94 (3) EPC," issued in connection with European Application No. 19153494.0 on Jun. 4, 2020, 8 pages (includes English translation).
European Patent Office, "Extended European Search Report," issued in connection with European Patent Application No. 21175706.7 on Sep. 20, 2021, 12 pages (includes English translation).
European Patent Office, "Transmittal of Decision/Summons," issued in connection with opposition of European Patent No. 3685809 on Oct. 25, 2022, 35 pages (includes English translation).
"Written Submission in Preparation to/during Oral Proceedings," filed with the European Patent Office by EIS GmbH in connection with opposition of European Patent No. 3685809 on Mar. 24, 2023, 44 pages (includes English translation).
European Patent Office, "Transmittal of Decision / Summons," issued in connection with opposition of European Patent No. 3685809 on Jun. 22, 2023, 283 pages (includes English translation).
"Statement of Grounds of Appeal," filed with the European Patent Office by EIS GmbH in connection with opposition of European Patent No. 3685809 on Nov. 1, 2023, 188 pages (includes English translation).
IP Australia, "Examination Report," issued in connection with Australian Application No. 2019247064 on Feb. 25, 2022, 4 pages.
IP Australia, "Examination Report," issued in connection with Australian Application No. 2019247064 on Jul. 15, 2022, 4 pages.
Canadian Patent Office, "Office Action," issued in connection with Canadian Patent Application No. 3095965 on Feb. 8, 2022, 5 pages.
Canadian Patent Office, "Office Action," issued in connection with Canadian Patent Application No. 3095965 on Jan. 23, 2023, 5 pages.
European Patent Office, "Notification under Article 94 (3) EPC," issued in connection with European Application No. 19787154.4 on Apr. 19, 2023, 10 pages (includes English translation).
German Patent and Trademark Office, "Examination Report," issued in connection with German Application No. 10 2018 107 961.3 on May 23, 2019, 22 pages (includes English translation).
*EIS Inc.* v. *IntiHealth Ger GmbH* et al., "Joint Claim Construction Brief (Redacted—Public Version)," filed with the United States

(56) References Cited

OTHER PUBLICATIONS

District Court for the District of Delaware in connection with Case No. 1:19-cv-1227-VAC-MPT on Jul. 7, 2022, 101 pages.
*EIS Inc.* v. *IntiHealth Ger GmbH* et al., "Appendix to Joint Claim Construction Brief, vol. 1 of 2, Exhibits 12, 13, 15-20, and 22-50," filed with the United States District Court for the District of Delaware in connection with Case No. 1:19-cv-1227-VAC-MPT on Jun. 30, 2022, 869 pages (uploaded in 3 parts).
*EIS Inc.* v. *IntiHealth Ger GmbH* et al., "Appendix to Joint Claim Construction Brief, vol. 2 of 2, Exhibits 51-41," filed with the United States District Court for the District of Delaware in connection with Case No. 1:19-cv-1227-VAC-MPT on Jun. 30, 2022, 261 pages.
*EIS Inc.* v. *IntiHealth Ger GmbH* et al., "Exhibits 14 and 21 to Appendix Joint Claim Construction Brief (Redacted—Public Version)," filed with the United States District Court for the District of Delaware in connection with Case No. 1:19-cv-1227-VAC-MPT on Jul. 7, 2022, 25 pages.
*EIS Inc.* v. *IntiHealth Ger GmbH* et al., "Plaintiff and Counterclaim-Defendants' Comments and Objections on Novoluto's Technology Tutorial," filed with the United States District Court for the District of Delaware in connection with Case No. 1:19-cv-1227-VAC-MPT on Jun. 30, 2022, 8 pages.
*EIS Inc.* v. *IntiHealth Ger GmbH* et al., "Letter to the Honorable Gregory B. Williams from Gregory E. Stuhlman, Esquire Regarding Notifying the Court that Wow Tech Will Present Live Expert Witnesses at the Upcoming Claim Construction Hearing," filed with the United States District Court for the District of Delaware in connection with Case No. 1:19-cv-1227-GBW on Nov. 11, 2022, 2 pages.
*EIS Inc.* v. *IntiHealth Ger GmbH* et al., "Letter to the Honorable Gregory B. Williams from Brian P. Egan Regarding Claim Construction Disputes," filed with the United States District Court for the District of Delaware in connection with Case No. 1:19-cv-1227-GBW on Nov. 16, 2022, 6 pages.
*EIS Inc.* v. *IntiHealth Ger GmbH* et al., "Defendants' Motion and Memorandum in Support of Its Motion for Leave to File Early Motion for Partial Summary Judgment," filed with the United States District Court for the District of Delaware in connection with Case No. 1:19-cv-1227-GBW on Dec. 20, 2022, 21 pages.
*EIS Inc.* v. *IntiHealth Ger GmbH* et al., "Order," issued by the United States District Court for the District of Delaware in connection with Case No. 1:19-cv-1227-GBW on Jan. 9, 2023, 2 pages.
*EIS Inc.* v. *IntiHealth Ger GmbH* et al., "Plaintiff's Answering Brief in Opposition to Defendants' Motion for Leave to File Early Motion for Partial Summary Judgment," filed with the United States District Court for the District of Delaware in connection with Case No. 1:19-cv-1227-GBW on Jan. 10, 2023, 24 pages.
*EIS Inc.* v. *IntiHealth Ger GmbH* et al., "Memorandum Opinion," issued by the United States District Court for the District of Delaware in connection with Case No. 1:19-cv-1227-GBW on Aug. 23, 2023, unsealed on Sep. 5, 2023, 22 pages.
*EIS Inc.* v. *IntiHealth Ger GmbH* et al., "Letter to the Honorable Gregory B. Williams from Brian P. Eagan Regarding Case Narrowing," filed with the United States District Court for the District of Delaware in connection with Case No. 1:19-cv-1227-GBW on Sep. 7, 2023, 3 pages.
*EIS Inc.* v. *IntiHealth Ger GmbH* et al., "Letter to the Honorable Gregory B. Williams Regarding IPR," filed with the United States District Court for the District of Delaware in connection with Case No. 1:19-cv-1227-GBW on Sep. 12, 2023, 3 pages.
*EIS Inc.* v. *IntiHealth Ger GmbH* et al., "Redacted Public Version of Jury Verdict," posted by the United States District Court for the District of Delaware in connection with Case No. 1:19-cv-1227-GBW on Sep. 15, 2023, 17 pages.
*EIS Inc.* v. *IntiHealth Ger GmbH* et al., "Letter to the Honorable Gregory B. Williams Regarding IPR (Redacted Public Version)," filed with the United States District Court for the District of Delaware in connection with Case No. 1:19-cv-1227-GBW on Sep. 26, 2023, 20 pages.
*EIS Inc.* v. *IntiHealth Ger GmbH* et al., "Joint Motion to Seal and Redact Memorandum Order (Redacted Public Version)," filed with the United States District Court for the District of Delaware in connection with Case No. 1:19-cv-1227-GBW on Sep. 26, 2023, 68 pages.
*EIS Inc.* v. *IntiHealth Ger GmbH* et al., "Post-Trial Status Report," filed with the United States District Court for the District of Delaware in connection with Case No. 1:19-cv-1227-GBW on Sep. 26, 2023, 19 pages.
*EIS Inc.* v. *IntiHealth Ger GmbH* et al., "Memorandum Opinion," issued by the United States District Court for the District of Delaware in connection with Case No. 1:19-cv-1227-GBW on Aug. 30, 2023, unsealed on Sep. 28, 2023, 14 pages.
*EIS Inc.* v. *IntiHealth Ger GmbH* et al., "Plaintiff's and Counterclaim Defendants' Brief in Support of Their Inequitable Conduct and Unclean Hands Defenses (Redacted Public Version)," filed with the United States District Court for the District of Delaware in connection with Case No. 1:19-cv-1227-GBW on Nov. 17, 2023, 33 pages.
*EIS Inc.* v. *IntiHealth Ger GmbH* et al., "Plaintiff's and Counterclaim Defendants' Proposed Findings of Fact and Conclusions of Law Regarding Defendants' Inequitable Conduct and Unclean Hands Defenses (Redacted Public Version)," filed with the United States District Court for the District of Delaware in connection with Case No. 1:19-cv-1227-GBW on Nov. 17, 2023, 29 pages.
*EIS Inc.* v. *IntiHealth Ger GmbH* et al., "Declaration of Allan M. Soobert in Support of Plaintiff's and Counterclaim Defendants' Brief in Support of Their Inequitable Conduct and Unclean Hands Defenses (Redacted Public Version)," filed with the United States District Court for the District of Delaware in connection with Case No. 1:19-cv-1227-GBW on Nov. 17, 2023, 50 pages.
*EIS Inc.* v. *IntiHealth Ger GmbH* et al., "Defendants' and Counterclaimant's Response to Plaintiff's Opening Brief on Its Unenforceability Defenses (Redacted Public Version)," filed with the United States District Court for the District of Delaware in connection with Case No. 1:19-cv-1227-GBW on Dec. 15, 2023, 37 pages.
*EIS Inc.* v. *IntiHealth Ger GmbH* et al., "Declaration of Califf T. Cooper in Support of Defendants' and Counterclaimants' Opening Brief on Plaintiff's Unenforceability Defenses (Redacted Public Version)," filed with the United States District Court for the District of Delaware in connection with Case No. 1:19-cv-1227-GBW on Dec. 15, 2023, 37 pages.
*EIS Inc.* v. *IntiHealth Ger GmbH* et al., "Defendants' Proposed Findings of Fact and Conclusions of Law in Support of Its Response to Plaintiff's Opening Brief on Its Unenforceability Defenses (Redacted Public Version)," filed with the United States District Court for the District of Delaware in connection with Case No. 1:19-cv-1227-GBW on Dec. 15, 2023, 22 pages.
*EIS Inc.* v. *IntiHealth Ger GmbH* et al., "Plaintiff's and Counterclaim Defendants' Reply Brief in Support of Their Inequitable Conduct and Unclean Hands Defenses," filed with the United States District Court for the District of Delaware in connection with Case No. 1:19-cv-1227-GBW on Dec. 22, 2023, 17 pages.
*EIS Inc.* v. *IntiHealth Ger GmbH* et al., "Declaration of Allan M. Soobert in Support of Plaintiff's and Counterclaim Defendants' Reply Brief in Support of Their Inequitable Conduct and Unclean Hands Defenses," filed with the United States District Court for the District of Delaware in connection with Case No. 1:19-cv-1227-GBW on Dec. 22, 2023, 56 pages.
United States Patent and Trademark Office, "Office Action," issued in connection with U.S. Appl. No. 17/403,609, dated Jan. 28, 2025, 51 pages.
United States Patent and Trademark Office, "Office Action," issued in connection with U.S. Appl. No. 17/029,974, dated Feb. 27, 2025, 109 pages.
European Patent Office, "Communication of the Board of Appeals," issued in connection with opposition of European Patent No. 3685809 on Apr. 4, 2025, 34 pages (includes English translation).
United States Patent and Trademark Office, "Office Action," issued in connection with U.S. Appl. No. 17/403,609, dated May 19, 2025, 58 pages.

(56) References Cited

OTHER PUBLICATIONS

"Opposition to a European Patent," filed with the European Patent Office action in connection with opposition of European Patent No. 3946210 on May 21, 2025, 259 pages (includes English translation).
"Opposition to a European Patent, Exhibit D3a" filed with the European Patent Office action in connection with opposition of European Patent No. 3946210 on May 21, 2025, 1 page.
"Opposition to a European Patent, Exhibit D8a" filed with the European Patent Office action in connection with opposition of European Patent No. 3946210 on May 21, 2025, 1 page.
"Opposition to a European Patent, Exhibit D8b" filed with the European Patent Office action in connection with opposition of European Patent No. 3946210 on May 21, 2025, 1 page.
"Opposition to a European Patent, Exhibit D9b (color-coded copy of FIG. 3a of Japanese Pat. App. Pub. No. 2011-083423A)" filed with the European Patent Office action in connection with opposition of European Patent No. 3946210 on May 21, 2025, 1 page.
"Opposition to a European Patent, Exhibit D9c (color-coded copy FIG. 14b of Japanese Pat. App. Pub. No. 2011-083423A)" filed with the European Patent Office action in connection with opposition of European Patent No. 3946210 on May 21, 2025, 1 page.
"Opposition to a European Patent, Exhibit 10" filed with the European Patent Office action in connection with opposition of European Patent No. 3946210 on May 21, 2025, 30 pages (includes English translation).
"Opposition to a European Patent, Exhibit D11a (annotated copy of FIG. 2 of German Pat. App. Pub. No. DE 20 2005 004 843 U1" filed with the European Patent Office action in connection with opposition of European Patent No. 3946210 on May 21, 2025, 1 page.
"Opposition to a European Patent, Exhibit D11b (annotated and color-coded copy of FIG. 3 of German Pat. App. Pub. No. DE 20 2005 004 843 U1" filed with the European Patent Office action in connection with opposition of European Patent No. 3946210 on May 21, 2025, 1 page.
"Opposition to a European Patent, Exhibit D13a" filed with the European Patent Office action in connection with opposition of European Patent No. 3946210 on May 21, 2025, 1 page.
"Opposition to a European Patent, Exhibit D14a" filed with the European Patent Office action in connection with opposition of European Patent No. 3946210 on May 21, 2025, 6 pages (includes English translation).
"Opposition to a European Patent, Exhibit D14b" filed with the European Patent Office action in connection with opposition of European Patent No. 3946210 on May 21, 2025, 4 pages (includes English translation).
"Opposition to a European Patent, Exhibit D14e" filed with the European Patent Office action in connection with opposition of European Patent No. 3946210 on May 21, 2025, 246 pages (includes English translation).
"Opposition to a European Patent, Exhibit D17" filed with the European Patent Office action in connection with opposition of European Patent No. 3946210 on May 21, 2025, 1 page.
"Opposition to a European Patent, Exhibit D17a" filed with the European Patent Office action in connection with opposition of European Patent No. 3946210 on May 21, 2025, 1 page.
"Opposition to a European Patent, Exhibit D17b" filed with the European Patent Office action in connection with opposition of European Patent No. 3946210 on May 21, 2025, 1 page.
"Opposition to a European Patent, Exhibit D17c" filed with the European Patent Office action in connection with opposition of European Patent No. 3946210 on May 21, 2025, 1 page.
"Opposition to a European Patent, Exhibit D17d" filed with the European Patent Office action in connection with opposition of European Patent No. 3946210 on May 21, 2025, 1 page.
"Opposition to a European Patent, Exhibit D17e" filed with the European Patent Office action in connection with opposition of European Patent No. 3946210 on May 21, 2025, 1 page.
"Opposition to a European Patent, Exhibit D17f" filed with the European Patent Office action in connection with opposition of European Patent No. 3946210 on May 21, 2025, 1 page.
"Opposition to a European Patent, Exhibit D17g" filed with the European Patent Office action in connection with opposition of European Patent No. 3946210 on May 21, 2025, 3 pages (includes English translation).
"Opposition to a European Patent, Exhibit D17h" filed with the European Patent Office action in connection with opposition of European Patent No. 3946210 on May 21, 2025, 6 pages (includes English translation).
"Opposition to a European Patent, Exhibit D18" filed with the European Patent Office action in connection with opposition of European Patent No. 3946210 on May 21, 2025, 10 pages (includes English translation).
European Patent Office, "Summons to Attend Oral Proceedings," issued in connection with opposition of European Patent No. 3773954 on May 23, 2025, 25 pages (includes English translation).
United States Patent and Trademark Office, "Office Action," issued in connection with U.S. Appl. No. 17/601,392, dated Jun. 10, 2025, 10 pages.
United States Patent and Trademark Office, "Office Action," issued in connection with U.S. Appl. No. 17/044,501, dated Jun. 20, 2025, 14 pages.
European Patent Office, "Oral Proceedings: Forwarding Minutes," issued in connection with opposition of European Patent No. 3685809 on Jun. 25, 2025, 11 pages (includes English translation).
Canadian Patent Office, "Office Action," issued in connection with Canadian Patent Application No. 3,069,463 on Jun. 30, 2025, 7 pages.
"Written Submission in Preparation to/during Oral Proceedings" filed with the European Patent Office in connection with opposition of European Patent No. 3267960 on Jul. 9, 2025, 94 pages (includes English translation).
"Written Submission in Preparation to/during Oral Proceedings, Exhibit D19" filed with the European Patent Office in connection with opposition of European Patent No. 3267960 on Jul. 9, 2025, 43 pages (includes English translation).
"Written Submission in Preparation to/during Oral Proceedings, Exhibit D21" filed with the European Patent Office in connection with opposition of European Patent No. 3267960 on Jul. 9, 2025, 65 pages (includes English translation).
"Written Submission in Preparation to/during Oral Proceedings, Exhibit D23" filed with the European Patent Office in connection with opposition of European Patent No. 3267960 on Jul. 9, 2025, 3 pages (includes English translation).
"Written Submission in Preparation to/during Oral Proceedings, Exhibit D24" filed with the European Patent Office in connection with opposition of European Patent No. 3267960 on Jul. 9, 2025, 18 pages (includes English translation).
"Written Submission in Preparation to/during Oral Proceedings, Exhibit D25" filed with the European Patent Office in connection with opposition of European Patent No. 3267960 on Jul. 9, 2025, 14 pages (includes English translation).
"Written Submission in Preparation to/during Oral Proceedings, Exhibit D26" filed with the European Patent Office in connection with opposition of European Patent No. 3267960 on Jul. 9, 2025, 11 pages (includes English translation).
United States Patent and Trademark Office, "Office Action," issued in connection with U.S. Appl. No. 17/029,974, dated Jul. 24, 2025, 260 pages.
"Written Submission in Preparation to/during Oral Proceedings" filed with the European Patent Office in connection with opposition of European Patent No. 3400926 on Aug. 6, 2025, 128 pages (includes English translation).
"Written Submission in Preparation to/during Oral Proceedings, Exhibit D29" filed with the European Patent Office in connection with opposition of European Patent No. 3400926 on Aug. 6, 2025, 2 pages.
"Written Submission in Preparation to/during Oral Proceedings, Exhibit D30" filed with the European Patent Office in connection with opposition of European Patent No. 3400926 on Aug. 6, 2025, 3 pages.
"Written Submission in Preparation to/during Oral Proceedings, Exhibit D31" filed with the European Patent Office in connection

(56) References Cited

OTHER PUBLICATIONS with opposition of European Patent No. 3400926 on Aug. 6, 2025, 12 pages (includes English translation).
"Written Submission in Preparation to/during Oral Proceedings, Exhibit D32" filed with the European Patent Office in connection with opposition of European Patent No. 3400926 on Aug. 6, 2025, 9 pages (includes English translation).
"Written Submission in Preparation to/during Oral Proceedings, Exhibit D33" filed with the European Patent Office in connection with opposition of European Patent No. 3400926 on Aug. 6, 2025, 2 pages (includes English translation).
"Written Submission in Preparation to/during Oral Proceedings, Exhibit D34" filed with the European Patent Office in connection with opposition of European Patent No. 3400926 on Aug. 6, 2025, 47 pages (includes English translation).
"Written Submission in Preparation to/during Oral Proceedings" filed with the European Patent Office in connection with opposition of European Patent No. 3267960 on Aug. 11, 2025, 24 pages (includes English translation).
European Patent Office, "Brief Communication—Opposition Proceedings," issued in connection with opposition of European Patent No. 3400926 on Aug. 12, 2025, 128 pages (includes English translation).
European Patent Office, "Summons to Attend Oral Proceedings," issued in connection with opposition of European Patent No. 3998055 on Aug. 14, 2025, 50 pages (includes English translation).
European Patent Office, "Summons to Attend Oral Proceedings," issued in connection with opposition of European Patent No. 3773406 on Sep. 5, 2025, 50 pages (includes English translation).
Canadian Patent Office, "Office Action," issued in connection with Canadian Patent Application No. 3,074,820 on Sep. 11, 2025, 8 pages.
IP Australia, "Examination Report No. 1 for Standard Patent Application," issued in connection with Australian Application No. 2024208803, on Nov. 10, 2025, 4 pages.
European Patent Office, "Decision Revoking the European Patent," issued in connection with opposition of European Patent No. 3400926 on Nov. 24, 2025, 62 pages (includes English translation).
Canadian Patent Office, "Office Action," issued in connection with Canadian Patent Application No. 3,134,908 on Oct. 14, 2025, 5 pages.
"Written Submission in Preparation to/during Oral Proceedings" filed with the European Patent Office in connection with opposition of European Patent No. 3773954 on Nov. 13, 2025, 43 pages (includes English translation).
European Patent Office, "Summons to Attend Oral Proceedings," issued in connection with opposition of European Patent No. 3946210 on Dec. 8, 2025, 96 pages (includes English translation).
United States Patent and Trademark Office, "Notice of Allowance," issued in connection with U.S. Appl. No. 17/403,609, dated Dec. 22, 2025, 10 pages.
"Third-Party Submission Under 37 CFR 1.290," filed with the United States Patent and Trademark Office in connection with U.S. Appl. No. 19/043,047, on Jan. 21, 2026, 18 pages.
"Written Submission in Preparation to/during Oral Proceedings," filed with the European Patent Office in connection with opposition of European Patent No. 3773406 on Jan. 23, 2026, 21 pages (includes English translation).

* cited by examiner

STIMULATION DEVICE

CROSS-REFERENCE TO RELATED APPLICATIONS

This patent arises from a continuation of U.S. patent application Ser. No. 15/965,208, now U.S. Pat. No. 11,103,418, which was filed on Apr. 27, 2018. U.S. patent application Ser. No. 15/965,208 is a continuation of U.S. patent application Ser. No. 15/354,599, now U.S. Pat. No. 10,857,063, which was filed on Nov. 17, 2016. U.S. patent application Ser. No. 15/354,599 is a continuation of U.S. patent application Ser. No. 15/023,471, now U.S. Pat. No. 9,763,851, which was filed on Mar. 21, 2016. U.S. patent application Ser. No. 15/023,471 claims priority under 35 U.S.C. § 371 to International Patent Application No. PCT/EP2014/065734, which was filed on Jul. 22, 2014. International Patent Application No. PCT/EP2014/065734 claims priority to German Patent Application No. 102013110501.7, which was filed on Sep. 23, 2013. U.S. patent application Ser. No. 15/965,208, U.S. patent application Ser. No. 15/354,599, U.S. patent application Ser. No. 15/023,471, International Patent Application No. PCT/EP2014/065734, and German Patent Application No. 102013110501.7 are hereby incorporated by reference in their entireties.

TECHNICAL FIELD

Embodiments of the present invention relate to a stimulation device for erogenous zones, in particular for the clitoris, a system with stimulation device, and methods for stimulating body parts.

BACKGROUND

The erogenous zones of the human body can be stimulated with a variety of tools. For example, vibrators are used to apply a stimulus to a particular area of the skin by direct contact. However, this form of stimulation can lead to irritations or inflammations of the skin. Also, direct contact of the genital area with such tools for individual reasons of hygiene or due to personal reservations, for example, may not be desired.

In particular, the direct stimulation of the clitoris with a clitoral massage vibrator, for example, is fraught with problems, as the clitoris is usually a woman's most sensitive erogenous zone. The entire clitoris is equipped with numerous nerve endings, thus making it particularly touch-sensitive and responsive to sexual stimuli. Here, the clitoris glans, in which the nerve cords of the two thighs meet, should be particularly emphasized. Frequent use of a clitoral massage vibrator for direct stimulation, for example, leads to habituation effects or conditioning of the stimulated erogenous zone and the initial use of such a device may require certain practice or familiarization.

Furthermore, medical studies conducted in 2006 determined the female clitoris as definitive starting point of the female climax and neurologically proved the different qualities of sensation of clitoral (and vaginal) orgasm for the first time. Thus, according to the most recent medical research, the stimulation of the clitoris, rather than the vagina, is considered the starting point of a woman's sexual arousal and thereby the key to female "sexual pleasure".

The sensitivity of the human erogenous zones, such as the clitoris, the inner and outer labia or the nipples, continues to differ greatly individually. The person may be so sensitive that direct stimulation is only possible after prolonged foreplay, and even then only very subtly or ruled out completely. Furthermore, the sensitivity of the corresponding zone can change dramatically from one situation to another or even during a sexual act.

For the aforementioned reasons, various indirect forms of stimulation are common practice as alternatives to direct stimulation.

For indirect stimulation of erogenous zones, and especially the clitoris, conventional vacuum devices are used to arouse the erogenous zones of the person concerned without directly contacting the main area to be stimulated. Thus, for example, vacuum pumps for the primary or secondary female sexual organs are known, which usually have a suction cup for placing on the appropriate area and a hand pump. The negative-pressure exerted by this type of device on the clitoris, for example, generates a negative pressure in the clitoris itself, which is usually lower than the systolic blood pressure. This difference in pressure leads to an enlargement of the clitoris and/or stimulates the blood flow in the affected area. This vascular clitoral engorgement serves both to promote desire by increasing sensitivity and for optical and tactile manipulation. The improved blood circulation also leads to an increased leakage of vaginal moisture which makes the stimulation more pleasurable. However, the manual operation of the hand pump is often annoying or distracting. In addition, the long-term or uninterrupted use of negative-pressure in this device category may lead to habituation effects, which limit the effectiveness of the device in the long run. Moreover, a pure increase in the clitoral blood flow is often insufficient to reach a climax; vacuum pumps are thus often used only as foreplay to achieve the climax with a subsequent direct (pressure) massage of the erogenous zone.

Electrically driven vacuum pumps are also used increasingly instead of manually operated vacuum pumps as well. As an example of this, WO 2006/05 82 91 A2 discloses a device for sexual therapy, wherein the arrangement consists of a tubular suction chamber for the clitoris, an electric vacuum source (vacuum pump) and a plurality of airflow openings. The operation of the vacuum pump generates a permanent airflow or air exchange in the chamber in the area of the clitoris. This has the disadvantageous effect of suctioning the increasingly leaking vaginal moisture caused by the negative-pressure, thus having a drying effect on the stimulated parts of skin. Likewise, the suctioned moist air leads to a contamination of the fluidic subsequent vacuum arrangement, of the vacuum pump for example. Such arrangements with vacuum pumps may thus be hygienically problematic, as vacuum pumps and the associated valves or ventilation components often have dead spaces or blind spots and/or are difficult to clean. Furthermore, the device is meant to treat the blood vessels in the clitoris and not to provide stimulation up to sexual climax.

U.S. Pat. No. 6,099,463 A discloses a clitoris stimulation device with a tubular suction chamber, a vacuum source or a vacuum pump and a plurality of valves, which are used to control the size of the vacuum. The vacuum can also be in cyclic form to achieve a stimulation effect, although habituation effects are also to be expected with this device due to the use of a permanent vacuum. As explained above, the disadvantages relating to hygiene and the dehydration of the skin part to be stimulated are also present here. Likewise, the pressure-related arrangement with a plurality of valves, vacuum pump, etc. is relatively complex.

U.S. Pat. No. 6,464,653 Bi discloses therapeutic devices and methods to generate a clitoral engorgement with the aid of a vacuum generated by a vacuum pump to assist in the treatment of clitoral disorders, such as incontinence. A control valve or modulator that can be correspondingly covered by a finger is used to manually adjust or vary the amount of vacuum in the suction chamber. This requires the user's attention and may be distracting or diverting under certain circumstances. This relatively complex device with additional valves also has the same disadvantages relating to hygiene and dehydration as explained above, although the device is also used for long-term therapeutic purposes and not for short-term sexual stimulation.

WO 2008/028076A2 discloses a therapeutic device for women, which is mainly dedicated to treating sexual disorders. The device includes a combination of indirect stimulation by means of a vacuum chamber and direct stimulation by means of mechanical vibrators and oscillators.

The negative-pressure in this therapeutic device is used to increase the blood flow in the clitoris, while the area of skin is actually stimulated or massaged by means of direct mechanical vibrations/oscillations. Thus, a suction cup for placing on the area of skin to be stimulated is internally connected with a motor via a mechanical connection. The suction cup is extended by the motor once the device is activated, thus increasing the volume of the suction cup. The resulting volume of the suction cup and thus the strength of the vacuum can be adjusted by means of control elements on the device. The air displaced in the device by the suction process is discharged outwardly again via a pipe. The vacuum in this device has only a supporting function, while the actual stimulation ensues directly, which also entails the same disadvantages of a direct stimulation as explained above.

US 2013/001276 9A1 discloses a device in which a pulsating positive-pressure is used for stimulating an air pressure massage. A pump or compressor thus generates a pulsating positive-pressure, which is directed towards the erogenous zone to be stimulated by means of a nozzle. This device disadvantageously causes the affected area of skin to dry out severely or completely. Likewise, there is usually a temperature difference between the temperature of the supplied air and the temperature of the area of skin to be stimulated, which may be felt to be distracting under certain circumstances. The same problems of hygiene as explained above also occur in this device, although in this case any pathogens or germs or other contaminations located in the device are also transported directly to the user's genital area.

Thus, the prior art devices all have the same disadvantage in common, in that the complexity of the arrangements generating negative-pressure or positive-pressure may be high and this device may have problems of hygiene.

Furthermore, the prior art devices have another disadvantage in common, in that habituation effects occur in the event of constant or frequently recurring use of negative-pressures.

Another disadvantage of some of the previously described vacuum devices is, firstly, that the negative-pressure has to be limited by means of a control valve or a vacuum pump and, secondly, that the negative-pressure is supposed to be reduced by means of a manual opening of a release valve, before the suction cup is peeled from the skin. Should one of the valves have a technical defect and/or the user operate the device incorrectly, there may be a risk of injury in certain circumstances.

Thus, in view of the problems as explained above, the problem addressed by the embodiments discussed herein is to provide a stimulation device with a simple construction that is easy and safe to use.

Another problem addressed by the embodiments discussed herein is to provide a stimulation device with an effective stimulation-triggering effect, which is suitable for stimulating an erogenous zone, especially the female clitoris.

In addition, partial problems addressed by the embodiments discussed herein are to provide a device, which prevents the erogenous zones to be stimulated from drying out, is hygienic and prevents habituation effects.

The above problems are addressed by embodiments of the stimulation device described herein. Advantageous developments and embodiments are the subject-matter of other alternative independent claims and dependent claims.

SUMMARY

A stimulation device is provided in accordance with one embodiment. The stimulation device includes a chamber which has a flexible wall portion. In one embodiment, the flexible wall portion may include silicon and may be integral with the chamber. A drive unit of the stimulation device is in physical communication with the flexible wall portion so as to cause deflections of the flexible wall portion in opposing directions, thereby resulting in a changing volume of the chamber. The changing volume of the chamber results in modulated positive and negative pressures with respect to a reference pressure. The modulated positive and negative pressures are applied to a body part (e.g., a clitoris) through an opening of the stimulation device. For example, the opening of the stimulation device may be placed over the body part to apply the modulated positive and negative pressures. The drive unit is controlled by a control device of the stimulation device.

In one embodiment, the stimulation device includes a second chamber. The changing volume of the chamber results in the modulated positive and negative pressures in the second chamber.

In one embodiment, the stimulation device may be a portable hand-held device with a battery. The stimulation device may also have an operating element for adjusting the modulated positive and negative pressures and a light emitting diode for indicating a status of the stimulation device.

In accordance with an embodiment, the stimulation device includes a pressure field generator which has a flexible wall portion. A drive unit of the stimulation device is in physical communication with the flexible wall portion so as to cause deflections of the flexible wall portion in opposing directions, thereby resulting in a changing volume of the pressure field generator. The changing volume of the pressure field generator results in modulated positive and negative pressures with respect to a reference pressure. The modulated positive and negative pressures are applied to a body part through an opening of the stimulation device. The drive unit is controlled by a control device of the stimulation device.

In one embodiment, the pressure field generator includes a first chamber and a second chamber. As such, deflections in the flexible wall portion of the first chamber of the pressure field generator result in the modulated positive and negative pressures in the second chamber of the pressure field generator.

The above-described features and functions of embodiments of the present invention as well as other aspects and features are further described in the following with the aid of a detailed description of preferred embodiments with reference to the enclosed illustrations.

DESCRIPTION OF PREFERRED EMBODIMENTS

Figure 1:
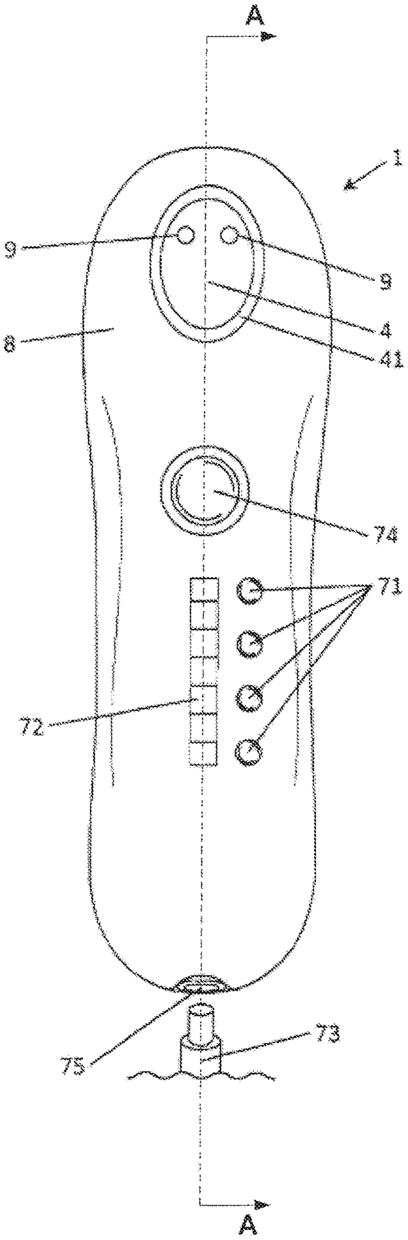
FIG. 1 a front view of a first embodiment of the stimulation device according to the invention.

According to one embodiment, a pressure field generator in the stimulation device has at least one first chamber and at least one second chamber with at least one opening for placing on a body part or on the erogenous zone and at least one connection element that connects the first chamber with the second chamber.

This embodiment of chambers communicating in a fluidic manner via at least one connection element allows the first chamber to simply generate a pressure field in the second chamber by modifying the volume in the first chamber, which is occasionally directed at the area of skin to be stimulated.

A pressure field is a temporally modifiable field of media pressures, with occasional positive-pressures and occasional negative-pressures, a negative-pressure being a media pressure below the reference pressure and a positive-pressure being a media pressure above the reference pressure.

The medium is usually gaseous, preferably air, but may alternatively or additively, for example, be a liquid medium, such as water or commercially available lubricant. For example, the chambers may be filled with the lubricant prior to using the stimulation device. This allows the corresponding area of skin to be stimulated with a suitable skin-friendly liquid in lieu of air as well, whatever the user's individual preference. As another example, the stimulation device may also be used under water with water as the medium (in the bathtub, for example).

The reference pressure is usually the existing ambient pressure in relation to the stimulation device at the beginning of use (i.e. prior to placing the stimulation device on the area of skin to be stimulated). In the preferred use of the stimulation device with air, the reference pressure is the currently existing air pressure or normal pressure.

The pressure field excites the blood circulation of the area of skin to be stimulated, while said area of skin is indirectly massaged, thus combining two advantageous effects. The increased blood circulation makes the erogenous zone of the person concerned more sensitive, while generating an additional massage effect that serves, for example, to stimulate the erogenous zone to sexual arousal up to climax. The massage effect is generated by the kinetic energy of the medium flowing out of the first chamber through the connection element against the surface of the area of skin to be stimulated. The massage effect generated in this way is indirect, i.e. without the area of skin to be stimulated being contacted by a solid body, such as a vibrator, which results in the avoidance of the initially explained disadvantages of direct stimulation.

By the exemplary use of the temporally modifiable pressure field on the clitoris, the pressure field imitates a stimulation that usually only occurs during sexual intercourse. Likewise, the cohabitation movement generates a varying stimulus on the clitoris. It is thus a true-to-life imitation of the natural act of cohabitation, with medical statements confirming that the use of the pressure field causes neither habituation effects nor addiction. This is due in particular to the alternating use of negative- and positive-pressures (or even to the non-continuous use of only one type of pressure).

Furthermore, the maximum applicable pressure is regularly limited by the maximum resilience of the area of skin to be stimulated. Thus, for instance, too high a negative-pressure harbors the risk of painful injury, especially in erogenous zones. Only stimulation devices working with negative-pressures are usually limited to this maximum in their mode of operation. Conversely, the combination of positive- and negative-pressures creates an extended working area of the stimulation-triggering pressure field or effect, as the working area of the pressure can now be exploited to the maximum in both the positive and negative area.

The orientation of the at least one connection element towards the area of skin to be stimulated allows the pressure field to work directly, wherein the pressure field is decisively influenced by the configuration of the at least one connection element and of the at least one opening from the connection element into the second chamber, and is thus adjustable after every use of the stimulation device. Thus, for example, the at least one opening of the connection element may be located opposite and preferably directly opposite the body part to be stimulated. For example, the connection element in a stimulation device intended for the clitoris may have a single passageway with nozzle effect on the clitoris glans between the first and second chamber. Alternatively, the at least one connection element may consist of a plurality, for example four, of passageways between the chambers, if a larger area of skin is to be stimulated.

Furthermore, after placing the halfway or partially opened second chamber on the area of skin to be stimulated, a self-contained system of media- and airflow is created in the pressure field generator. Thus, for instance, the medium or air is moved decisively backwards and forwards between the chambers, while an interchange with media or with air from outside the system being at least largely avoidable. Thus, the first chamber is preferably connected exclusively with the second chamber via or through the connection element. Thus, no first chamber connections other than those to the second chamber exist; for example, there is no direct first chamber connection to the environment of the device via a pressure valve or via an air discharge channel.

For example, the air temperature in the flow system rapidly adjusts to the skin temperature, while the distracting supply of new (possibly cold) air from outside the system is avoided, as may be the case, inter alia, when using vacuum pumps in prior art. Drying effects are also avoided, as very little or no removal of stimulation-promoting fluid, such as bodily fluid, occurs in a closed system.

Furthermore, due to the simple construction, the pressure field generator has the advantage of increased hygiene and improved cleanability. The pressure field generator thus avoids valves or pumps/compressors with potential dead spaces and places that cannot be cleaned. The pressure field generator is thus easy to clean. For example, the stimulation device can be simply cleaned by filling the first chamber with a cleaning agent and activating the pressure field. Alternatively, the second chamber can be arranged to be replaceable, which also simplifies the cleaning of both chambers. Furthermore, the chambers and the connection element of the pressure field generator can be designed in one-piece, wherein the latter consists of a single molded plastic part (e.g. rubber).

In addition, the construction avoids complex fluidic elements, such as valves, which leads to a simplification in production.

Furthermore, the stimulation device has a drive unit, which modifies the volume in the first chamber in such a way that a pressure field is generated via the connection element in the second chamber that serves to stimulate the erogenous zone, and has a control device that activates the drive unit.

As a matter of principle, the medium transported between the chambers is limited to the maximum volume of the first chamber. In addition, the transported volume can be further constructively limited by the maximum possible volume modification caused by the drive unit.

This means that the maximum positive- or negative-pressure the stimulation device can build up in the second chamber is limited due to the dimensioning of the components of the pressure field generator and of the drive. In particular, the maximum positive- or negative-pressure can be limited to a degree that minimizes or excludes any risk of injury for the areas of skin to be stimulated. As a result, any conventional safety valve in prior art or any manual intervention in the stimulation process by the user, such as the opening of a release valve, is rendered unnecessary.

Furthermore, the temporal modification of the pressure field or the modification of the pressure field by the control device is automatically controlled to a large extent. Thus, for example, the modulation of the pressure field, such as intensity, chronological sequence or evolvement, can be pre-saved in the control device. As a preference, the temporal modification of the pressure field can have a regular or reoccurring (stimulation) pattern, such as impulses with a stipulated cycle or regularly alternating impulse sequences. This allows the user's interaction with the stimulation device to be limited to switching on and off and selecting the stimulation pattern, while the stimulation device automatically executes the preferred stimulation pattern. Thus, the user complexity of the stimulation device is low, especially when compared with conventional (medical) vacuum stimulation devices. Alternatively, or additionally, the simulation pattern of the stimulation device can be individually configured by the user during or before operation.

In one embodiment, a system includes the stimulation device and a remote control device. The remote control device is arranged separately from the stimulation device, wherein the control device of the stimulation device is remotely controlled by the remote control device. This allows a conventional wireless (via radio for example) or wired remote control to be employed, in order to allow the remote controlled moderation of the stimulation device or the activation thereof by another user.

In one embodiment, a method for stimulating body parts, especially the clitoris, is disclosed. The associated advantages effects and impacts are explained in more detail above in relation to the pressure field.

In one embodiment, the stimulation device is used as a sex toy for stimulating the female clitoris. As explained at the beginning, the female clitoris is an especially erogenous zone of women, which is why the use of an indirect massage combined with a negative-pressure—stimulation for this body part to provide stimulation up to orgasm seems particularly advantageous.

Figure 2:
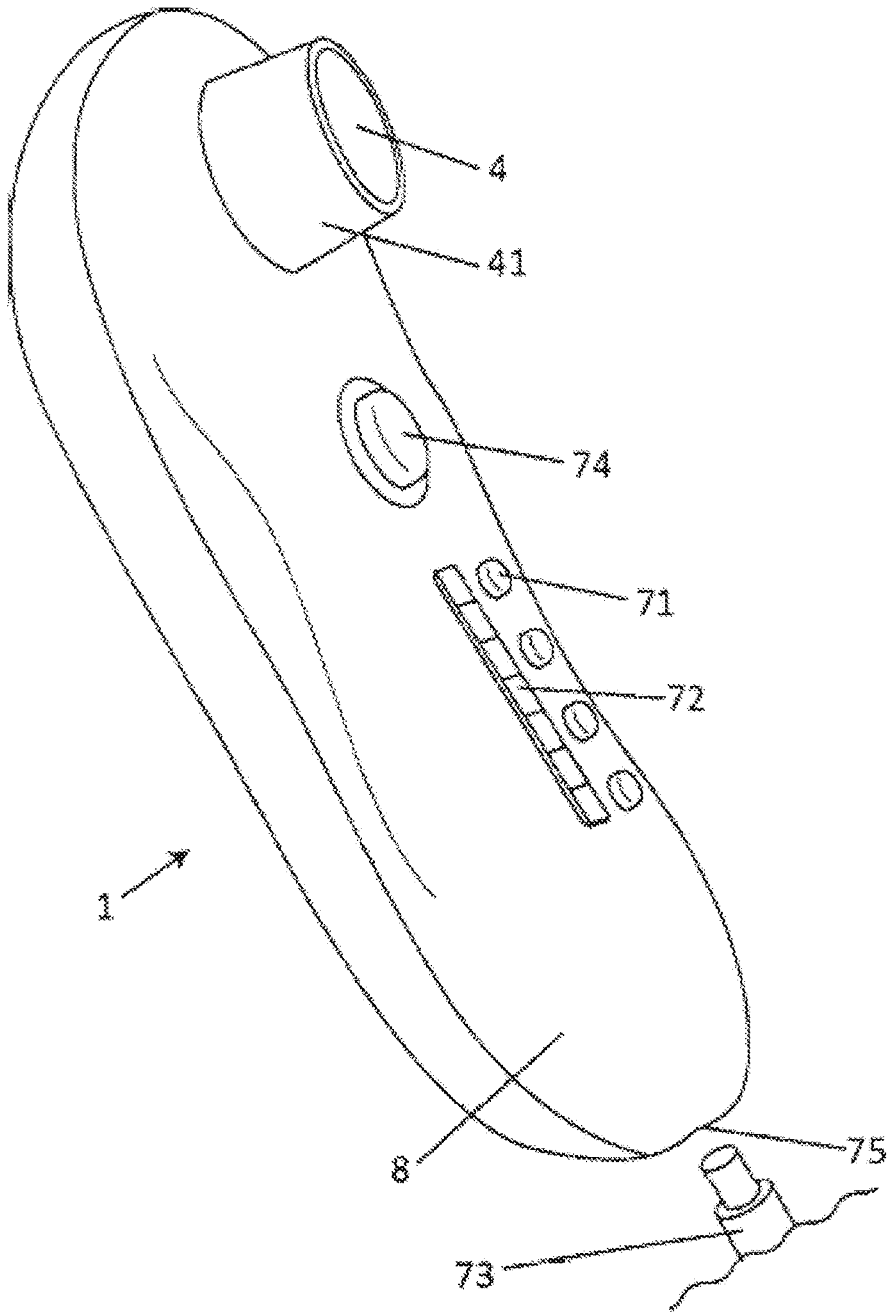
FIG. 2 a perspective side view of the first embodiment of the stimulation device according to the invention.
Figure 3:
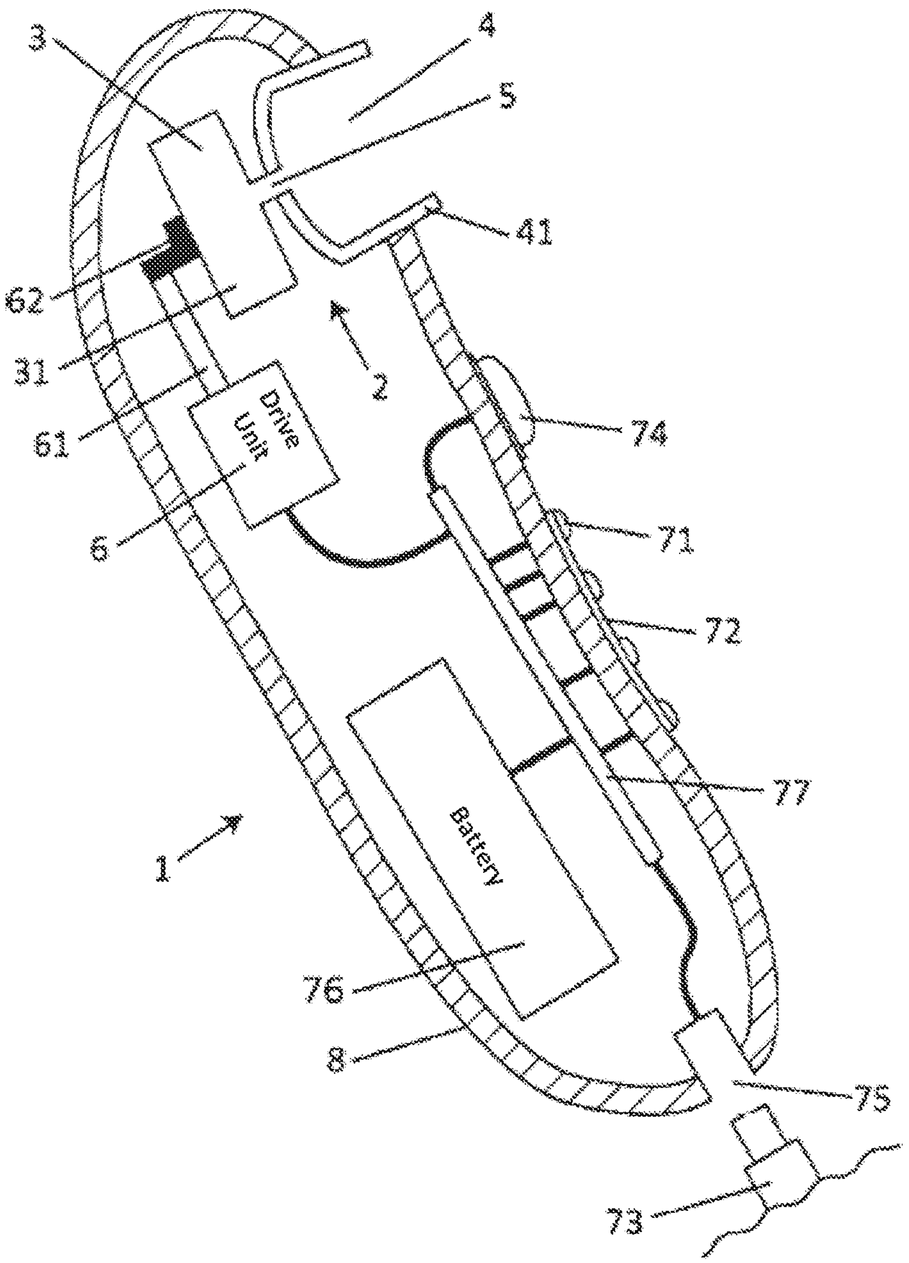
FIG. 3 a cross-section through section A-A of the first embodiment of the stimulation device shown in FIG. 1 according to the invention.

With reference to FIG. 1, a front view of a first embodiment of stimulation device 1 is explained, wherein FIG. 2 shows a perspective view and FIG. 3 a cross-section of the first embodiment of stimulation device 1 according to one or more embodiments.

The first embodiment of stimulation device 1 is a preferably electric or small device, comprising a housing 8, a pressure field generator 2, operating elements 71, a display 72, an on/off switch 74, a socket 75, an optional battery 76 and optional lighting 9.

Housing 8 is preferably designed so ergonomically that it can be held comfortably in one hand and has no sharp or pointed edges. Furthermore, housing 8 may consist of plastic, such as polycarbonate (PC) or acrylonitrile butadiene styrene (ABS). In addition, the gripping areas or even the entire housing may be supplemented by or designed in a haptically advantageous silicone. Housing 8 is preferably designed to be at least water-resistant or splash-proof, for example protection class IP 24.

Operating elements 71 are used to adjust the device operating mode, i.e. to adjust the pressure field modulation pattern. Operating elements 71 can, for example, be designed as at least one pushbutton, as at least one rotary switch, or as at least one touch-sensitive switch. Furthermore, operating elements 71 can produce an optical feedback for activating light emitting diodes (LED) integrated in the center of the switch, for example.

An optional display 72 serves to inform the user of the device status and/or the setting status. Display 72 can for example be configured as a plurality of light diodes or as an LCD display. The displayed information can, for example, be the charge status of an optional battery or the current setting of the modulation pattern.

On/off switch 74 is used for activating and deactivating stimulation device 1. This on/off switch 74 can, for example, be a pushbutton, which switches stimulation device 1 on or off when held down, or a ratcheting slide switch.

A socket 75 is used to supply the external power of stimulation device 1 via an external plug 73, which is connected to an external power adapter, for example. To ensure stimulation device 1 is splash-proof, a magnetic-inductive transformer may be provided instead of the socket, which allows power to be transmitted to stimulation device 1 without any electroconductive contact. Stimulation device 1 preferably also has a battery, such as a nickel metal hydride battery (NiMH) for wireless operation. Alternatively, a (longer) power supply cable may also be led out of the stimulation device.

Pressure field generator 2 of a first embodiment has a first chamber 3 in the interior of stimulation device 1, a second chamber 4 for placing on a body part 11 to be stimulated, and a connection element 5, which connects the first chamber 3 with the second chamber 4.

A drive unit 6, such as an electric motor, drives the first chamber 3 via an axis 61 and by means of an eccentric 62 (or alternatively by means of a connecting rod) in such a way that the volume of the first chamber 3 is modified according to the rotation of axis 61 of drive unit 6. It is hereby annotated that any drive types causing a deflection in wall 31 of the first chamber 3 for volume modification can basically be used in stimulation device 1. The latter may, for example, occur hydraulically, pneumatically, piezoelectrically, mechanically or electromagnetically. Examples of this are described in more detail later on.

A control device 7 activates drive unit 6, operating elements 71 and display 72. Control device 7 and drive unit 6 are supplied with power by internal battery 76 and/or external power supply 73.

Optional lighting 9 is provided on or in housing 8. Lighting 9 is preferably used for lighting the interior of the second chamber 4. Lighting 9 can either be switched by the user or automatically activated by activating stimulation device 1. Furthermore, lighting 9 can be composed of energy-saving light diodes. The lighting can, for example, serve as an orientation aid in the dark for the user of stimulation device 1 or as additional optical stimulation.

Figure 4:
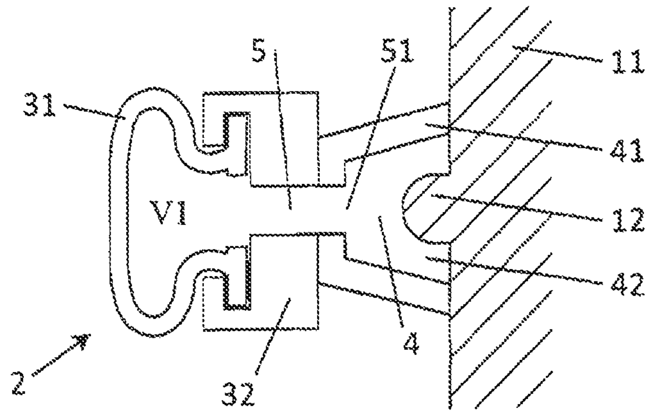
FIG. 4 a cross-section through section A-A of a pressure field generator of the stimulation device shown in FIG. 1 according to a first aspect of the present invention in the first state.
Figure 5:
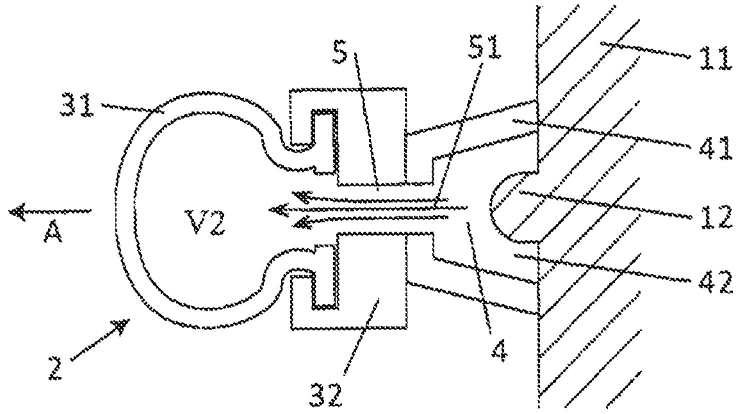
FIG. 5 a cross-section through section A-A of a pressure field generator of the stimulation device shown in FIG. 1 according to a first aspect of the present invention in the second state.
Figure 6:
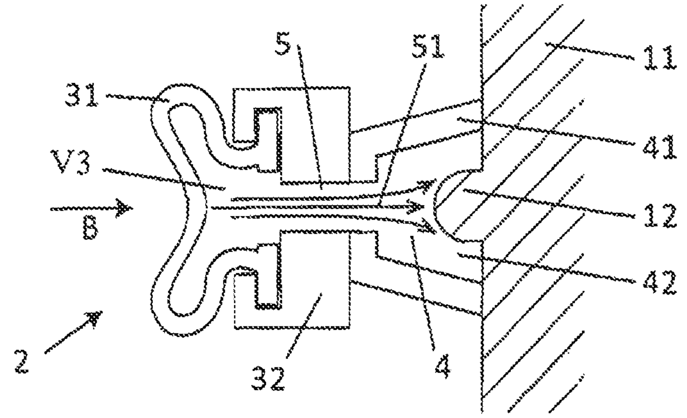
FIG. 6 a cross-section through section A-A of a pressure field generator of the stimulation device shown in FIG. 1 according to a first aspect of the present invention in the third state.

With reference to FIGS. 4, 5 and 6, the construction and function of a first aspect of pressure field generator 2 of stimulation device 1 is subsequently described in more detail.

FIG. 4 shows pressure field generator 2 in a first state, with the second chamber 4 being placed on the area of skin or body part 11 to be stimulated. The first state of pressure field generator 2 is characterized by a neutral deflection of the first chamber 3, i.e. no external force is exerted on the first chamber 3, for example, by the drive unit. Here, volume V1 of the first chamber is the standard volume of this chamber 3.

The body part 11 to be stimulated is an area of skin on the body, wherein for example an especially sensitive erogenous zone, clitoris 12, is shown. The use of the stimulation device 1 is thus not limited to the female clitoris 11, instead stimulation device 1 can be used on all body parts or erogenous zones (such as the inside of the upper thighs, the loins, neck, nipples, etc.), which can be stimulated by means of media- or air-pressure massage and/or negative-pressure.

Due to being placed on the body part 11 to be stimulated, the second chamber 4 forms a chamber largely or completely sealed off from the exterior of pressure field generator 2, which is only still connected to the second chamber via connection element 5, wherein the edges of chamber 4 ideally form an air-tight bond with the surface of body part 11. Two communicating chambers 3 and 4 are created in this way, wherein corresponding pressure equalization via connection element 5 ensues between chambers 3 and 4 in the event of a volume modification in one of chambers 3 or 4.

Wall 31 of the first chamber 3 is secured by means of a holder 32. Holder 32 is in turn attached to housing 8. Wall 41 of the second chamber is further affixed to holder 32. Two mutually aligned openings in wall 41 of the second chamber and of holder 32 jointly form connection element 5, which connects the first chamber 3 and the second chamber 4. Wall 31, holder 32 and wall 41 are preferably adhered to each other media- or air-tightly. Alternatively, the latter can also be press-fitted or screwed together with each other (for example by means of sealing areas between housing 8 and the respective part). Holder 32 can also be adhered or screwed onto housing 8, for example.

Wall 31 of the first chamber 3 preferably consists of a flexible media- or airtight material, such as rubber. Holder 32 preferably consists of a rigid plastic, which is just as media- and airtight. Wall 41 of the second chamber is preferably made of a flexible, skin-friendly material, such as silicone or rubber.

FIG. 5 shows pressure field generator 2 of FIG. 4 in a second state, wherein the second chamber 4 is in turn placed on the body part 11 to be stimulated. The second state is characterized in that a force A affecting the first chamber 3 causes chamber 3 to expand. In detail, force A in this embodiment draws wall 31 of the first chamber 3 in a direction facing away from the second chamber 4.

Volume V2 in chamber 3 increases as a result, i.e., V2>V1. To equalize the difference in pressure created between chambers 3 and 4, the media or air now flows from the second chamber 4 into the first chamber 3.

Assuming that the first state of the present pressure in chambers 3 and 4 corresponds to the currently prevailing external reference pressure (air pressure for example); the present overall pressure in the second state will now be less than the external reference pressure. This negative-pressure is designed in such a way that it is preferably less than the usual systolic blood pressure in the blood vessels of body part 11. The blood circulation in this area thus increases and clitoris 12 is better supplied with blood in the second state.

FIG. 6 shows pressure field generator 2 in a third state, wherein the second chamber 4 is in turn placed on the body part 11 to be stimulated. The third state is characterized in that a force B influencing the first chamber 3 causes a volume reduction or compression in chamber 3. In detail, the direction of force B is opposed to the direction of force A and distorts wall 31 of the first chamber in such a way that the resulting volume V3 of the chamber is less than volume V1. The compression of chamber 3 causes a positive-pressure in chamber 3, which is equalized by a media- or airflow through connection element 5 in the direction of the second chamber 4.

This media flow is now preferably directed by the orientation of opening 51 and/or of connection element 5 towards the body part 11 to be stimulated, in particular towards the glans of clitoris 12. The indirect (pressure) massage ensues due to the medium flowing onto body part 11. The size of opening 51 is dimensioned in such a way that it is small enough in ratio to the volume displaced in the first chamber 3 to sufficiently accelerate the medium for a perceptible massage effect.

Furthermore, the type of flow can not only be advantageously influenced by the size and orientation of opening 51, but also by the inner configuration of the connection element. For example, helix-shaped grooves in connection element 5 can cause the flow to swirl, wherein the flow profile of the flow unfurls a "softer" or more turbulent effect on the body part to be stimulated. Alternatively, the resulting pressure field in the second chamber 4 can be adjusted by means of a plurality of openings 51, depending on use.

The advantageous factor of the arrangement shown in FIGS. 4 to 6 is that it is hygienically unproblematic (due to the avoidance of dead spaces, for example) and is simple to produce. For example, no valves or other openings in or on the first chamber 3 are required.

Figure 7:
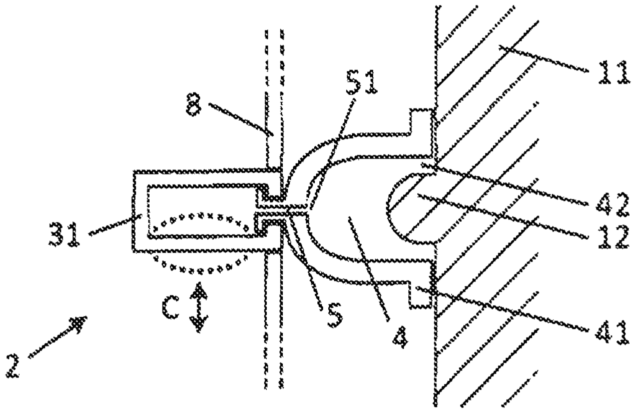
FIG. 7 a cross-section through section A-A of a pressure field generator of the stimulation device shown in FIG. 1 according to a second aspect of the present invention.

FIG. 7 shows one embodiment of an alternative construction of pressure field generator 2. Walls 31 and 41 of the first and second chambers 3 and 4 respectively can thus engage with one another in such a way that they also form two communicating chambers with a connection element 5, as in the first aspect of the construction of pressure field generator 2. Thus, the separate holder is no longer required, while the second chamber 4 is replaceable. In addition, connection element 5 can be designed integrally or in one-piece with wall 41 of the second chamber 4. A replaceable chamber 4 has the advantage of allowing the use of any shapes of chamber 4 adjusted to the respective body part (a more detailed description thereof is provided later), without the entire stimulation device 1 needing to be replaced. Alternatively, the second chamber 4 can also be pluggably affixed to housing 8 (not shown in more detail). Wall 31 of the first chamber 3 can be adhered or screwed onto housing 8, for example.

Also, as shown in more detail in FIG. 7 by the broken line and double arrow C, the first chamber 3 is expanded and compressed by a force exerted perpendicularly to the axial direction of connection element 5. In principle, the force exerted directly or indirectly on the first chamber 3 by drive unit 6 can be exerted from any direction. The only decisive criterion here is that the volume of the first chamber 3 can be increased and decreased by drive unit 6.

Figure 8:
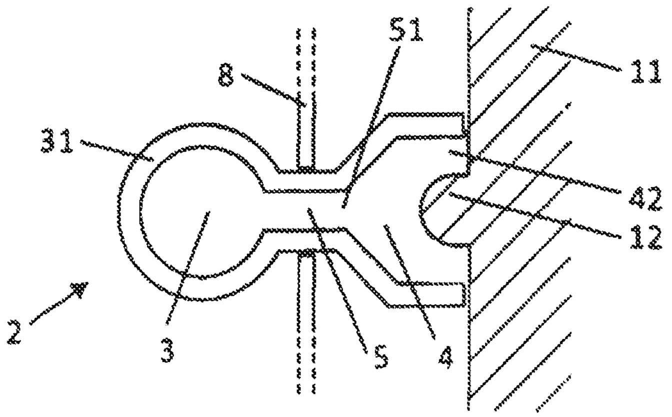
FIG. 8 a cross-section through section A-A of a pressure field generator of the stimulation device shown in FIG. 1 according to a third aspect of the present invention.

FIG. 8 shows one embodiment of an integral or one-piece structure of pressure field generator 2. An elastic material, such as silicone or rubber, can be used as material for chambers 3 and 4. The advantage here is that any hygienically unsafe divide is avoided and the production effort is reduced. Pressure field generator 2 can be adhered or screwed onto housing 8 in this case too. Any modification of the volume in the first chamber 3 is analogous here, as described in conjunction with FIG. 7.

Figure 9:
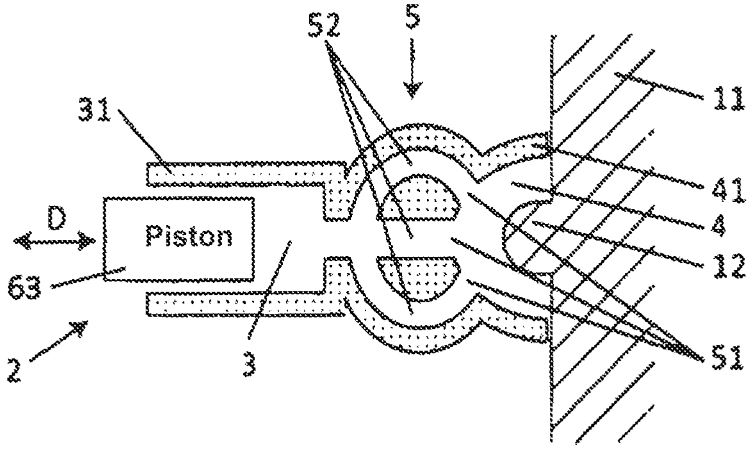
FIG. 9 a cross-section through section A-A of a pressure field generator of the stimulation device shown in FIG. 1 according to a fourth aspect of the present invention.

FIG. 9 shows one embodiment of an alternative construction of pressure field generator 2. The second chamber 4, a plurality of connection elements 5, as well as partial sections of wall 31 of the first chamber 3 are designed in one-piece. Alternatively, pressure field generator 2 can be constructed in two or more pieces from individual components, while safeguarding the geometrical example of FIG. 9 in a similar way to that shown in FIG. 4 or 7.

The volume in chamber 3 is modified in a similar way to a piston pump, although no valves are available here. A piston 63 is thus moved backwards and forwards by the drive unit, for example an electric motor or electromagnet, in the directions of the double arrow D. This type of drive has the advantage that the volume of the first chamber 3 can be simply reduced to zero or almost zero, thus allowing the first chamber 3 to be almost completely emptied.

The embodiment of connection element 5, with a plurality of channels 52 and openings 51, leads to a distribution of the pressure field to a plurality of concentration points. While the embodiment of connection element 5 with only one channel, as described in conjunction with FIG. 6, leads to the formation of a strongly concentrated media- or airflow on a target area, the embodiment of connection element 5 shown in FIG. 9 allows the media- or airflow to be distributed to a plurality of target areas, thus allowing clitoris 11 to be blown not just on its glans, but equally from a plurality of directions as well, for example. Depending on use, this distribution of the airflow concentration to a plurality of areas can help to avoid any overstimulation and/or help to increase the stimulation area.

Figure 10A:
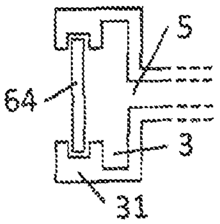
FIGS. 10 *a*), *b*) and *c*) cross-sections through section A-A of a pressure field generator of the stimulation device shown in FIG. 1 according to a fifth aspect of the present invention.
Figure 10B:
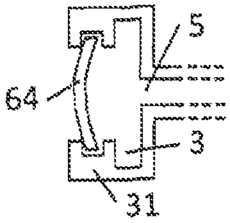
Figure 10C:
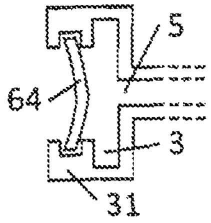

FIGS. 10*a* to 10*c* show (partial) cross-sections of one embodiment of a construction of pressure field generator 2 with a bending element 64 as drive for modifying the volume in the first chamber 3. Bending element 64 can, for example, be a conventional piezoelectric bending element, which distorts or bends once voltage is applied. In this embodiment wall 31 of the first chamber 3 is a rigid or stiff construction, while bending element 64 is suitably dovetailed to the sides of the first chamber 3. The transition points between bending element 64 and wall 31 are sealed (elastically bonded for example). The drive for pressure field generator 2 is already integrated in this construction and an external drive is not required. An electric motor with an eccentric is not needed, for example. This allows, inter alia, the reduction of any disturbing natural oscillations due to the eccentric movement of the stimulation device.

In detail, FIG. 10*a* shows pressure field generator 2 with bending element 64 in a neutral position. Thus, the volume of the first chamber 3 with bending element 64 in the neutral position is the standard volume. FIG. 10*b* also shows the first chamber 3 with an excited and, consequently, outwardly bent bending element, while the volume of the first chamber 3 is increased, with a negative-pressure consequently prevailing in pressure field generator 2. FIG. 10*c* shows a bending element of the first chamber 3 excited in the opposite direction to FIG. 10*b*, which is why the volume in the first chamber 3 has decreased, with a positive-pressure consequently prevailing in pressure field generator 2.

Figure 11:
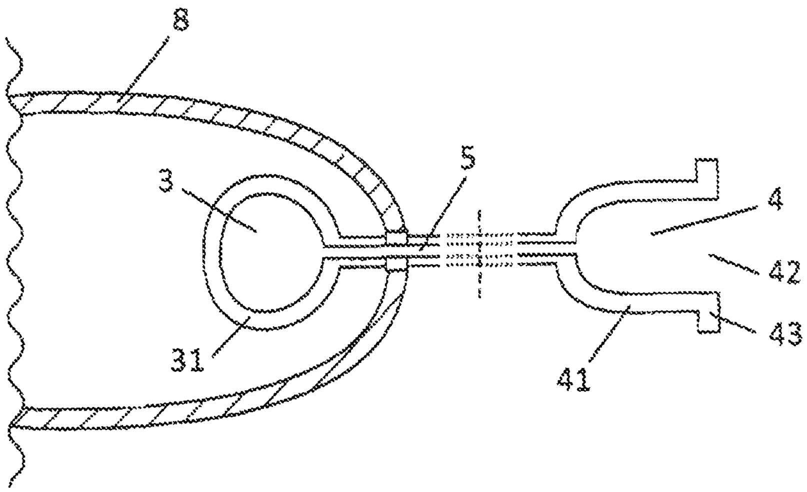
FIG. 11 a partial cross-section through section A-A of a second embodiment of the stimulation device shown in FIG. 1 according to the invention.
Figure 12A:
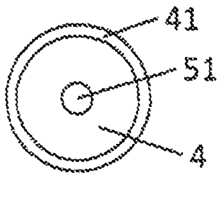
FIGS. 12 *a*) to *f*) various bottom and side views of other aspects of a second chamber of the present invention.
Figure 12B:
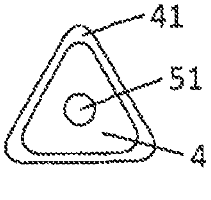
Figure 12C:
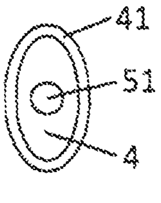
Figure 12D:
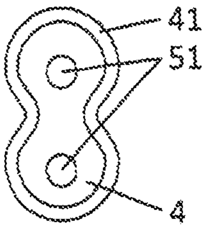
Figure 12E:
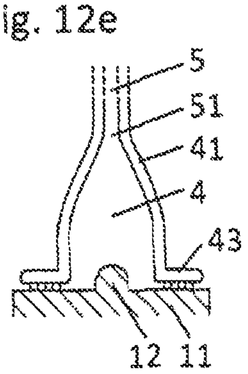
Figure 12F:
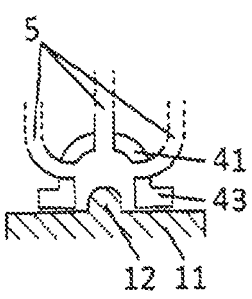

FIG. 11 shows one embodiment with a locally separated arrangement of chambers 3 and 4 of pressure field generator 2. Chambers 3 and 4 are connected via an extended connection element 5, which can be a longer flexible hose or even a rigid pipe. For example, connection element 5 may be 0.5 m in length. This enables housing 8 to be held in one hand, while the other hand holds the second chamber 4 on the body part 11 to be stimulated; or one can simply lay housing 8 aside, while the user holds only the second chamber 4 in his/her hands. The stimulation device in this embodiment can also be designed as a table device.

FIGS. 12 *a*) to 12 *f*) show various bottom and side views of other aspects of the second chamber 4 in accordance with one or more embodiments. In detail, FIG. 12 *a*) shows a bottom view of a circular second chamber 4 with a centrally arranged opening 51; FIG. 12 *b*) a bottom view of a triangular second chamber 4 with a centrally arranged opening 51; FIG. 12 *c*) a bottom view of an oval second chamber 4 with a centrally arranged opening 51; and FIG. 12 *d*) a bottom view of an almost eight-shaped second chamber 4 with two openings 51 shifted to the center. FIG. 12 *e*) further shows a side cross-section of a second chamber 4, wherein the second chamber 4 has an additional extended contact surface 43 to the skin or a support part 43 to improve the sealing function of the second chamber 4 on the skin. The extended contact surface 43 may also have grooves or projections that improve the sealing function even more. FIG. 12 *f*) shows a side cross-section of a second chamber 4 with a plurality of separate connection elements 5 and an extended contact surface due to support part 43.

In principle, the form of the second chamber 4 can thus be adjusted to the anatomy of the erogenous zone to be stimulated. The form of chamber 4 in FIG. 12 *a*) is, for example, adjusted to the round shape of the breast, while the form of chamber 4 in FIG. 12 *c*) is better suited to the form of the female vulva. Furthermore, the shape of the second chamber 4 also determines the characteristic of the pressure field. The size of the second chamber 4 in ratio to the volume displaced from chamber 3 thus determines the amount of the achievable negative- or positive-pressure. Furthermore, the proximity of opening 51 of connection element 5 to the area of skin to be stimulated can also be used to determine the intensity of the massage effect on said area of skin. A plurality of openings 51, cf. FIG. 12 *d*) allows the massage effect to be distributed to a plurality of areas. Thus, for example, the clitoris can be less directly stimulated at the very sensitive clitoris glans (cf. FIG. 12 *e*), and more stimulated at the areas surrounding the clitoris glans, in order to prevent overstimulation of the clitoris.

Figure 13:
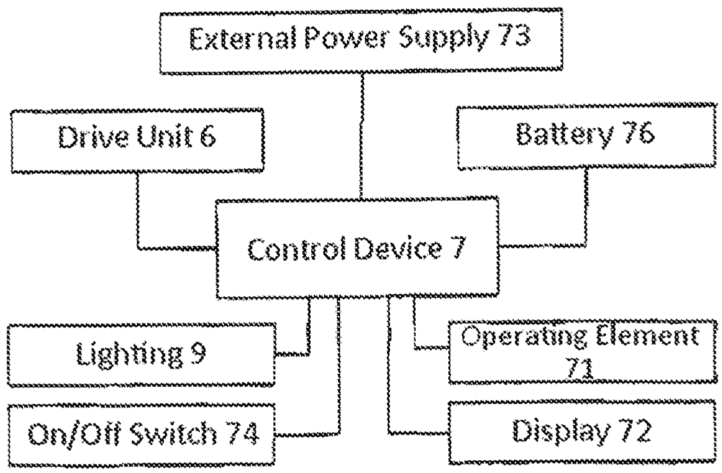
FIG. 13 a block diagram of an embodiment of the present invention.

FIG. 13 shows a block diagram of an example of the functional construction of an embodiment with a control device 7, a drive unit 6, lighting 9, an on/off switch 74, operating elements 71, a battery 76 and an external power supply 73.

Control device 7, which has a microcontroller or is hardwired, for example, initially controls the power supply of all users of stimulation device 1, as well as an optional charging and discharging process of battery 76 and/or a battery management. In particular, control device 7 controls the excitation of drive unit 6, such as the size of the deflection, the frequency, the modulation, etc.

Furthermore, control device 7 may have a memory in which at least one modulation or stimulation pattern (described in more detail in conjunction with FIGS. 14 *a*) to *c*)) is saved. The excitation of drive unit 6 can now be activated via operating elements 71 in compliance with the previously saved stimulation pattern at the discretion of the user of stimulation device 1. The stimulation pattern of the pressure field can also be optionally and individually adjusted and saved by the user via the operating elements.

Figure 14A:
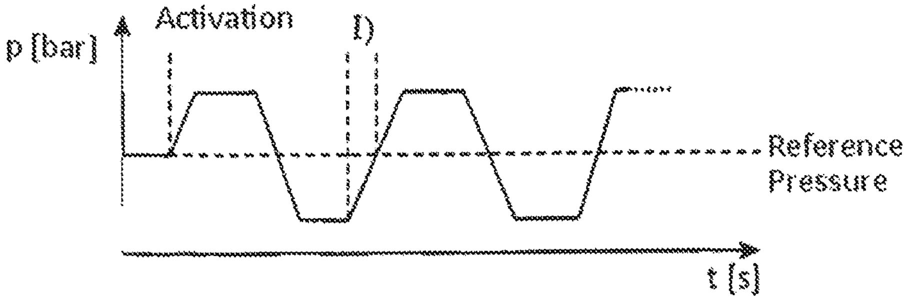
FIGS. 14 *a*) to *c*) diagrams of various pressure modulation patterns of the present invention.
Figure 14B:
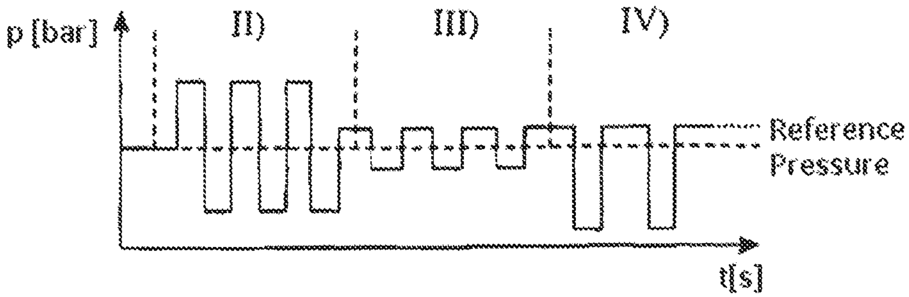
Figure 14C:
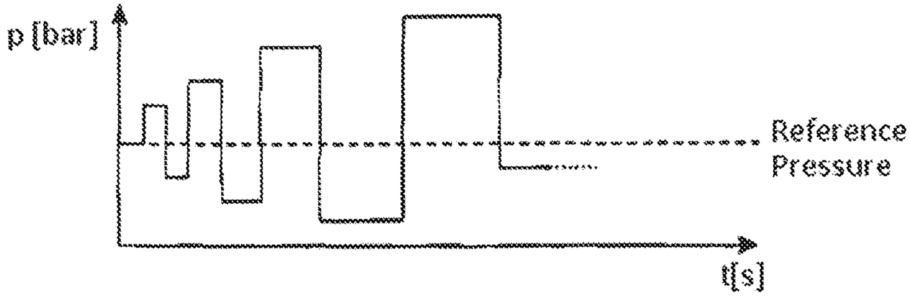

FIG. 14 *a*) shows the chronological sequence of a total pressure p in the pressure field generator (2) when using the latter for stimulation. The broken line provides the reference pressure, such as the currently prevailing atmospheric pressure that exists outside the pressure field generator (2). If the second chamber 4 is now placed on body part 11 to be stimulated, the originally prevailing ambient pressure in the pressure field generator (2) is maintained, for example. It is now assumed that the second chamber 4 is sealed tightly to the body part to be stimulated for the most part. Once the stimulation device is activated, drive unit 6 is activated or excited by control device 7 according to a previously saved stimulation pattern. Accordingly, the volume of the first chamber 3 and thus the total pressure in pressure field generator 2 are modified, with the pressure modifications being modified to the reference pressure. The pressure or stimulation pattern shown as an example in FIG. 14 *a*) develops a pulsed, regular pressure field. In phases of pressure increase, the erogenous zone to be stimulated is blown on or massaged, while in the times when a negative-pressure prevails, the blood circulation of body part 11, the clitoris for example, is promoted. Thus, time periods exist (designated in FIG. 14 *a*) as I)) in which a negative-pressure prevails, while the clitoris is simultaneously indirectly massaged.

FIG. 14 *b*) shows three examples of alternative stimulation patterns. Thus, the area designated as II) shows a pulsed stimulation pattern with high amplitude. The area designated as III) shows a pulsed stimulation pattern with low amplitude. Furthermore, the area designated as IV) illustrates an irregular and asymmetrical stimulation pattern as regards chronological sequence and amplitude. The patterns can be varied according to individual bodily effect/use and according to individual wishes.

FIG. 14 *c*) shows another example of an alternative stimulation pattern. The strength of pressure may, for example, increase with time, in order to adjust to the user's state of excitement.

In addition to the explained embodiments, other basic design principles are allowed. For example, different arrangements or constructions of the first chamber 3 may be arbitrarily combined with various embodiments of the second chamber 4 or connection element 5. For example, the first chamber 3 with the drive in FIG. 10 can be combined with the second chamber in FIG. 12 *f*).

Although only one first chamber 3 is shown in all embodiments, two or more first chambers 3 may be present, which are then appropriately activated simultaneously or time-delayed in such a way that their volume is modified in order to build up a pressure field.

Although only one opening from the first chamber 3 to connection element 5 is shown in all embodiments, a plurality of openings for a connection element 5 or even more openings for a plurality of connection elements 5 may be present in the first chamber 3.

A stimulation device 1 can have a plurality of pressure field generator 2. Thus, for example, two pressure field generators may be available to stimulate two erogenous zones simultaneously.

The stimulation patterns can deviate from the patterns shows in FIGS. 14 *a*), *b*) and *c*), as long as they have a chronological sequence of over- and negative-pressures. For example, a relatively long-lasting negative-pressure can initially be built up at the beginning or after activation of the device (3 minutes for example), in order to effectively increase the blood circulation of the zone to be stimulated, whereupon pulsed negative- and over-pressures of a slowly increasing amplitude then follow.

LIST OF REFERENCE NUMERALS

1 Stimulation device
2 Pressure field generator
3 First chamber
4 Second chamber
5 Connection element
6 Drive unit
7 Control device
8 Housing
9 Lighting
11 Body part
12 Clitoris
31 Wall of first chamber
32 Holder
41 Wall of second chamber
42 Opening of second chamber
43 Contact surface
51 Opening of connection element to second chamber
61 Drive shaft
62 Eccentric
63 Piston
64 Bending element
71 Operating element
72 Display

73 Power supply
74 On/off switch
75 Socket
76 Battery
77 Control board

The invention claimed is:

1. A stimulation device comprising:
a housing;
a chamber defined by the stimulation device;
an opening to the chamber, the opening to sealingly engage a portion of a body of a user including a clitoris;
a flexible material surrounding the opening;
a wall defining at least a portion of the chamber,
at least a portion of the wall having a first position, a second position, and a third position,
the first position between the second position and the third position,
the first position corresponding to a pressure in the chamber being at an ambient pressure when the opening is sealingly engaged with the portion of the body, the second position corresponding to the pressure in the chamber being at a positive pressure above the ambient pressure, and the third position corresponding to the pressure in the chamber being at a negative pressure below the ambient pressure;
a drive unit carried by the housing, the wall to sealingly separate the opening from the drive unit;
an eccentric in communication with the drive unit and the wall, the drive unit to cause the at least the portion of the wall to move via the eccentric from the first position to the second position or to the third position and then to move between the second position and the third position to cause the pressure in the chamber to alternate relative to the ambient pressure between positive pressures above the ambient pressure and negative pressures below the ambient pressure, the alternating positive pressures and negative pressures to be applied to the portion of the body via the sealing engagement of the opening;
a microcontroller communicatively coupled to the drive unit; and
a user control element accessible via an exterior surface of the stimulation device, the user control element communicatively coupled to the microcontroller.

2. The stimulation device of claim 1, wherein the user control element includes a push button.

3. The stimulation device of claim 1, wherein the user control element is accessible on a same side of the stimulation device as the opening.

4. The stimulation device of claim 1, wherein at least a portion of the housing is curved.

5. The stimulation device of claim 1, wherein the chamber is a first chamber and further including a second chamber, the first chamber, the second chamber, and the opening defining a flow path for the alternating positive pressures and negative pressures.

6. The stimulation device of claim 1, wherein the flexible material covers a portion of the housing.

7. The stimulation device of claim 1, wherein the user control element includes a switch.

8. A stimulation device comprising:
a housing;
a chamber in the housing;
an opening to the chamber, the opening to sealingly engage a portion of a body of a user including a clitoris, the chamber having a first volume, a second volume, and a third volume,
the first volume between the second volume and the third volume,
the first volume corresponding to a pressure in the chamber being at an ambient pressure when the opening is sealingly engaged with the portion of the body, the second volume corresponding to the pressure in the chamber being at a positive pressure above the ambient pressure, and the third volume corresponding to the pressure in the chamber being at a negative pressure below the ambient pressure;
a flexible material extending from the housing and covering at least a portion of an exterior surface of the housing;
a drive unit in the housing, the drive unit to cause a volume of the chamber to change from the first volume to the second volume or to the third volume and then to alternate between the second volume and the third volume to cause the pressure in the chamber to modulate relative to the ambient pressure between positive pressures above the ambient pressure and negative pressures below the ambient pressure, the modulated positive pressures and negative pressures to be applied to the portion of the body via the sealing engagement of the opening;
a microcontroller in communication with the drive unit; and
a user control element supported by the housing and in communication with the microcontroller.

9. The stimulation device of claim 8, wherein the opening extends through at least a portion of the flexible material.

10. The stimulation device of claim 8, wherein the housing includes a first housing portion having a first width and a second housing portion having a second width, the first width greater than the second width.

11. The stimulation device of claim 8, further including a wall defining a portion of the chamber, the drive unit to cause at least a portion of the wall to move from a first position to a second position to cause the volume of the chamber to change from the first volume to the second volume.

12. The stimulation device of claim 11, further including a connecting member to operatively couple the drive unit to the wall.

13. The stimulation device of claim 12, wherein the connecting member includes an eccentric.

14. The stimulation device of claim 11, wherein the wall is flexible.

15. The stimulation device of claim 11, wherein the wall and the flexible material form an integral piece.

16. The stimulation device of claim 8, further including a piston at least partially disposed in the chamber, the drive unit to cause the piston to move to cause the volume of the chamber to change from the first volume to the second volume or to the third volume.

17. The stimulation device of claim 8, further including a wall in the chamber, the drive unit to cause the wall to move to cause the volume of the chamber to change from the first volume to the second volume or to the third volume.

18. The stimulation device of claim 17, wherein the wall is a portion of a piston.

19. The stimulation device of claim 8, wherein the drive unit is to cause a force to be applied in a direction perpendicular to an axis passing through the opening to cause the volume of the chamber to change from the first volume to the second volume or to the third volume.

20. A stimulation device comprising:
a housing;

a chamber in the housing;

an opening in communication with the chamber;

a wall defining a portion of the chamber;

a flexible material surrounding the opening, the flexible material to sealingly engage a portion of a body of a user including a clitoris, the flexible material covering at least a portion of an exterior surface the housing, at least a portion of the wall having a first position, a second position, and a third position, the first position between the second position and the third position, the first position corresponding to a pressure in the chamber being at an ambient pressure when the flexible material is sealingly engaged with the portion of the body, the second position corresponding to the pressure in the chamber being above the ambient pressure, and the third position corresponding to the pressure in the chamber being below the ambient pressure;

a drive unit carried by the housing, the wall to sealingly separate the opening from the drive unit, the drive unit to cause the at least a portion of the wall to be displaced from the first position to the second position or to the third position and then to move between the second position and the third position to cause the pressure in the chamber to modulate relative to the ambient pressure between positive pressures above the ambient pressure and negative pressures below the ambient pressure, the modulated positive pressures and negative pressures to be applied to the portion of the body including the clitoris via the opening;

a microcontroller operatively coupled to the drive unit; and a user control element, at least a portion of the user control element accessible via the exterior surface of the housing, the microcontroller to cause the drive unit to control a frequency of the modulated positive pressures and negative pressures in response to an input received via the user control element.

21. The stimulation device of claim 20, wherein the drive unit is to cause the at least the portion of the wall to deform.

22. The stimulation device of claim 20, wherein the wall is to separate the drive unit from the opening.

23. The stimulation device of claim 20, further including a connecting member to operatively couple the drive unit to the wall within the housing, the drive unit to cause the connecting member to move to displace the at least the portion of the wall.

24. The stimulation device of claim 20, wherein the flexible material is at least partially disposed in the housing and at least partially extends from the housing via the opening.

25. A stimulation device comprising:

a housing;

a wall in the housing, the wall defining a hollow space;

an opening to the hollow space;

a flexible material surrounding the opening, the flexible material to sealingly engage a portion of a body of a user;

a piston in the housing and at least partially extending into the hollow space, the piston having a first position, a second position, and a third position, the first position between the second position and the third position, the first position corresponding to a pressure in the hollow space being at an ambient pressure when the flexible material is sealingly engaged with the portion of the body, the second position corresponding the pressure in the hollow space being at a positive pressure above the ambient pressure, and the third position corresponding to the pressure in the hollow space being at a negative pressure below the ambient pressure;

a drive unit in the housing, the drive unit to cause the piston to move relative to the wall from the first position to the second position or to the third position and then to alternate between the second position and the third position to cause the pressure in the hollow space to modulate relative to the ambient pressure between positive pressures above the ambient pressure and negative pressures below the ambient pressure, the modulated positive pressures and negative pressures to be applied to the portion of the body via the opening; and a microcontroller operatively coupled to the drive unit.

26. The stimulation device of claim 25, wherein the flexible material covers at least a portion of an exterior surface of the housing.

27. The stimulation device of claim 25, wherein the flexible material extends into the opening.

28. The stimulation device of claim 25, wherein the piston is movable in a direction of an axis passing through the opening.

* * * * *